(12) United States Patent
Yeo et al.

(10) Patent No.: US 12,460,413 B2
(45) Date of Patent: Nov. 4, 2025

(54) CONFIGURABLE LINEAR LIGHTING MODULE FOR SUSPENDED CEILING GRID ASSEMBLIES

(71) Applicant: Fusion Optix, Inc., Woburn, MA (US)

(72) Inventors: Terence Yeo, Boston, MA (US); Michael Demas, Charlestown, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 453 days.

(21) Appl. No.: 17/669,057

(22) Filed: Feb. 10, 2022

(65) Prior Publication Data

US 2022/0162856 A1 May 26, 2022

Related U.S. Application Data

(63) Continuation-in-part of application No. 16/877,482, filed on May 18, 2020, now Pat. No. 11,396,751, (Continued)

(51) Int. Cl.
*F21V 5/04* (2006.01)
*E04B 9/00* (2006.01)
(Continued)

(52) U.S. Cl.
CPC ............. *E04B 9/18* (2013.01); *E04B 9/006* (2013.01); *E04B 9/247* (2013.01); *F21V 5/04* (2013.01);
(Continued)

(58) Field of Classification Search
CPC . E04B 9/04; E04B 9/006; E04B 9/067; E04B 9/18; E04B 9/247; F21S 8/026
(Continued)

(56) References Cited

U.S. PATENT DOCUMENTS 3,329,387 A * 7/1967 Fischer .................. E04B 9/16
248/342
3,343,310 A * 9/1967 Netz ...................... F21V 21/04
52/28
(Continued)

OTHER PUBLICATIONS

CISCA Seismic Construction Handbook, Table of IBC 2012 Seismic Design Category D, E, & F Lighting Fixture Requirements on p. 10, Ceilings & Interior Systems Construction Association, 2013.

*Primary Examiner* — James J Buckle, Jr.

(57) ABSTRACT

The present disclosure generally relates to lighting modules, and more specifically, to a configurable linear lighting module for use within a suspended ceiling grid assembly. The configurable linear lighting module is easy to install and comprises a novel linear support element with internal and external support features which is provided with integrated or removable optical assemblies to deliver lighting distributions tailored to optimally illuminate the surface ceiling panels as well as floors, walls and work surfaces below. When installed within a configured ceiling grid assembly the configurable linear lighting module provides novel support features for ceiling panels to be held in-line, above, below or tilted relative to the existing ceiling grid plane. A wide range of useful lighting distributions are achieved by configuring the optical elements and LED light sources supported and aligned by the linear support element. By selectively applying electrical power to individual light source channels it is further possible to electrically control lighting distributions. As such the configurable linear lighting module provides both aesthetically pleasing features and useful lighting distributions. Furthermore, illustrated embodiments of ceiling grid assemblies comprising one or more of the configurable linear lighting modules demonstrate how both appearance and lighting distributions can be controlled to meet aesthetic and lighting design requirements.

35 Claims, 38 Drawing Sheets

Related U.S. Application Data which is a continuation-in-part of application No. 16/239,804, filed on Jan. 4, 2019, now abandoned.

(60) Provisional application No. 63/225,590, filed on Jul. 26, 2021, provisional application No. 63/000,649, filed on Mar. 27, 2020, provisional application No. 63/000,718, filed on Mar. 27, 2020, provisional application No. 62/849,199, filed on May 17, 2019.

(51) Int. Cl.
  *E04B 9/18* (2006.01)
  *E04B 9/24* (2006.01)
  *F21V 7/04* (2006.01)
  *F21V 21/03* (2006.01)
  *G02B 5/02* (2006.01)

(52) U.S. Cl.
  CPC ............... *F21V 7/04* (2013.01); *F21V 21/03* (2013.01); *G02B 5/0205* (2013.01)

(58) Field of Classification Search
  USPC ........................................ 52/506.06, 506.07
  See application file for complete search history.

(56) References Cited

U.S. PATENT DOCUMENTS

| | | | | |
|---|---|---|---|---|
| 3,426,188 A * | 2/1969 | Baranowski | ............ | F21V 21/00 52/28 |
| 3,512,313 A * | 5/1970 | Harz | ............ | E04B 9/12 52/28 |
| 4,027,454 A * | 6/1977 | Schuplin | ............ | E04B 9/242 52/506.07 |
| 4,047,336 A * | 9/1977 | Stahlhut | ............ | F21S 8/02 52/28 |
| 4,363,082 A * | 12/1982 | Roland | ............ | F21V 21/04 362/225 |
| 4,479,341 A * | 10/1984 | Schuplin | ............ | E04B 9/127 52/712 |
| 5,161,878 A * | 11/1992 | Degelmann | ............ | F21V 19/02 362/366 |
| 5,428,930 A * | 7/1995 | Bagley | ............ | E04B 9/003 52/489.1 |
| 5,528,478 A * | 6/1996 | Degelmann | ............ | F21V 13/10 362/291 |
| 5,777,857 A * | 7/1998 | Degelmann | ............ | F21S 2/00 362/225 |
| 5,941,029 A * | 8/1999 | MacLeod | ............ | E04B 9/006 24/336 |
| 6,029,414 A * | 2/2000 | MacLeod | ............ | E04B 9/006 52/39 |
| 6,079,851 A * | 6/2000 | Altman | ............ | F21V 19/008 362/217.05 |
| 6,341,466 B1 * | 1/2002 | Kehoe | ............ | F16B 2/241 52/39 |
| 7,770,349 B2 * | 8/2010 | Tedesco | ............ | E04B 9/122 52/506.07 |
| 8,453,407 B2 * | 6/2013 | Tedesco | ............ | E04B 9/127 52/506.07 |
| 8,615,948 B2 * | 12/2013 | Underkofler | ............ | E04B 9/067 52/506.07 |
| 8,667,756 B1 * | 3/2014 | Sareyka | ............ | E04B 9/18 52/506.07 |
| 2012/0047836 A1 * | 3/2012 | Sareyka | ............ | E04B 9/30 52/506.06 |
| 2012/0102865 A1 * | 5/2012 | Baxter | ............ | E04B 9/30 52/745.05 |
| 2013/0318905 A1 * | 12/2013 | Underkofler | ............ | E04B 9/122 52/506.06 |
| 2015/0040494 A1 * | 2/2015 | Lehane, Jr. | ............ | E04B 9/122 52/506.07 |
| 2017/0082252 A1 * | 3/2017 | Casement | ............ | G02B 6/0051 |
| 2021/0048169 A1 * | 2/2021 | Dahlen | ............ | F21V 21/04 |
| 2021/0348730 A1 * | 11/2021 | Porciatti | ............ | F21S 4/28 |

* cited by examiner (i) Diffuse Planar (No surface features)

(ii) Diffuse laser etched (iii) Diffuse lenticular (iv) Diffuse sawtooth (v) Diffuse layer (laminated)

(vi) Diffuse surface (coated)

(vii) Diffuse patterned

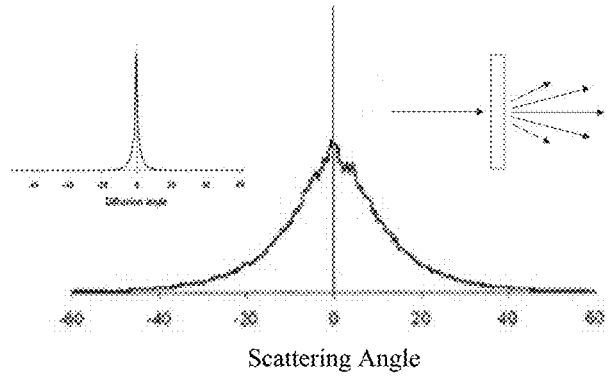

Scattering Angle

| Sample | Type | Height | ASTM D1003 | | | Scattering (FWHM) | | Gloss (60%) | |
|---|---|---|---|---|---|---|---|---|---|
| | | | T% | H% | C% | TD | MD | Side A | Side B |
| Clear Etched Light Guide | | 4.5mm | 89.4 | 12.5 | 98.6 | 1° | 1° | 129.9 | 110.2 |
| Edge-lit Signage Acrylic | | 4.0mm | 92.6 | 4.1 | 99.8 | 1° | 1° | 139.7 | 140.5 |
| (i) | Diffuse planar | 4.7mm | 90.6 | 97.1 | 9.1 | 10° | 16° | 62.4 | 63.5 |
| (ii) | Diffuse laser etched | 4.5mm | 92.8 | 94.5 | 3.7 | 20° | 18° | 85.7 | 64.3 |
| (iii) | Diffuse lenticular | 4.6mm | 86.9 | 92.3 | 23.6 | 25° | 2° | 86.5 | 11.9 |
| (iv-a) | Diffuse sawtooth | 4.4mm | 82.6 | 97.6 | 4.3 | 5° | 17° | 74.7 | 5.9 |
| (iv-b) | Diffuse sawtooth | 3.8mm | 91.7 | 84.9 | 13.0 | 5° | 17° | 78.5 | 5.9 |
| (iv-c) | Diffuse sawtooth | 4.8mm | 91.6 | 80.2 | 17.8 | 5° | 17° | 74.7 | 5.9 |
| (v-a) | Diffuse layer (laminated) | 4.6mm | 91.5 | 86.3 | 15.2 | 11° | 10° | 88.4 | 55.6 |
| (v-b) | Diffuse layer (laminated) | 4.6mm | 90.2 | 90.6 | 7.3 | 15° | 14° | 90.2 | 45.2 |
| (v-c) | Diffuse layer (laminated) | 4.6mm | 92.0 | 94.1 | 3.9 | 30° | 30° | 87.6 | 34.5 |
| (v-d) | Diffuse layer (laminated) | 4.6mm | 86.8 | 94.9 | 5.6 | 40° | 30° | 85.7 | 86.1 |
| (vi-a) | Diffuse surface (coated) | 4.5mm | 93.0 | 95.1 | 3.6 | 20° | 18° | 91.1 | 6.3 |
| (vi-b) | Diffuse surface (coated) | 4.5mm | 89.8 | 100 | 2.3 | 40° | 40° | 92.4 | 4.3 |

FIG. 11D (i) Medium (ii) Batwing (60deg)

(iii) Narrow / Low Glare (iv) Medium Asymmetric (v) Linear Spot (vi) Narrow Asymmetric a – lighting module
b – lighting module
c – covering element (end plate)
d – covering element (end plate)
1226 – driver
f – DC wire connectors (driver to modules)
g – AC power cord (driver)

a – lighting module
b – lighting module
c – covering element (end plate)
d – covering element (end plate)
1226 – driver
f – DC wire connectors (driver to modules)
g – AC power cord (driver)

CONFIGURABLE LINEAR LIGHTING MODULE FOR SUSPENDED CEILING GRID ASSEMBLIES

RELATED APPLICATIONS

This application is a continuation in part of and claims the benefit of non-provisional U.S. application Ser. No. 16/877,482 titled "MODULAR CEILING SYSTEM WITH SUPPORT ELEMENTS FOR MOUNTING OF FUNCTIONAL MODULES" filed May 18, 2020; which is itself a continuation in part of non-provisional U.S. application Ser. No. 16/239,804 titled "SUPPORT ELEMENT FOR GRID CEILING SYSTEMS" filed Jan. 4, 2019. Furthermore, this application claims the benefit of provisional patent applications referenced by Ser. No. 16/239,805; namely, Ser. No. 62/849,199 titled "MODULAR CEILING SYSTEM AND METHOD" filed May 17, 2019, Ser. No. 63/000,649 titled "MODULAR FUNCTIONAL FIXTURE FOR USE WITH SUSPENDED CEILING GRID ARRANGEMENT AND METHOD FOR INSTALLATION" filed Mar. 27, 2020, and Ser. No. 63/000,718 "LIGHTING ARRANGEMENT FOR USE WITH SUSPENDED CEILING" filed Mar. 27, 2020. Additionally, this application claims the benefit of provisional application 63/225,590 filed Jul. 26, 2022.

TECHNICAL FIELD

The present disclosure generally relates to lighting assemblies, and more specifically, to a configurable modular lighting assembly for use within a ceiling grid system delivering lighting distributions tailored to optimally illuminate the surface ceiling panels as well as floors, walls and work surfaces below.

BACKGROUND

In recent times, the implementation of lighting devices utilized in many diverse applications, such as in office workspaces, warehouses, educational institutions, research laboratories, indoor and outdoor living spaces, industrial areas, vehicles and so forth to provide illumination for humans performing visual tasks has increased drastically. Contemporarily, lighting devices are also employed for aesthetic purposes to provide a visually comforting environment to a given person. However, with the passage of time, the structural integrity of such lighting devices attributed to the structural integrity of the structural component or structure such as the structural ceiling or the ceiling grid system continues to decline. Typically, the structural integrity refers to the ability to withstand and hold together under a load, including its own weight, without breaking or deforming excessively. It assures that the ceiling grid system will perform its designed function during reasonable use, for as long as its intended life span. Typically, any object is constructed with structural integrity to prevent catastrophic failure, which can result in injuries, severe damage, death, and/or monetary losses. However, conventional ceiling grid system tend to deteriorate with time and thus significantly lose their structural integrity and thus creates a need for a ceiling grid system having a high structural integrity.

Conventionally, such lighting systems are affixed to structural ceilings, walls and other building elements for support in order to illuminate their surrounding environments. Often, a given house or building has, for a given room, a structural ceiling supporting a ceiling grid arrangement (or a ceiling grid arrangement). Typically, the ceiling grid arrangement, also referred to as being a "suspended ceiling system", includes a plurality of tiles or panels hanging at about 30 to 50 centimeters approximately from the structural ceiling of the house or building. The ceiling grid arrangement further includes a plurality of T-Bars that are configured to hold the plurality of tiles in position. Additionally, a flush-finish of lower surfaces of the plurality of T-Bars, and the plurality of tiles by arranging each of the plurality of tiles in close contact is formed such that they appear as a continuous mono-planar ceiling surface. However, an appearance of such a conventional ceiling grid arrangement has a dull look and becomes unpleasant with passage of time and creates an unpleasant environment inside the given room of the house or building.

Moreover, the ceiling grid arrangements are provided with lighting fixtures arranged to illuminate surroundings, such as, for example a, cubical space in an office, a corridor of a house, and the like. Moreover, lighting fixtures are arranged to be supported in respect of the ceiling grid arrangements with an intention to achieve an aesthetically pleasant look. However, despite such intentions, the traditional ceiling grid arrangements are incapable of satisfying such desirable luminaires to meet the aforementioned expectations.

Major issues that are encountered with the traditional ceiling grid arrangements are a monotonous look, complex retrofitting, costlier replacements, and the like. On many occasions, an environment or workspace is provided with multiple small lighting devices, wherein the small lighting devices include multiple light sources. However, such a configuration leads to an increase in installation and maintenance costs, inefficient energy usage, wastage of resources and environmental pollution.

A further issue that is encountered with contemporary suspending ceiling arrangements is that replacing the ceiling grid arrangements, for example when generally refurbishing a given building in which a ceiling grid arrangement is installed, generates a lot of waste material that is potentially not straightforward to recycle or reuse; moreover, such waste material can be environmentally disadvantageous.

Therefore, taking the aforementioned problems into consideration, there exists a need to overcome the aforementioned drawbacks associated with the existing lighting assemblies and issues with installation of such lighting assemblies in a ceiling grid arrangement.

SUMMARY

Throughout the present disclosure, the term "ceiling grid system" refers to any ceiling system consisting of a ceiling grid suspended or hung at a height below a structural ceiling of an architecture, such as a room of a house, or a building. It will be appreciated that the structural ceiling is an overhead interior surface that covers, namely defines, an upper limit of a room. The space between the structural ceiling and the top of the suspended ceiling grid is commonly referred to a "ceiling plenum" or "plenum space". Common items positioned within a plenum space include HVAC ducts, HVAC vents, lighting fixtures, sprinkler heads. Typically these are hidden from view by the ceiling grid system. Optionally, the ceiling grid system comprises a grid formation constructed using metallic bars. Furthermore, the grid formation includes pluralities of openings, wherein removable panels (ceiling panels) and/or cover elements are positioned to cover the entire structural ceiling from below. Furthermore, the grid formation is configured to accommodate various electronic and/or electrical devices for providing a plurality of services in the room. Examples of various electronic and electrical devices may include at least one of: lights, alarms, sensors, ventilation fans, heaters, humidifiers, and the like. Optionally, the ceiling grid system may include a power system for supplying electric power to the various electrically and/or electronically operated ceiling devices.

In a typical example, the structural ceiling may be at a height of 2.5 meters from a floor (not shown) of the room. In such an example, the height below the structural ceiling for holding the ceiling grid system may be 0.25 meters from the height of the structural ceiling, i.e., 2.25 meters from a floor of the room. A distance known as the "plenum height". Furthermore, the ceiling grid system is suspended or hung at the plenum height using the hanging wires that are securely fixed to the structural ceiling. Optionally, the hanging wires can be hinged, hooked, tied, coupled, plastered securely, or fixed to the structural ceiling. In some applications it is desirable to eliminate all items from within the plenum space and minimize the plenum space to essentially zero height, a case where there is little or no space between the structural ceiling and the top of the of the ceiling grid system. This is sometimes referred to as a "zero plenum" approach.

The ceiling grid T-Bars of the ceiling grid system are hardware components such as an elongate rigid spine extending between terminal ends of the structural ceiling. Additionally, the T-Bars comprises an inverted T-shaped structure formed via the flat horizontal portion integral to the vertical portion. Furthermore, the ceiling grid T-Bars include either a fixed anchor or an adjustable anchor for attachment to an adjacent member, such as another T-Bar or other holding for securely holding or suspending the T-Bars. Optionally, the T-Bars are conjoined to the hanging wires, either by hooking, welding, gluing, and so forth. Moreover, the T-Bars include tracks or holes wherein the hanging wires can be coupled to and/or can be latched onto for supporting (i.e., for holding or suspending) the ceiling grid system from the structural ceiling. Furthermore, the T-Bars of the ceiling grid system form a series of openings into which the plurality of ceiling panels can be arranged.

In drop ceiling environments such as office spaces and residential homes, the plurality of T-Bars defining the array of T-Bar cells acts as a support grid that holds ceiling panels in place to form a drop ceiling. To form the ceiling grid, typically the T-Bars running in a first direction are long T-Bars, long enough to span an entire room (or as far as possible in case of a larger room where it is impractical to have the T-Bars spanning the entire length of the room) are used. Moreover, in a second direction, perpendicular to the first direction, shorter T-Bars are located which merely extend between adjacent long T-Bars. Additionally, apart from the plurality of ceiling panels, the T-Bars are also capable of supporting air conditioning returns and registers, as well as light fixtures and other equipment.

Furthermore, the term "ceiling panels" as used herein relates to a lightweight structure, usually a shallow cuboidal structure, having a length, a breadth, and a height which are placed within the opening formed by the T-Bars cells for covering the structural ceilings. Further, dimensions of the plurality of ceiling panels are based on the parallelepiped lattice allowed by the arrangement of the ceiling grid T-Bars to accommodate therein. Optionally, the plurality of ceiling panels are a plurality of substantially identical panels, each panel being substantially rectangular in form, when viewed from the room. Optionally, the plurality of ceiling panels includes edges, wherein, in operation, the edges of the ceiling panels rest on the horizontal-portion of the T-Bars. Optionally, the plurality of ceiling panels include at least one edge having one or more lengthwise protruding lips and/or one or more lengthwise grooves along the whole length of the edge. The protruding lips and/or one or more lengthwise grooves of the plurality of ceiling panels enable the ceiling panels to be securely held (namely supported) on the horizontal-portion of the T-Bars. The horizontal portions of the ceiling grid T-Bars define a ceiling grid plane i.e., the ceiling grid plane for the plurality of ceiling panels. Specifically, the horizontal portions of the T-Bars define the ceiling grid plane for the plurality of ceiling panels.

Two primary types of ceiling panels are typically used in suspended ceiling systems, acoustical ceiling panel and drywall ceiling, and the transition between them in the illustrated configuration. Drywall ceiling panels, also known as plasterboard, sheet rock, gypsum board, or gypsum panel, are typically comprised of a mixture comprising calcium sulfate dihydrate (gypsum) and fibrous material sandwiched between thick sheets of paper. Typically, they are cut to size as needed from large sheets and attached to a ceiling grid by means of adapter clips and fasteners such as screws. After installation they are typically coated with some form of drywall coating, typically gypsum based, to fill in void spaces and planarize the surface, often as a substrate for painting. Drywall coating can optionally be applied in a manner creating a textured surface which may be aesthetically desirable in some applications. The combination of drywall, drywall coating, and painting can provide a wide variety of desirable aesthetic finishes which can be customized at the installed location. Acoustic ceiling panels are typically prefabricated gypsum panels sized to lay in ceiling grid systems supported on edges by ledges within the grid system such as horizontal flanges of T-Bars. They are typically smaller is size and more porous and lighter weight than drywall ceiling panels and can be easily added to or removed from a ceiling grid system. FIG. 10A is an illustration of a ceiling grid system, in accordance with an embodiment of the present disclosure.

The term "ceiling grid plane" used herein refers to an imaginary plane, parallel to a floor or flooring surface of the given room, along which typically conventional ceiling panels are arranged. Further, in or along the ceiling grid plane, the conventional ceiling panels are positioned or arranged mutually adjacent and parallel to each other. Furthermore, each of the horizontal portion of the T-Bars are planar and parallel to each other. Furthermore, each of the horizontal portion being in the same plane (i.e., the ceiling grid plane) provides a planar structure at lower surfaces of the T-Bars arrangement. Moreover, the planar structure at lower surfaces of the T-Bars arrangement also provides the ceiling grid plane.

The term "linear support element" refers to a continuous solid elongate structure including a shape that is configured to hold the plurality of ceiling panels and either replace a T-Bar or mount securely onto the T-Bars. The linear support element (or elongate supporting element) is typically arranged parallel to the edge of the ceiling grid T-Bars that constitute or define the at least one T-Bar cell. The linear support element may also be referred to as a support housing attributed to the functionality of the linear support element to hold and/or support multiple ceiling elements. Furthermore, the linear support element is fabricated in a manner for differently positioning the ceiling panels with respect to the ceiling grid plane. Additionally, each of the linear support element is fabricated from various elements (i.e., linear and lateral linear support elements). For example, the various elements can be continuous straight or curved bars, beams, planks, and the like. Optionally, the various elements can be detachably coupled for forming the at least one linear support element. Alternatively, the linear support element has monolithic structures i.e., a continuous structure that is fashioned out of a block; furthermore, the block can be block of metal, alloy, plastics material, wood, and the like. Additionally, materials for manufacturing the linear support element may include metals, metal alloys, hardened polyvinyl materials, and the like. Furthermore, the various elements are positioned linearly and laterally to form a structure that enables the at least one linear support element to hold plurality of ceiling panel and electrically and/or electronically operated ceiling device. Furthermore, the various elements are positioned linearly and laterally, to form a recess structure to accommodate the plurality of ceiling panels and electrically and/or electronically operated ceiling devices.

The term "lighting module" refers to a lighting arrangement comprising various electrical and/or electronic components for providing different types and intensities of illumination to the associated room, wherein the lighting module is accommodated within the assembled ceiling grid system. The lighting module body is comprised of a linear support element with end plates or covering elements mounted to each of its elongate ends. For example, different types of electrical and/or electronic components include, but is not limited to, light sources such as LEDs, at least one optical element such as a light guide, lens, diffuser, reflector and so forth. Some lighting module embodiments described in the present application enable unique ceiling grid assemblies that extend only minimally above the top of the T-Bar array but have optical cavities recessed above the ceiling rid plane. Such ceiling grid assemblies can be mounted very close to structural ceiling if desired to minimize the plenum height.

The present disclosure seeks to provide an improved configurable linear lighting module for a ceiling grid system that is easier to manufacture, install and reconfigure or repair after initial installation (for example to achieve a modified functionality). Further, the improved configurable linear lighting module is inexpensive to manufacture i.e., attributed to the simplified manufacturing and design, easier to recycle or reuse when a building incorporating the ceiling grid system is being dismantled or generally refurbished. Furthermore, the present disclosure seeks to provide an improved configurable linear lighting module for providing an improved control of light fixtures and the power supply to the light fixtures. Furthermore, the present disclosure seeks to provide an improved configurable linear lighting module with a modular functional fixture that is capable of accommodating various objects such as optical elements, utility elements, light sources, power modules, speakers, and the like. Furthermore, the present disclosure seeks to provide an improved, robust and flexible lighting module by virtue of operation to cope with varying user requirements. Moreover, the present disclosure also seeks to provide an improved energy-efficient ceiling grid lighting assembly. Furthermore, the present disclosure also seems to provide a lighting module that functions like a light fixture having a unique performance and aesthetic benefits and comprises of lighting components that integrate with the ceiling grid T-Bars, which provide structural support, and the plurality of ceiling panels which in some embodiments provide light reflectance and light distribution control. The present disclosure, in some embodiments, provides a light distributing reflective cavity that includes a reflective panel; either a standard ceiling panel or an embodiment with customized reflectance properties (specular or diffuse surface, surface texture, surface geometric features, etc.) Moreover, in the present disclosure, the embodiments can be configured to create a lighting cavity, at, below, or above the ceiling grid plane.

Embodiments of the present disclosure substantially eliminate, or at least partially address, the aforementioned problems in the prior art, and provide an improved lighting assembly to provide more uniform light distribution patterns that mitigate visual discomfort and are aesthetically appealing to a given viewer. Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. When illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by matching numbers.

Embodiments of the present disclosure will now be described, by way of example only, with reference to the following diagrams:

FIG. 11A showing a rigid linear LED board and FIG. 11B showing a flexible strip provided on a reel and which can be cut to a required length.

FIG. 11D is table containing optical properties of various embodiments of edgelit optical elements.

DETAILED DESCRIPTION

Figure 1A:
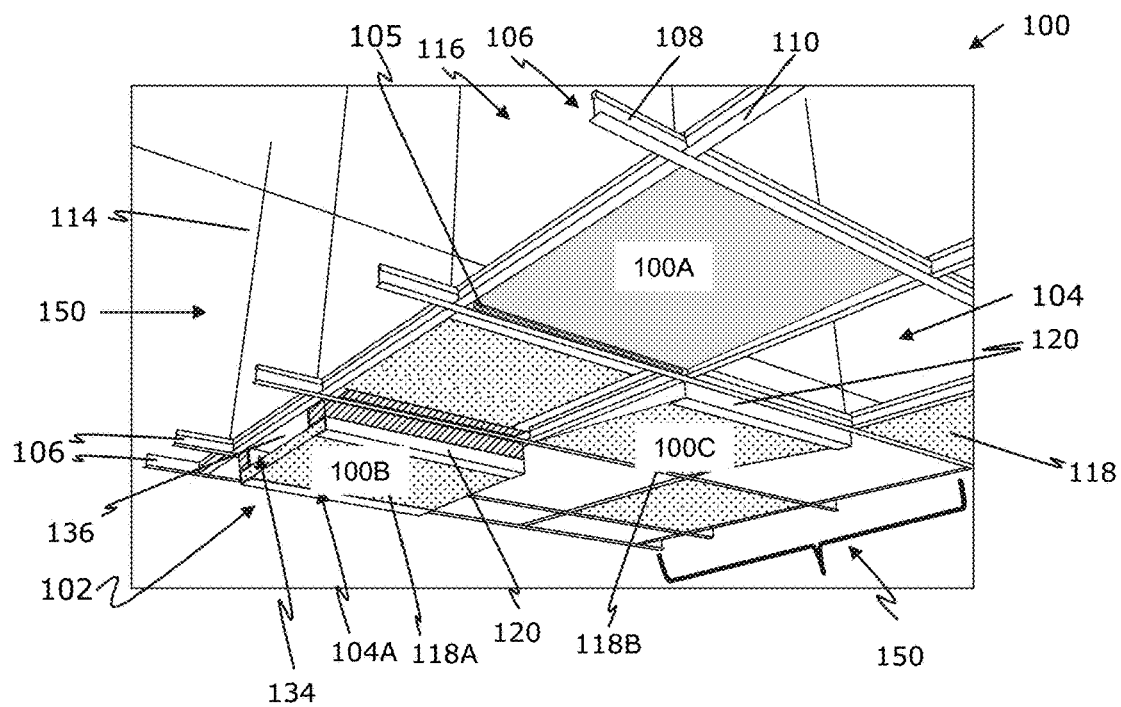
FIG. 1A is an illustration of a ceiling grid system, in accordance with an embodiment of the present disclosure.

The following detailed description illustrates embodiments of the present disclosure and ways in which they can be implemented. In overview, embodiments of the present disclosure are concerned with a lighting assembly to provide an aesthetically appealing appearance to the ceiling grid system and its associated lighting assembly and for providing various light distribution patterns in an environment.

Although some modes of carrying out the present disclosure have been disclosed, those skilled in the art would recognize that other embodiments for carrying out or practicing the present disclosure are also possible. Furthermore, the embodiments of the present disclosure also provide a lighting assembly which either replaces one or more T-Bars in a given ceiling grid cell or is supported by a T-Bar such as by mounting over the vertical leg of the T-Bar or by sliding along and receiving the horizontal leg of the given T-Bar.

Labeled items of illustrated lighting assembly embodiments FIGS. 7-17 are as follows wherein "XX" indicates the Figure number;

100 Ceiling Grid System
106 T-Bar
107 T-Bar Height ("Zero Plenum Height")
108 T-Bar Horizontal Portion
110 T-Bar Vertical Portion
111 T-Bar Anchor
116 Structural Ceiling
117 Surrounding Ceiling Panel
120 Suspension Cable or Wire
XX00 Ceiling Grid Lighting Assembly
XX01 Linear Lighting Module
XX02 Linear Support Element
XX03 T-Bar Feature on Linear Support Element
XX04 Support feature of Linear Support Element
XX05 Optical Assembly (LED, Board, Optics)
XX06 Printed Circuit Board (PCB)
XX07 Light Emitting Diode (LED)
XX08 Primary Optical Element
XX09 Reflector
XX10 Secondary lens
XX12 Ceiling Grid Plane
XX13 Electrical Connector
XX15 Outer optical lens
XX14 Optical Cavity
XX16 Covering Element
XX18 Assembly ceiling panel
XX20 End Plate or End Cap
XX21 End Plate Hole
XX22 T-Bar Mounting Feature or Bracket
XX24 Ceiling Panel Support Feature
XX26 Power Source/Driver
XX28 Utility Component
XX30 Optical Element Light Distribution
XX57 Non-Optical Cavity
532 T-bar Hole
534 Fastener
536 Vertical Alignment Tab Typically, an optical element comprises at least one of: a light guide, an edgelit diffuser, a direct lit diffuser, a reflector, a refractive lens, a diffractive lens. As represented, a light guide is an optical element which has one or more input faces along its edges into which light from a light source enters and utilizes internal reflection to propagate a portion of light within the optical element by multiple internal reflections while simultaneously outcoupling a portion of light, typically light guides have high transmission (>90%), low haze (<1%) and high clarity (>99%). An edge-lit diffuser is also lit from one or more of its edges but its primary function is to diffuse or scatter any light that enters into its bulk material. An edge-lit diffuser significantly has much lower clarity than a light guide (typically less than 50%) and much higher haze (typically more than 50%). The edge-lit diffuser can further comprise a combination of internal light scattering and light redirecting surface features. The light redirecting features may be regular, such as lines or ridges, or could be a random pattern. Edgelit diffusers also typically have much high lower levels of surface gloss than light guides. This is because the outer surfaces are not required to allow total internal reflection as is the case with light guide materials. In other embodiments, the optical element can be implemented as a bent mirror that reflects light incident thereon along a first path (and at a first angle) along a second path (and at a second angle) different from the first path. A direct lit diffuser is another optical element wherein light is incident upon the largest area face of the optical element and light is transmitted through the direct lit diffuser lens that scatters light, diffuses light or enables reduction in intensity of light.

Embodiment light sources in the ceiling grid lighting assembly embodiments of comprise at least one of a LED light, an incandescent light, a monochromatic light, a laser, and a combination thereof. The most typical embodiments are of a linear array of LED light sources arranged on LED boards which can be rigid printed circuit board (PCB) or flexible and selectively cut to length in a "tape-like" format.

Figure 1B:
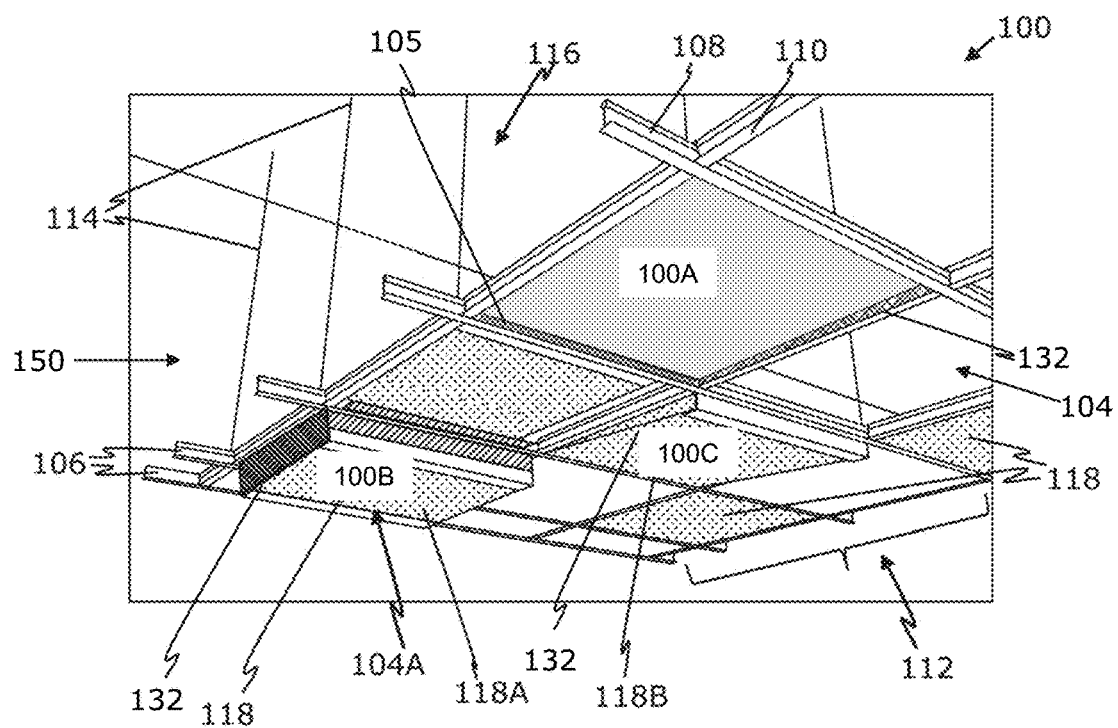
FIG. 1B is an illustration of the ceiling grid system, comprising at least one covering element, in accordance with an embodiment of the present disclosure.

FIG. 1A and FIG. 1B are illustrations of an overall ceiling grid system (also referred to as a suspended ceiling system), which contains various embodiments 100A, 100B and 100C of the modular ceiling grid lighting assembly wherein FIG. 1A shows embodiment assemblies without covering elements and FIG. 1B shows embodiment assemblies with covering elements. Notably, the differentiating feature of FIG. 1B of the present disclosure is depicted with a closed or covered perspective view whereas the open view (i.e., FIG. 1A) is illustrated to depict the common configuration therein and thus illustrates a view that does not cover any openings or gaps in the ceiling grid system 100.

The ceiling grid system comprises the plurality of ceiling panels 118, wherein the plurality of ceiling panels 118 are arranged in the array of cells 104 defined by the T-Bars 106. Typically, the series of openings formed by the T-Bars 106 are in an array i.e., the series of openings are formed in a number of grids of rows and columns. In an example, the grid of openings may include 20 rows and 50 columns. In another example, the grid of openings may include 10 rows and 100 columns. Further, the array of cells 104 is a parallelepiped lattice formed by the arrangement of the T-Bars 106. Moreover, the flat vertical portion 110 of the T-Bars 106 may form the boundary of the opening of the ceiling grid system 100, wherein the plurality of ceiling panels 118 are positioned. Furthermore, a structure of the array of T-Bar cells 104 may include ceiling panels having rectangular shapes, square shapes, rectangular shapes, rhombic shapes, and so forth.

The ceiling grid system 100 comprises several ceiling grid lighting assemblies 101 (later shown in greater detail of various embodiments) for providing the required illumination in the room or structure within which the ceiling grid system 100 is located. Typically, the ceiling grid lighting assembly 100 comprises the linear lighting module comprising a linear support element 102 with integrated or removable optical assemblies 105 to be supported by the ceiling grid T-Bars 106 and configured to provide illumination to the room associated with the ceiling grid system.

As shown, in FIG. 1A and 1B, the ceiling grid system comprises an array of T-Bar cells 104 having ceiling grid T-Bars 106 (also referred to as T-Bars), wherein each of the ceiling grid T-Bars 106 have flat end-portions i.e., horizontal portions 110 and vertical portions 108. Further, the plane containing the horizontal portions 110 of the ceiling grid T-Bars 106 defines a ceiling grid plane 112, wherein the ceiling grid plane 112 also defines the array of T-Bar cells 104. Notably, the ceiling grid plane 112 defining the T-Bar cells 104 are configured to accommodate a plurality of ceiling tiles 118 therein, wherein each T-Bar cell comprises one or more ceiling panels of the plurality of ceiling panels 118. Moreover, the ceiling grid system also comprises hanging wires 114 coupled to a structural ceiling 116 configured for providing structural integrity to the ceiling grid system.

Further shown, in FIG. 1A and 1B, the linear support element 102 within the ceiling grid system couples to at least one T-Bar cell 104A within the T-Bar grid array 104 (also referred to as the array of T-Bar cells) that provides structural integrity to the ceiling grid lighting assembly 101. Typically, the at least one T-Bar cell 104A is configured to provide structural integrity the linear support element 102 by firmly and reliably accommodating the ceiling grid lighting assembly 100 therein. Since, the linear support element 102 is directly supported by the at least one T-Bar cell 104A, the ceiling grid lighting assembly 101 is more reliable and safer to use due to the high structural integrity imparted to the ceiling grid lighting assembly 101 via the at least one T-Bar cell 104A of the array of T-Bar cells 104.

Further shown, in FIG. 1A and 1B, the ceiling grid lighting assembly 100 further comprises at least one assembly ceiling panel 118A associated with the at least one T-Bar cell 104A. Typically, each of the at least one assembly ceiling panel 118A is associated with each of the at least one T-Bar cell 104A of the T-Bar cells array 104. Herein, the at least one T-Bar cell 104A is configured to accommodate the at least one assembly ceiling panel 118A, wherein specifically the horizontal portions 110 of the T-Bars 106 of the at least one T-Bar cell 104A is configured to support the at least one assembly ceiling panel 118A. Alternatively stated, the at least one T-Bar cell 104A of the array of T-Bar cells 104 is configured to accommodate each of the at least one assembly ceiling panel 118A therein.

In an embodiment, the at least one assembly ceiling panel 118A is one of a standard ceiling panel, an acoustic ceiling panel, a decorative tile, a planar reflective panel or a non-planar reflective panel. Typically, the at least one assembly ceiling panel 118A are selected from one of the aforementioned types of ceiling panels based on the requirement of the implementation. In an example, the at least one central ceiling tile 118A may be a decorative tile for aesthetic appearance of the ceiling grid. In another example, the at least one central ceiling tile 118A may be a reflective panel configured to reflect incoming light from any light source for improved illumination and so forth.

In another embodiment, the at least one assembly ceiling panel 118A includes a reflective surface having one of an optical property: specular, diffuse, surface texture, redirecting light. Typically, the at least one assembly ceiling panel 118A comprises a reflective surface i.e., a surface capable of reflecting incident light, wherein the reflective surface comprises one of an optical property. Notably, the at least one assembly ceiling panel 118A may comprise more than one optical property. For example, the at least one assembly ceiling panel 118A may comprise the optical properties diffuse and redirecting light i.e., the at least one assembly ceiling panel 118A is enabled to diffuse and/or redirect incident light. Optionally, the at least one assembly ceiling panel 118A comprises the reflective surface, wherein the reflective surface comprises at least one of a colored surface, a textured surface. For example, the reflective surface of the at least one assembly ceiling panel 118A comprises a blue-colored surface. In another example, the reflective surface of the at least one assembly ceiling panel 118A comprises an angularly textured surface (such as, a surface that is configured to reflect light only when the light is incident thereon at specific angles. Optionally, such reflective surfaces are configured to reflect the light such that the light is scattered at different angles therefrom). It will be appreciated that such reflection and scattering of the incident of light in different colors and along different paths, enables to provide an aesthetically appealing ambiance within a room wherein the ceiling grid system is installed. Furthermore, such a reflection of the incident light that may be emitted from natural sources, reduces a requirement for providing artificial light within the room, thereby, allowing to reduce energy consumption (and consequently, cost thereof) for lighting purposes within the room. Optionally, the reflective surface comprises a textured surface, wherein the textured surface comprises at least one of: a light-diffusing surface, a specular surface, and/or angularly textured surface.

The ceiling grid lighting assembly further comprises at least one linear support element 102 configured to be arranged parallel to an edge of the ceiling grid T-Bars 106 defining the at least one T-Bar cell 104A, wherein the at least one linear support element 102 is configured to support the at least one assembly ceiling panel 118A above the ceiling grid plane 112 and parallel or inclined to the ceiling grid plane 112 to form a central optical cavity 122 within the at least one T-Bar cell 104A. Typically, the at least one linear support element 102 (or the linear support element) is arranged parallel to the edge of the ceiling grid T-Bars 106 defining the at least one T-Bar cell 104A and configured to support the at least one ceiling panel 118A above the ceiling grid plane 112 i.e., the at least one ceiling panel 118A is located completely above the ceiling grid plane 112. Typically, the edge of the ceiling grid T-Bars 106 may be the horizontal portion 110 of the ceiling grid T-Bar 106, wherein the linear support element 102 extends along and parallel to the edge of the T-Bars 106. Moreover, the at least one linear support element 102 is also configured to support the at least one assembly ceiling panel 118A in either a parallel manner or an inclined manner i.e., the at least one ceiling panel 118A is inclined at a desired angle above the ceiling grid plane 112 or placed parallelly to the ceiling grid plane 112 depending upon the implementation.

Further, as shown in FIGS. 1A and 1B, the at least one linear support element 102 is mounted in operation on the ceiling grid T-Bars 106, wherein the at least one linear support element 102 is configured to support the plurality of ceiling panels 118 thereon along with the T-Bars 106. The at least one linear support element 102, when in operation, supports the at least one assembly ceiling panel 118A higher than the ceiling grid plane 112. Specifically, the at least one linear support element 102 hold the edges of the at least one assembly ceiling panel 118A in a manner that the position of the at least one assembly ceiling panel 118A is raised relative to the ceiling grid plane 112. Furthermore, the position of the at least one ceiling panel 118A that is higher than the ceiling grid plane 112 can be defined as a condition, wherein an axis of abscissas of the at least one ceiling panel 118A is parallel to an axis of abscissas of the ceiling grid plane 112 when measured in a plane cartesian coordinate system. Optionally, the at least one ceiling panel 118A higher than the ceiling grid plane 112 includes a height that is more than a height of the ceiling grid plane 112. It will be appreciated that the heights of the at least one ceiling panel 118A and the ceiling grid plane 112 are measured from the floor of the given room. For example, the height of the at least one at least one assembly ceiling panel 118A may be 2.25 meters from the floor. In such an example, the at least one linear support element 102 holds the at least one assembly ceiling panel 118A at a height of 2.30 meters from the floor of the room. Beneficially, such a provision of support from the at least one linear support element 102 enables the at least one assembly ceiling panel 118A to be oriented either parallel to the ceiling grid plane 112 or inclined at a desired angle with respect to the ceiling grid plane 112, wherein the angle ranges from 0 to 90 degrees.

The at least one linear support element 102, when in operation, supports the at least one assembly ceiling panel 118A of the at least one assembly ceiling panel 118A at a tilted angle relative the ceiling grid plane 112. Optionally, the at least one linear support element 102 holds an edge of the at least one assembly ceiling panel 118A at a position that is higher than the ceiling grid plane 112 and another edge of the at least one assembly ceiling panel 118A at a position that is lower than the ceiling grid plane 112. Optionally, the at least one linear support element 102 holds an edge of the at least one assembly ceiling panel 118A a position that is higher than the ceiling grid plane 112 and another edge of the at least one assembly ceiling panel 118A is held on the ceiling grid plane 112. More optionally, the at least one linear support element 102 holds an edge of the at least one assembly ceiling panel 118A at a position that is lower than the ceiling grid plane 112 and another edge of the at least one assembly ceiling panel 118A is held on the ceiling grid plane 112. In an example, wherein the at least one linear support element 102 holds the at least one assembly ceiling panel 118A at a tilted angle relative to the ceiling grid plane 112, wherein a height of at least one edge of the at least one assembly ceiling panel 118A will be more than a height of the ceiling grid plane 112, and a height of at least one edge will be less than a height of the ceiling grid plane 112. Moreover, the edge having the greater height from the ceiling grid plane 112 is located opposite to the edge having the lesser height from the ceiling grid plane 112. For example, the height of the at least one assembly ceiling panel 118A may be 2.25 meters from the floor. In such an example, the at least one linear support element 102 holds the at least one assembly ceiling panel 118A in a manner that an edge of the at least one assembly ceiling panel 118A is at a height of 2.30 meters, and the opposite edge is at a height of 2.20 meters from the floor of the room, respectively.

However, it will be appreciated that the positioning and inclination of the at least one assembly ceiling panel 118A with respect to the ceiling grid plane 112 may be beneficially varied without limiting the scope of the disclosure. Alternatively stated, the ceiling grid lighting assembly incorporates linear lighting modules 101 comprising the linear support element 102 that, when in operation, supports the at least one assembly ceiling panel 118A of the plurality of ceiling panels 118 in at least one of higher than the ceiling grid plane 112, lower than the ceiling grid plane 112 and at a tilted angle relative to the ceiling grid plane 112.

The at least one linear support element 102, when in operation, supports the at least one central panel 118A lower than the ceiling grid plane 112. Specifically, the at least one linear support element 102 holds the edges of the at least one assembly ceiling panel 118A in a manner that the position of the at least one assembly ceiling panel 118A is lowered than the ceiling grid plane 112. Furthermore, the position of the at least one ceiling panel 118A that is lower than the ceiling plane 112 can be defined as a condition wherein an axis of abscissas of the at least one ceiling panel is parallel to an axis of abscissas of the ceiling grid plane 112 when measured in a plane cartesian coordinate system. Optionally, the at least one assembly ceiling panel 118A that is lower than the ceiling grid plane 112 includes a height that is less than a height of the ceiling grid plane 112. It will be appreciated that the heights of the at least one assembly ceiling panel 118A and the ceiling grid plane 112 is measured from the floor of the room. For example, the height of the at least one assembly ceiling panel 118A may be 2.25 meters from the floor. In such an example, the at least one linear support element 102 holds, namely supports, the at least one assembly ceiling panel 118A at a height of 2.20 meters from the floor of the room.

The at least one assembly ceiling panel 118A of the plurality of ceiling panels 118, supported by the at least one linear support element 102 is configured (namely arranged when in operation) to provide a three-dimensional appearance to the ceiling grid system 100. The plurality of ceiling panels 118 and the electrically and/or electronically operated ceiling devices are optionally arranged in a manner that their respective positions are higher than the ceiling grid plane 112, lower than the ceiling grid plane 112, or at a tilted angle relative to the ceiling grid plane 112; in such an example, the three-dimensional appearance to the ceiling grid system is achieved. The at least one linear support element 102 accommodates the plurality of ceiling panels 118 and electrically and/or electronically operated ceiling devices in a manner that, when in operation, the ceiling grid system 100 comprises a three-dimensional view when viewed from plurality of locations within the room. It will be appreciated that, the three-dimensional appearance of the ceiling grid system refers to a view, wherein the ceiling grid system appears to include protrusions and indentions in height, weight, and length.

In an embodiment, the at least one linear support element 102 is detachably coupled to the ceiling grid T-Bars 106. Typically, the at least one linear support element 102 forms a detachable coupling with the ceiling grid T-Bars 106, and thus allows a quick and easy replacement of any of the coupled ceiling grid-T-Bars 106 without replacing the entire ceiling grid system 100.

In an embodiment, the at least one linear support element 102 comprises a clip, bracket, or latch to detachably couple with the ceiling grid T-Bars 106. Typically, the clip, bracket or latch of the at least one linear support element 102 is configured to provide the detachable coupling with the T-Bars 106. The ceiling grid lighting assembly of the present disclosure eliminates a need and cost for brackets or other mounting or suspension hardware and does not require any cutting of ceiling panels in the ceiling grid arrangement. The ceiling grid lighting assembly allows to provide for the length of the light fixture that matches the length of the T-Bar, or it could be lesser or greater than the length as desired for aesthetic purposes. Furthermore, the present ceiling grid lighting assembly 101 provides for fixtures of shorter lengths that could be used together to provide a configurable overall length, and further can be used to combine fixtures such as spotlights and wall washers.

As shown in FIG. 1B, the ceiling grid lighting assembly 100 further comprises at least one covering element 132 arranged proximate to the linear support element 102 to conceal (or cover) an opening 134 in the central optical cavity 122. The linear support element 102 is configured to provide support to the covering element 132 for covering and/or concealing the opening 134 formed in the central optical cavity 122. Notably, the at least one covering element 132 is either arranged proximate to or adjacent to the linear support element 102 to be supported thereat or arranged on the linear support element 102 for direct support provision for the at least one covering element 132. Optionally, the at least one covering element 132 may be supported by the ceiling grid T-Bars 106 or the at least one assembly ceiling panel 118A. The term "at least one covering element" refers to a type of object configured to be, or to serve, as a covering of a desired space or object. For example, the at least one covering element 132 is configured to cover at least the opening 134 in the central opening cavity 122. Notably, the at least one covering element 134 does not have a definite shape or size and is varied depending upon the need of the implementation i.e., the shape and size of the openings 134 present in the ceiling grid system. Generally, the shape and size of the at least one covering element 132 is equal to the size and shape of the opening 134; However, the size and shape of the at least one covering element 132 may be different from the size and shape of the opening 134, namely the size may be larger or smaller than the opening 134 to cover the opening 134 entirely or partially, respectively. Moreover, in case of a larger size of the at least one covering element 132, it may extend to the other nearby ceiling elements to provide increased coverage and protection. Typically, whenever the at least one linear support element 102 is implemented within the ceiling grid system, to either, lower, raise or tilt the at least one assembly ceiling panel 118A with respect to the ceiling grid plane 112, the opening 134 in the central optical cavity 122 is formed. However, the opening 134 may be formed in other manners as well without limiting the scope of the disclosure. However, such openings 134 are not preferred since it allows the bare ceiling grid array 104 and the ceiling grid T-Bars 106 to be seen (by an observer on the ground) and provides an unaesthetic and/or un-appeasing look to the ceiling grid system 100. Further, such openings 134, gaps or holes reduce the structural integrity of the ceiling grid system 100. Moreover, the opening 134 may also result in collection of dust-particles and other contaminants entering via the opening 134. Thus, to overcome the aforementioned problem, the ceiling grid lighting assembly 100 further comprises the at least one covering element 132 to conceal the opening 134 in the central optical cavity 122 to beneficially provide a monotonous, aesthetically appeasing look and at the same time increases the structural integrity of the ceiling grid system and/or the ceiling grid lighting assembly 100. Optionally, the covering element 132 may also enable an air-tight formation of the ceiling grid system and/or the ceiling grid lighting assembly 100 that does not allow air to pass through and prevent flow of dust particles therein.

In an embodiment, the opening 134 in the central optical cavity 122 is configured by a gap 136 between the assembly ceiling panel 118A and the surrounding ceiling panels 117B or the assembly ceiling panel 118A and a ceiling mount. Typically, the opening 134 in the central optical cavity 122 is formed when the location and/or orientation of the assembly ceiling panel 118A is varied with respect to the ceiling grid plane 112 and wherein, the opening 134 is configured by the gap 136 between the at least one assembly ceiling panel 118A and the surrounding ceiling panels 117B or the at least one assembly ceiling panel 118A and a ceiling mount. The gap 136 is formed (as visible by an observer on the ground) between two neighboring ceiling elements and is required to be covered using the at least one covering element 132. Specifically, the gap 136 defines the shape and size of the covering element 132 such that the covering element 132 completely covers the opening 134 in the central cavity 122 and does not leave any holes, gaps or openings in the ceiling grid system. The "ceiling mount" refers to different types of mountings applied to the structural ceiling 116 instead of the conventional ceiling panel for a desired functioning and operation of the ceiling grid system. The ceiling mount may be replaced instead of the assembly ceiling panel 118A using one of a decorative mount, a functional mount, or a mounting device and the like depending upon the implementation. For example, the ceiling mount may be a decorative tile, an exhaust or intake vent, a ceiling fan, a ceiling air conditioner, a ceiling glass and the like to at least cover the opening 134 in the central optical cavity 122 and optionally, at the same time, perform other desired operations.

In an embodiment, the least one covering element 132 is configured to have a size conforming to a shape of the gap 136 or bigger than the gap 136. Generally, the shape and size of the covering element 132 is bigger than the gap 136 to effectively cover the opening 134 and provide the desired aesthetic look as a result. The bigger size of the at least one covering element 132 enables other ceiling elements such as, the PCB with light source, the optical element or other utility components, to be supported by the at least one covering element. Moreover, an extended portion i.e., the portion of the at least one member left after covering the opening 134 in the central optical cavity may comprise a different material and/or property with respect to the portion of the at least one covering element 132 conforming to the shape of the gap 136, such that the extended portion may provide an improved design or increase the optical characteristics of the optical element light distribution 130.

Optionally, the at least one covering element 132 is configured to have a size smaller than the gap 136 such that the opening 134 or the gap 136 is only partially covered such that a space for implementing another ceiling element or device may be provided and also to enable ventilation in the room containing the ceiling grid system.

In an embodiment, the at least one covering element 132 is integral with the linear support element 102 or detachably coupled to the linear support element 102. The at least one cover member 132 is formed integrally with linear support element 102 such that the at least one covering element 132 is formed integrally with the linear support element i.e., forms a common element configured to cover the opening 134 in the central optical cavity 122 and at the same time support the at least one central panel 118A thereon. Such an integral arrangement increases the structural integrity and robustness of the ceiling grid system, reduces the installation time and thus, enables a quick setup and maintenance of the ceiling grid system and ceiling elements therein. Moreover, optionally, the at least one covering element 132 is detachably coupled to the linear support element 102. Typically, the at least one linear support element 102 forms a detachable coupling with the ceiling grid T-Bars 106, and thus allows easy replacement of any of the coupled ceiling grid-T-Bars 106 without replacing the entire ceiling grid system. Moreover, such a detachable arrangement allows for a quick and cost-effective replacement process and removes the need for replacing the entire ceiling grid lighting assembly 100.

In an embodiment, the at least one covering element 132 is arranged proximate to the linear support element 102 at an angle perpendicular or oblique to the ceiling grid plane 112. Typically, the at least one covering element 132 may be arranged and oriented with respect to the ceiling grid plane based on the need of the implementation proximate to the linear support element to effectively cover the opening 134 in the central cavity 122. Herein, the at least one covering element 132 is located perpendicular or oblique to the ceiling grid plane 112 such that the opening 134 formed due to lowering, raising, or tilting of the at least one assembly ceiling panel 118A via the linear support element 102 is effectively covered. However, it will be appreciated that the size, orientation, and placement of the at least one covering element 132 is changed without limiting the scope of the disclosure. For example, the at least one covering element 132 is arranged parallel to the ceiling grid plane 112. Notably, the placement and orientation of the at least one covering element 132 is beneficially varied to improve the optical element light distribution 130 via the light assembly 102 such as by providing the at least one covering element 132 having one or more optical properties such as, reflection or specular reflection properties such that the optical element light distribution 130 may be focused or spread across the room containing the ceiling grid system.

In an embodiment, the at least one covering element 132 includes a planer shape, an arcuate shape or any combination thereof. Typically, the shape of the gap 136 defines the shape and size of the opening 134 in the central optical cavity 122 and thus, to effectively cover the opening 134, the at least one covering element 132 includes multiple shapes and sizes comprising a planar shape (such as a quadrilateral shape, a triangular shape or any other polygonal shape), an arcuate shape (such as, a circular shape, a semi-circular shape, paraboloid shape, a hyperboloid shape and the like), any other curved shape that may be formed by the combination of two or more of the following shapes. The arcuate configuration comprises any curved shape that may or may not be irregular and/or symmetrical, wherein the arcuate shape and size of the at least one covering element 132 is defined by the gap 136. Additionally, optionally, the at least one covering element 132 comprises one or more patterns and/or protrusions on its surface. Such protrusions and patterns are designed in a manner so as to provide an improvised look to the ceiling grid system or the ceiling grid lighting assembly 100 and at the same time provide options to the user for selection of the covering element 132 apart from the conventional size, shape and material considerations.

In an embodiment, the at least one covering element 132 comprises at least one of an optical property of refraction, absorption, diffusion, reflection or scattering of the incident light. Typically, the at least one covering element 132 may be used in conjunction with other elements such as, the PCB light 1106 (with light source), the optical element 304 and so forth; and thus, may be required to inhibit an optical property to beneficially provide a desired illumination therein. The optical property is at least one of refraction, absorption, diffusion, reflection or scattering of the light and wherein one or more of the optical properties of the at least one covering element 132 may be used in conjunction with other ceiling elements as per the need of the implementation. Optionally, the at least one covering element 132 comprises a reflective surface i.e., a surface capable of reflecting incident light, wherein the reflective surface comprises one of an optical property. Notably, the at least one covering element 132 may comprise more than one optical property. For example, the at least one covering element 132 may comprise the optical properties diffusing, scattering, and redirecting light i.e., the at least one covering element 132 is enabled to diffuse and/or redirect incident light. Optionally, the at least one covering element 132 comprises the reflective surface, wherein the reflective surface comprises at least one of a colored surface, a textured surface. For example, the reflective surface of the covering element 132 comprises a blue-colored surface. In another example, the reflective surface of the at least one covering element 132 comprises an angularly textured surface (such as, a surface that is configured to reflect light only when the light is incident thereon at specific angles. Optionally, such reflective surfaces are configured to reflect the light such that the light is scattered at different angles therefrom). It will be appreciated that such reflection and scattering of the incident of light in different colors and along different paths, enables to provide an aesthetically appealing ambiance within a room wherein the ceiling grid system is installed. Furthermore, such a reflection of the incident light that may be emitted from natural sources, reduces a requirement for providing artificial light within the room, thereby, allowing to reduce energy consumption (and consequently, cost thereof) for lighting purposes within the room. Optionally, the covering element 132 comprises a textured surface, wherein the textured surface comprises at least one of: a light-diffusing surface, a specular surface, and/or angularly textured surface. Optionally, the covering element 132 comprises one or more protrusions thereon that may be used for an aesthetic appeal or for providing further reflection to the incoming light in multiple directions.

In an embodiment, the least one covering element 132 is one of a standard ceiling panel, an acoustic ceiling panel, a decorative tile, a planar reflective panel or a non-planar reflective panel. Typically, the at least one covering element 132 is formed using at least a portion of the standard ceiling panel, wherein the portion of the standard ceiling panel is shaped, and size based on the gap 136 and/or the opening 134. Further, the at least one covering element 132 may be formed using the acoustic ceiling panel that are placed and oriented strategically to improve overall light and sound quality, eliminate or at least reduce the residual sounds, act as absorbers and diffusers of sound and/or light for improving sound intelligibility. Furthermore, the at least one covering element 132 may be formed using a reflective or non-reflective panel depending upon the implementation i.e., the at least one covering element 132 may further reflect light to improve the optical element light distribution 130 or may not reflect light to prevent unwanted optical element light distribution 130 or to configure the optical element light distribution 130 via the placement and orientation of the at least one covering element 132.

In an embodiment, the least one covering element 132 is made of plastic, metal, glass, rubber, paper, wood or any combination thereof. The at least one covering element 132 can be made from a variety of materials depending upon the need of the implementation. For example, the at least one covering element 132 may be formed using a plastic (that comprises one or more polymers therein) such as PET, PVC and the like, a metal or a metal alloy such as iron, steel, aluminum, copper and the like, a glass such as, a transparent or see-through glass, a designer glass, an opaque glass and the like, a rubber such as neoprene rubber, silicon rubber, nitrile rubber, fluorosilicone rubber and the like, a wood such as, softwood or hardwood or any combination thereof to provide a sturdy and robust covering element 132 or a flexible covering element. Furthermore, the covering element 132 may incorporate additional features to enable it to be connected to the linear support element or the T-Bar. The covering element 132 might also have features, such as tabs or holes, that may enable it to be attached to a cable or wire and suspended from the structural ceiling.

In an embodiment, the ceiling grid lighting assembly 100 further comprising a utility component 128, supported by the at least one covering element 132, selected from a group consisting of an alarm, a sensor, a ventilation fan, a heater, a humidifier, an electronic controller, a battery, a wireless communication module. Typically, apart from the at least one linear support element 102, the at least one covering element 132 is also configured to support the utility component 128 therein. Notably, the utility component 128 may be located either at a back side (or invisible side) of the ceiling grid system, such that after inclusion of the at least one covering element 132, the utility component 128 is beneficially hidden by the at least one covering element 132 or on a front side (or visible side) to effectively support the utility component 128 thereon. Such an arrangement i.e., at the back side of the covering element 132 provides a continuous and aesthetically pleasing look to the ceiling grid system 100 or at the front side to provide additional functionalities to the ceiling grid lighting assembly or the ceiling grid system 100. Optionally, the sensors of the utility component 128 comprises one or more of: a smoke-detector, a proximity sensor, a light sensor, a motion sensor, and a combination thereof. In an example, there is provided a house with a multilevel security arrangement including multiple combinations of utility components 128 implemented within the ceiling grid lighting assembly 100. In the same example, other utility components 128 may also be used in the multilevel security arrangement such as the smoke-detectors may be used to provide an alarm when a fire or burning happens in the house. In another example, proximity sensors and motion sensors are used to detect strangers or movements of objects. In yet another example, light sensors may be used to detect lighting conditions such as ambient light and control the light sources accordingly.

Figure 2:
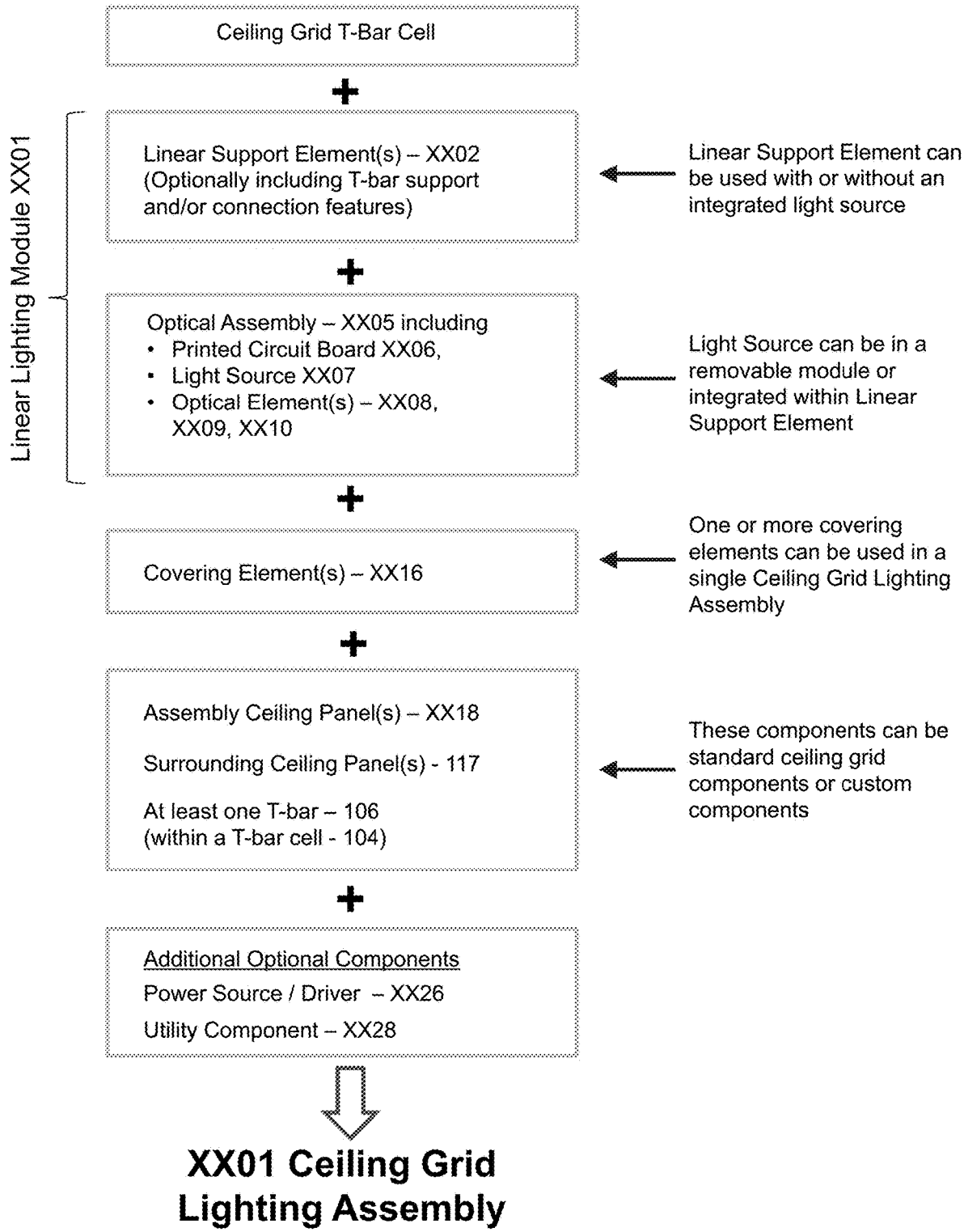
FIG. 2 details the key elements of ceiling grid lighting assembly embodiments.

FIG. 2 is a diagram of key elements of the ceiling grid lighting assembly embodiments illustrated. Assembly ceiling panels, surrounding ceiling panels, and ceiling grid T-Bars are components that can be standard ceiling grid components or custom versions. Linear support elements, PCBs with light sources, and optical elements are key components that can be assembled as individual components or integrated into linear support element which can be selectively fabricated to length to fit particular ceiling grid sizes and shapes.

FIGS. 3-9 are illustrations of exemplary implementations of configurable linear lighting modules and their use in ceiling grid assemblies, in accordance with various embodiments of the present disclosure. For each of the FIGS. 3-9, examples are provided wherein typically, there will be one or more linear lighting modules used in each ceiling grid assembly embodiment with each comprising a linear support element with integrated optical assemblies and one or more end plates or covering elements fixed permanently or temporarily to the elongate end of the linear support element body. Typically covering elements are used on opposing sides of the assembly but with the cross-section view only the front facing covering element is visible and illustrated.

Figure 3A:
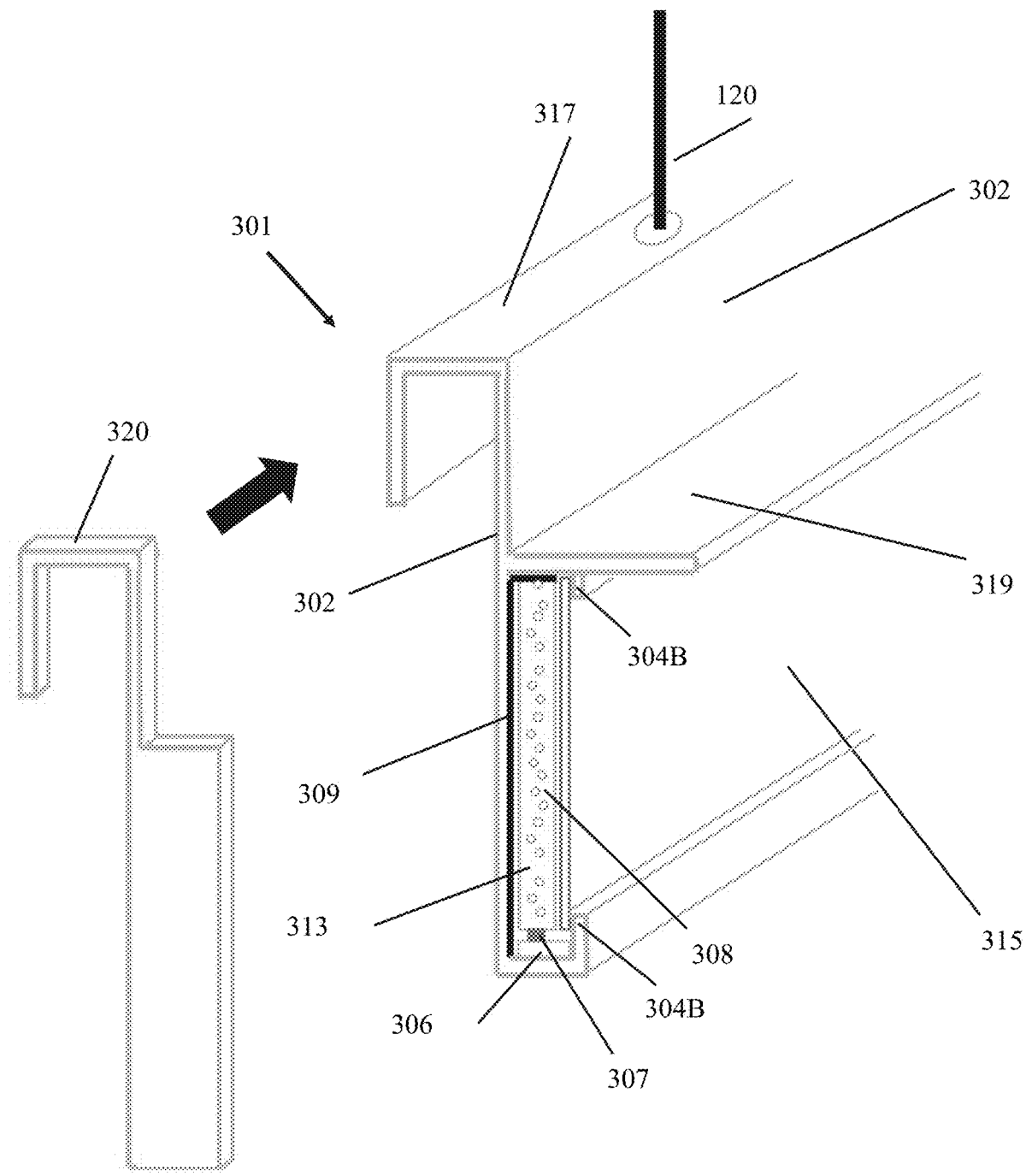
FIG. 3A is a cross section view of a linear lighting module embodiment with end plate removed configured to mount on a T-Bar and support the edge of a ceiling panel at an elevation above the ceiling grid plane.

FIG. 3A is an isometric cross-sectional view of an embodiment of a "single edge lit" linear lighting module 301 with the end plate 320 removed. The end plate is configured to conform to the 3-dimensional cross-sectional profile of the linear support element 302 and is typically fixed with screws or is a push fit onto the end of the linear support element to help eliminate light leakage. The linear lighting module 301 comprises a linear support element 302 that mounts onto a T-Bar using a mounting section 317 incorporated into the elongate profile design that fits over the longitudinal length of a T-Bar vertical portion such that the base of the linear lighting module rests on the horizontal portion of the same T-bar. The linear support element 302 further comprises internal support features 304A and 304B configured to retain and align; a horizontally supported printed circuit board 306 on which are mounted LED light sources 307, a vertically supported edge-lit optical element 308 such as a light guide or low clarity diffuser with a region or layer containing internal light scattering particles 313, a reflector 309 and a secondary optical element that acts as the outer lens 315 such as a light shaping diffuser. The linear support element 302 further comprises a ledge 319 on which a ceiling tile can be supported and the linear support element 302 can be securely attached to the structural ceiling by using a suspension cable or wire 120 that is typically attached to a bracket or through a hole in its elongate body.

Figure 3B:
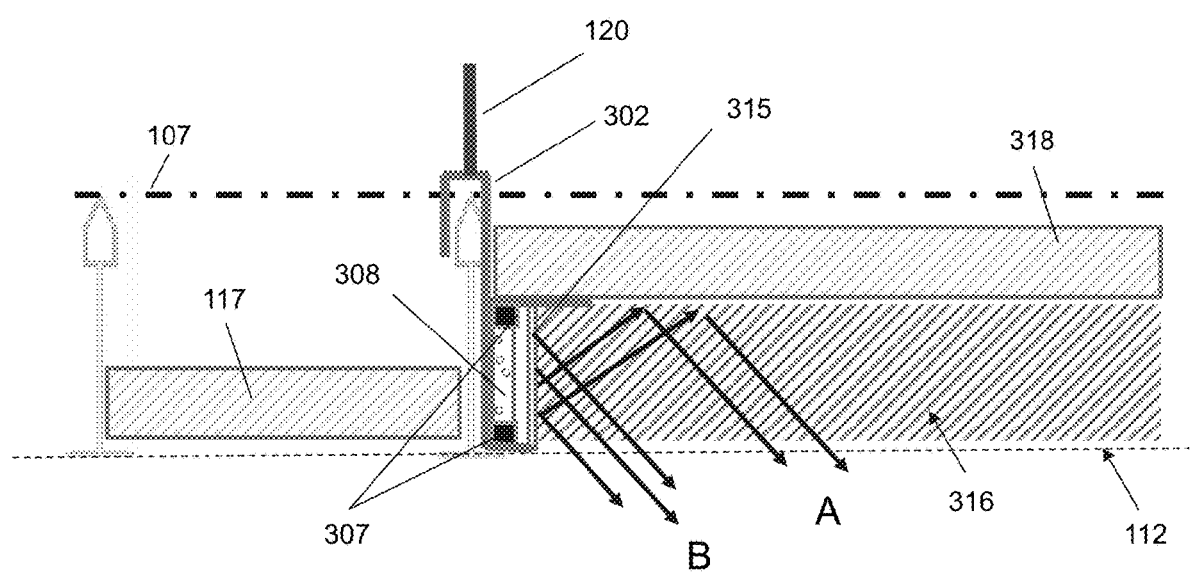
FIG. 3B is a cross section view of a linear lighting module embodiment comprising vertically aligned edgelit optical element.

FIG. 3B illustrates an embodiment similar to that of FIG. 3A in which the optical element 308 is vertically supported with LED light sources 307 positioned on two edges. This "double edge lit" configuration is useful in cases where it is desirable to electrically control the degree of uplight and downlight independently. In this illustration the uplight component A is reflected from the underside of the ceiling panel 318 that forms part of the optical cavity 316 and the downlight component B is directed primarily down into the room below. Further the upper surface of the ceiling tile 318 is supported at a height above the ceiling grid plane 112 and below the height of the T-Bar 107.

Figure 3C:
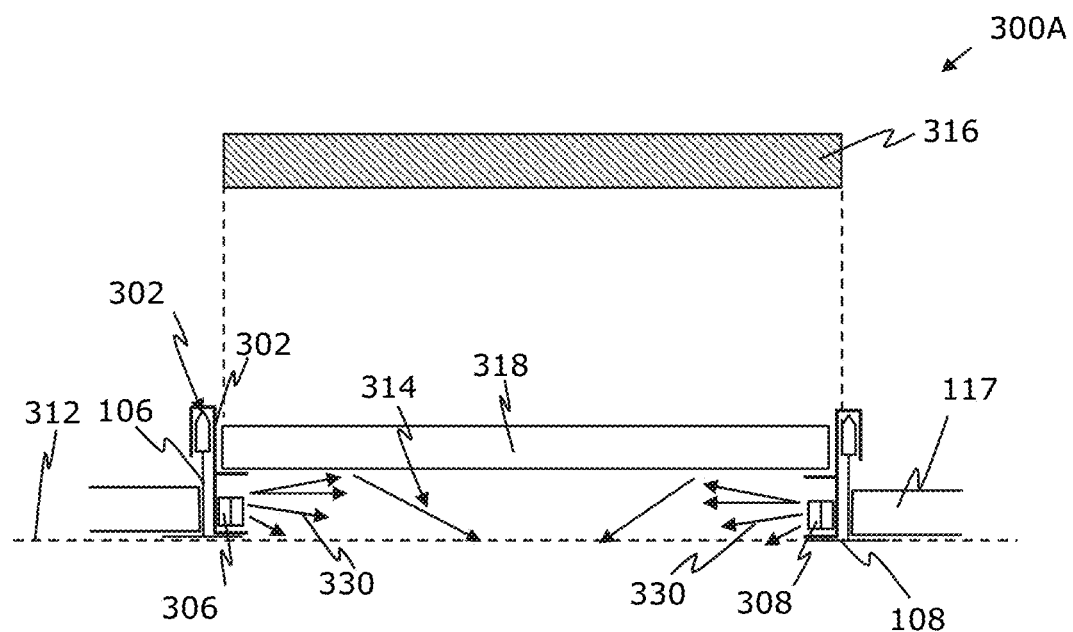
FIGS. 3C-3D are cross section views illustrating a ceiling grid assembly comprising two linear lighting modules similar to FIGS. 3A and 3B, with and without end plate covering element.
Figure 3D:
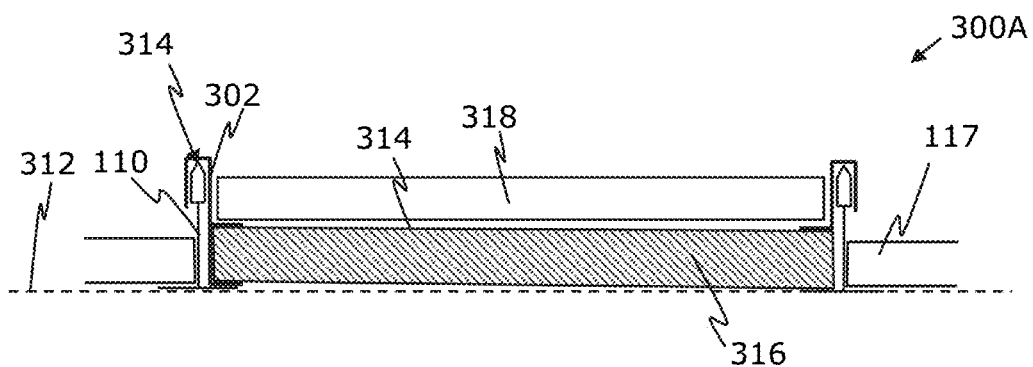

FIGS. 3C-3D are cross section views illustrating variations of ceiling grid lighting assembly embodiment 300A within a suspended ceiling grid system wherein a ceiling panel 318 is supported horizontal alignment above the ceiling grid plane. The ceiling grid lighting assembly 300A comprises at least one T-Bar cell within the T-Bar cell array 104 that provides structural integrity to the ceiling grid lighting assembly 301. FIGS. 3A and FIG. 3B illustrate the ceiling grid lighting assembly with and without a covering element in place, which may or may not be the end plate 316. FIG. 3C shows the covering element or end plate 316 removed and separately positioned above the assembly while FIG. 3D shows the covering element or end plate positioned in place as part of the embodiment 301A lighting assembly wherein it functions to form an enclosing wall of the optical cavity which prevents light from projecting into the ceiling plenum and aids in forming the light distribution that projects out of the optical cavity. Although not visible and shown in the cross-section views of FIGS. 3A-D, there is typically an additional covering element in place on the opposite side of the central optical cavity from the shown covering element 316. In embodiment 300A, the optical cavity is bounded by the assembly ceiling panel 318, covering elements 316, and the linear support element 302. The ceiling panel 318 of embodiment 300A ceiling grid lighting assembly is held horizontally by linear support elements 302 on two opposing edges and raised above the ceiling plane 312. In such an arrangement it is positioned to create a recessed central optical cavity 322 into which a portion of optical element light distributions 330 are projected from optical elements 308 which propagate light from PCB 306 (with light source). Parenthetically, the PCB 306 (with light source) and optical element 308 are configured to project light into and out from the optical cavity 314. As illustrated, a portion of the light from the light source illuminates the underside of the assembly ceiling panel 318 and a portion is directed below the ceiling grid plane 112 into the room below. As illustrated in FIG. 3A-3B, the assembly ceiling panel 318 is illustrative of a standard ceiling panel size and type but alternative embodiments can be configured with panels of different size or type. The ceiling panel 318 is held in position by a external support features of the linear support element 302 which also supports the PCB 306 (with light source) and optical elements 308 by internal support features. As illustrated, a portion of the light 314 from the light source illuminates the underside of the assembly ceiling panel 318 and a portion 330 is directed below the ceiling grid plane 112 into the room below. In contrast to the assembly ceiling panel 318, the surrounding ceiling panels 117 are mounted in a conventional manner wherein the bottom surfaces of the surrounding ceiling panels 117 are resting on horizontal portions 108 of T-Bars 106 at level with the ceiling grid plane 312.

Figure 3E:
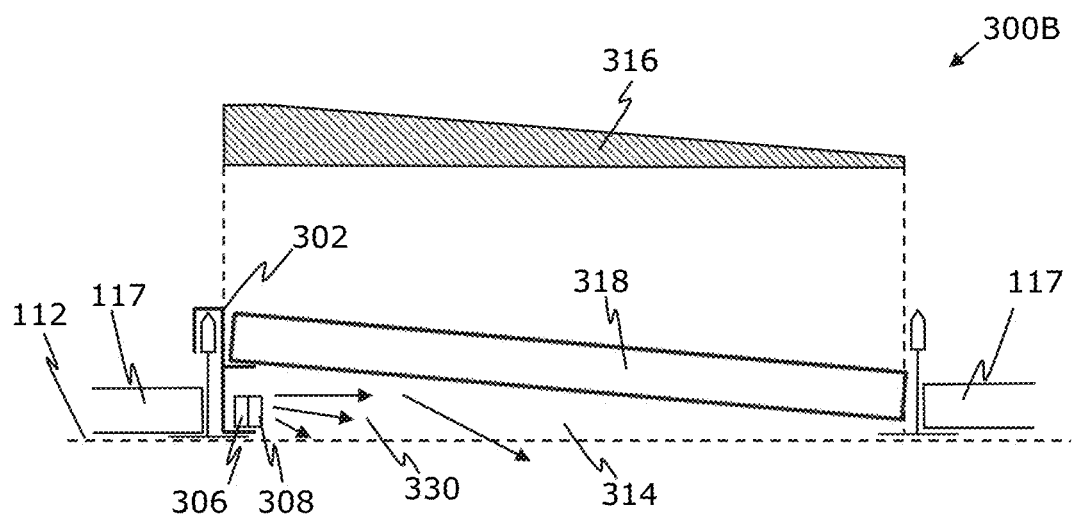
FIGS. 3E-3F are cross section views illustrating a ceiling grid assembly comprising two linear lighting modules similar to FIGS. 3A and 3B, with and without endplate covering element.
Figure 3F:
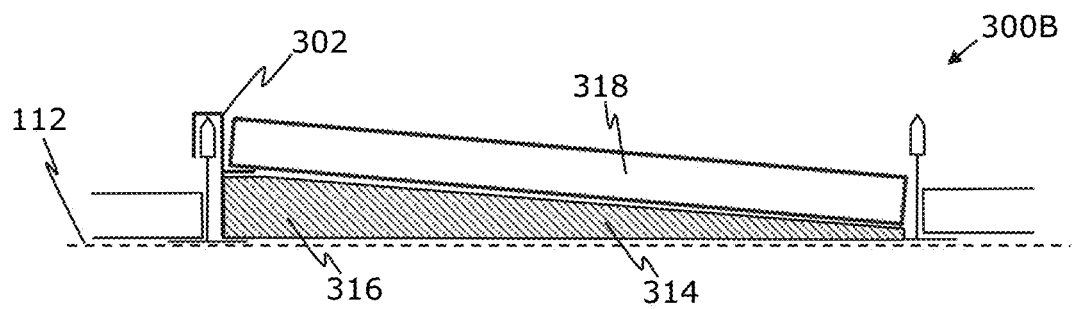

FIG. 3E and 3F illustrate specific details of ceiling grid lighting assembly 300B comprising an embodiment linear support element 302 that is configured to both mount on a T-Bar and support the edge of a ceiling panel 318 at an elevation and tilt relative to the ceiling grid plane 112. The optical element 308C is a vertically oriented edge lit diffuser configured to emit into the optical cavity and in FIG. 3E only the top mounting portion of the linear support element 302 extends minimally over the T-Bar on which it is mounted in longitudinal alignment. In FIG. 3F the ceiling grid lighting assembly 300B is illustrated with a covering element 316 in place. the linear support element 302 is configured with features of both a supporting element and a T-Bar and in this case there is no extension of components about the top of the integrated support element/T-Bar component 302D. Additionally, the linear support element 302D is configured to support a driver 326 which is positioned in an adjacent T-Bar cell within the ceiling grid system, thereby eliminating a need to position the driver 326 in the plenum space above the minimum plenum plane 351.

Figure 4A:
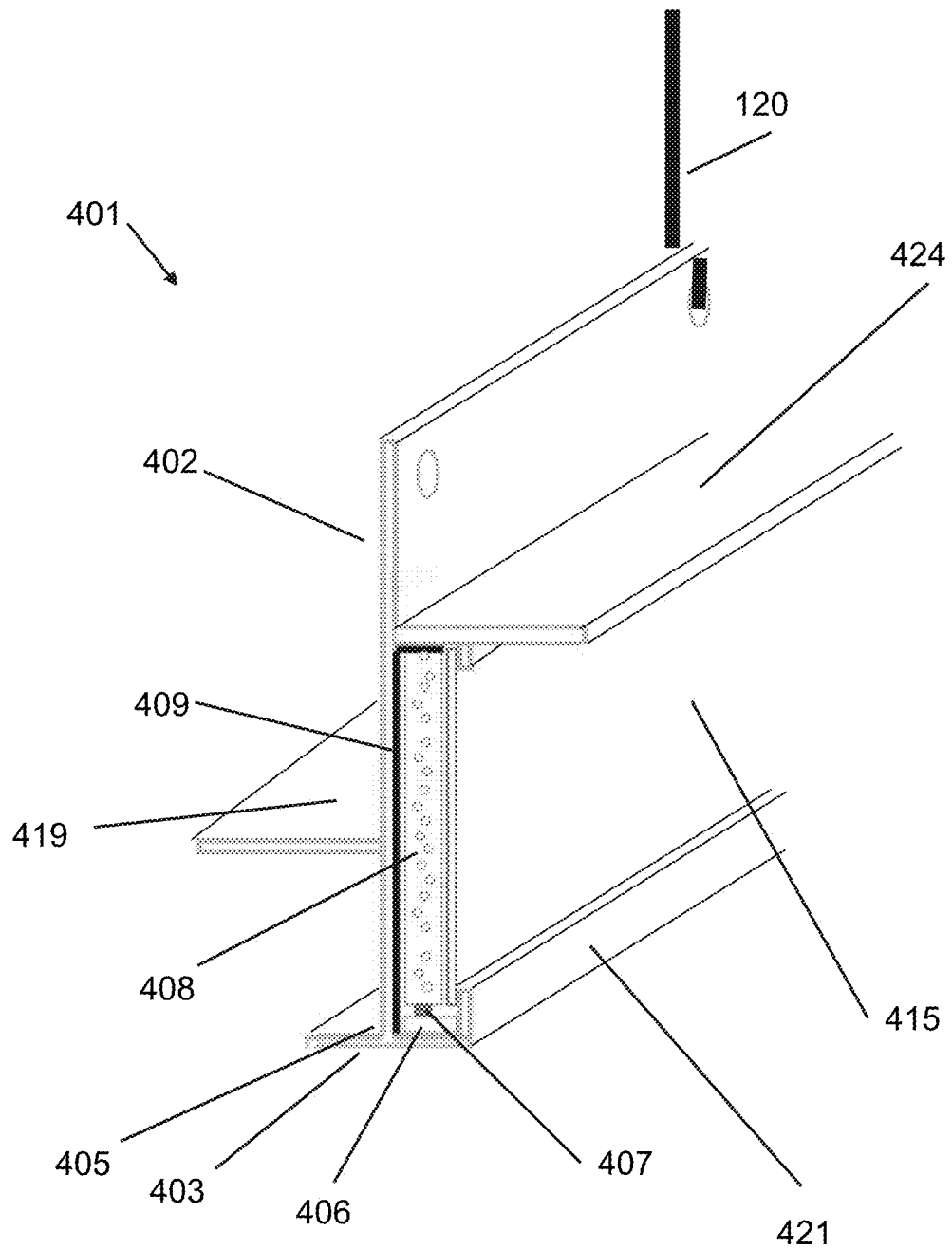
FIG. 4A is a cross section view of a linear lighting module embodiment with vertically aligned edgelit optical element and configured to mount perpendicularly with T-bars positioned at each of the ends of its integral linear support element.

FIG. 4A illustrates a "single edge lit" embodiment of the linear lighting module 401 wherein the linear support element is configured so as to be positioned in the ceiling grid between two T-bars and aligned perpendicularly to a mounting T-bar at either of its longitudinal ends and supported from its longitudinal ends either by resting on the mounting T-bar or by a supporting end plate. In this configuration the linear support element is not mounted on a T-bar along its longitudinal length and can functionally replace a T-bar when used in a ceiling grid assembly. Furthermore, linear support element 402 supports a horizontally aligned LED board comprising of at least one LED source 407 and a printed circuit board 406, vertically aligned edgelit optical element 408 such as a light guide or low clarity diffuser, a reflector 409 and an outer lens 415. The support feature 421 of the linear support element retains the LED board and optical components. The linear support element 402 is further comprising T-Bar features 403 configured to appear similar to 9/16" and 15/16" flat T-Bar styles. Further support features 405 and 424 support the edges of ceiling panels on either side of the linear support element at different heights. In this case support feature 405 supports the ceiling tile at the ceiling grid plane, whereas support feature 424 holds the ceiling panel edge at an elevation above the ceiling grid plane. The support feature 419 supports a driver or power source 426. The linear support element is further suspended from the structural ceiling by a cable or wire 120.

Figure 4B:
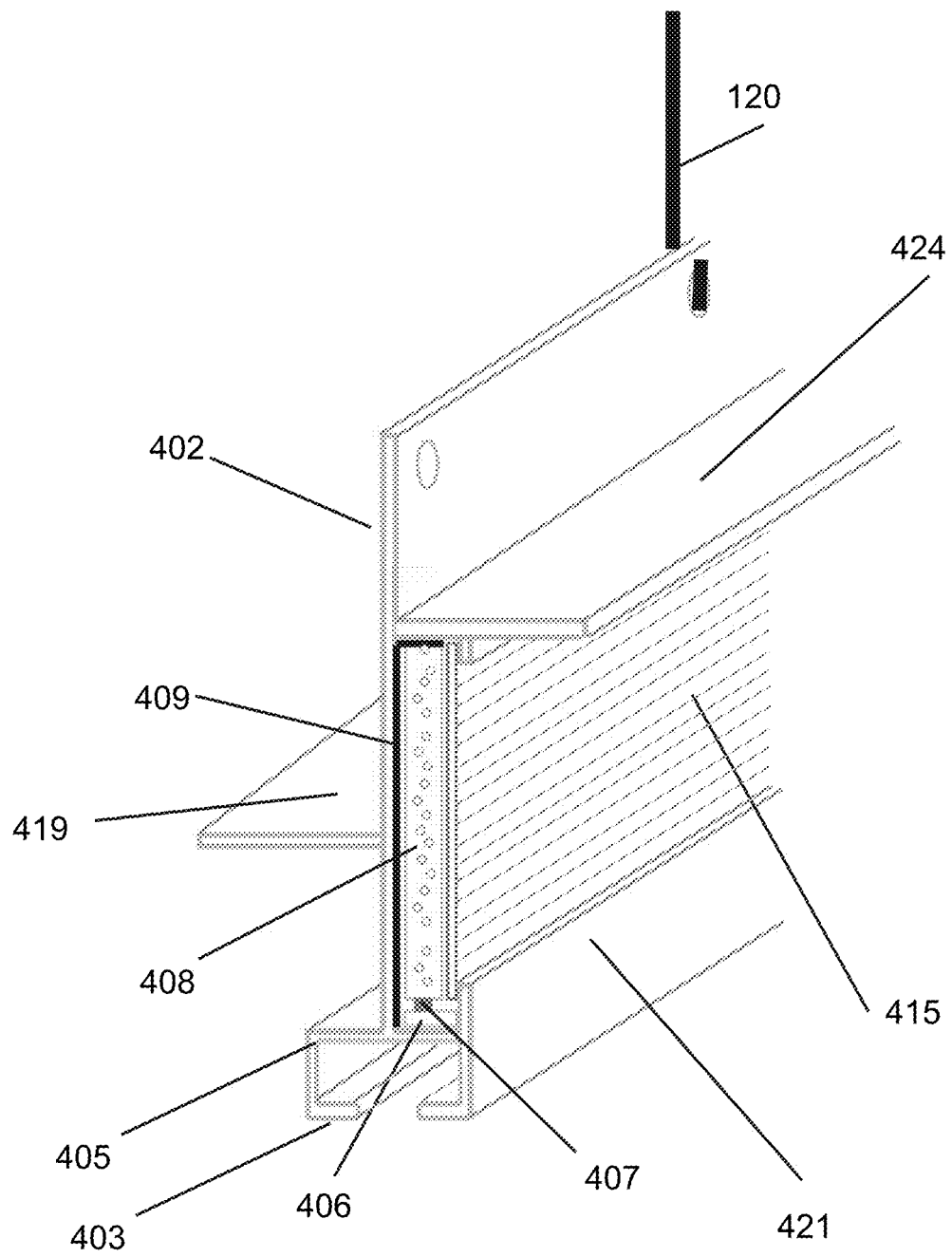
FIG. 4B is a cross section view of a linear lighting module embodiment similar to FIG. 4A with a T-Bar support feature configured to appear similar to a 9/16" slot style T-Bar.

FIG. 4B illustrates an embodiment similar to FIG. 4A wherein the T-Bar features 403 on the linear support element 402 are configured to appear and function like a 9/16" slot style T-Bar. In this manner the linear support element will appear consistent with other T-bars used in the ceiling grid assembly. As such the linear support element is also configured so as to be positioned in the ceiling grid between two T-bars and aligned perpendicularly to a mounting T-bar at either of its longitudinal ends and supported from its longitudinal ends by a supporting end plate. In this configuration the linear support element is not mounted on a T-bar along its longitudinal length and can functionally replace a T-bar when used in a ceiling grid assembly.

Figure 4C:
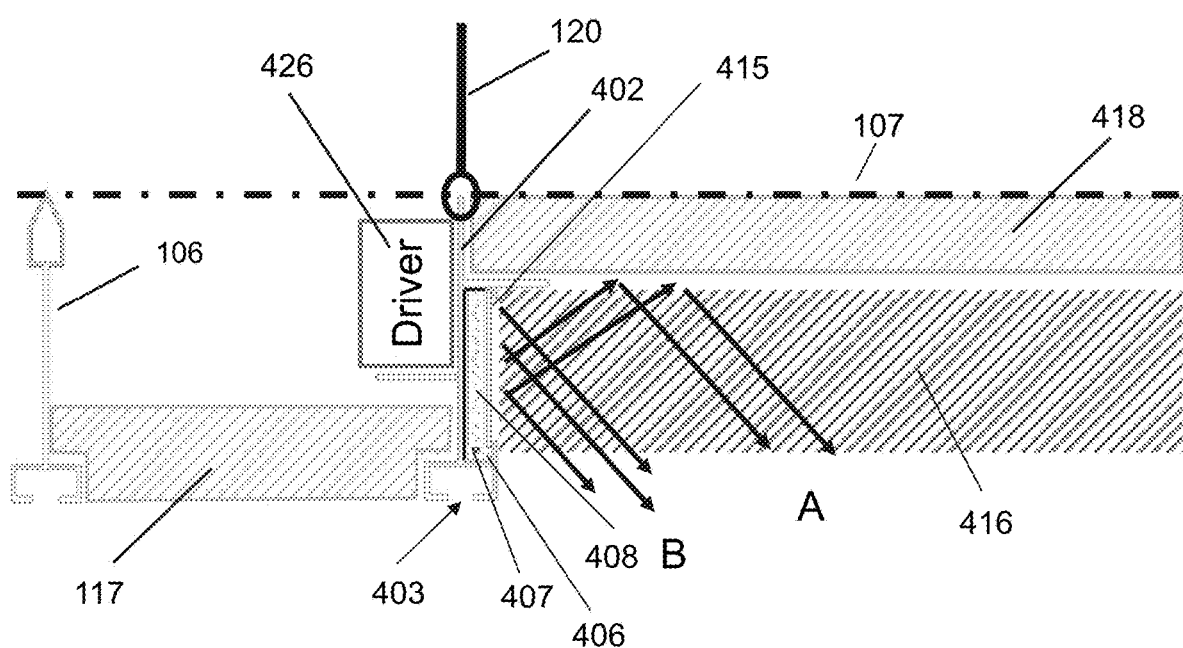
FIG. 4C is an isometric view of the linear lighting module embodiment of FIG. 4B in a ceiling grid assembly.

FIG. 4C illustrates how the operation of the linear lighting module of FIG. 4B supports a ceiling panel in horizontal alignment and an elevation to ceiling grid plan on one side and a ceiling panel 117 in alignment with the ceiling grid on its other side. The module also provides light that that is both directed into the covering element end plates 416 which form part of the optical cavity 414 as well as directly into the room below. The light in the optical cavity is further reflected from the underside of the ceiling panel 418 and also projected directly down into the room below in a controlled distribution. It is also possible to use a "double edge lit" configuration in cases where it is desirable to electrically control the degree of uplight and downlight independently, as was illustrated in FIG. 3B. In this configuration the uplight component A reflected from the underside of the ceiling panel the downlight component B which is directed primarily down into the room below can be controlled independently.

Figure 5A:
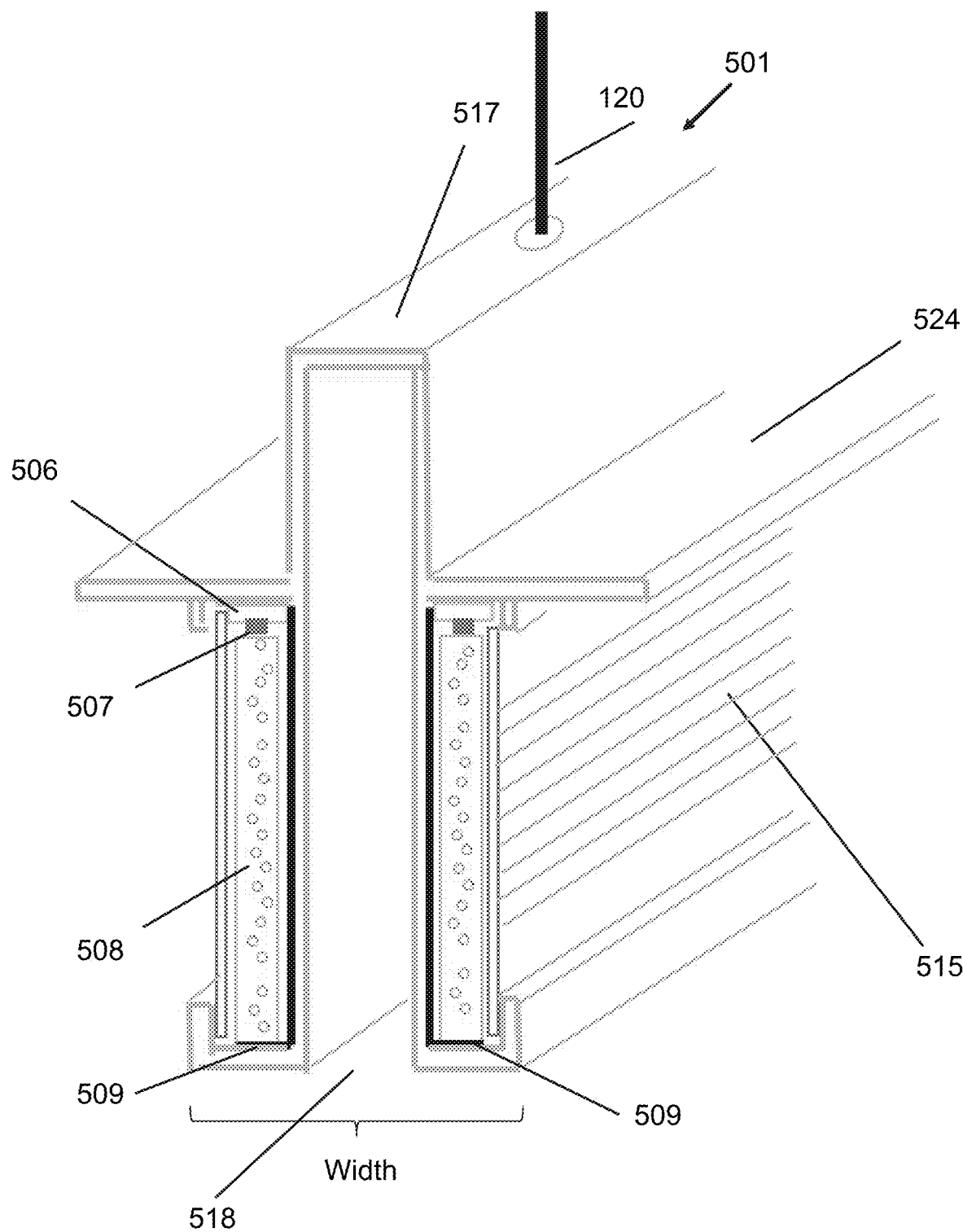
FIG. 5A is a cross section view of a linear lighting module embodiment with two vertically aligned edgelit optical elements positioned on either side of the vertical portion of a mounting T-Bar.

FIG. 5A shows detail of a linear lighting module 501 used in the ceiling grid lighting assembly 500. In FIG. 5A the linear support element 502 is positioned on either side of the vertical portion of a T-Bar and supports and aligns one or more LED light sources 507 mounted onto a printed circuit board 506 inputting light into the edge of an optical element 508 that is a vertically oriented edgelit diffuser. The linear support element 502 further supports a reflector 509 behind the edgelit optical element and an optically transmissive component 515 proximate to its outer face which in turn acts as the outer face of the linear lighting module 501. In this type of configuration, a light source could be positioned on either or both edges of the edgelit diffuser and controlled independently to produce differing light distributions. FIG. 5A also shows a linear support element 502 that mounts over a T-Bar and, when mounted, supports a light source on either side of the vertical leg of the T-Bar and also incorporates ceiling panel support features 524 to further support the edge of a ceiling panel on either side of the T-Bar. In the embodiment the light sources comprise an optical element 508 that could be an edge-lit low clarity diffuser or light guide. The width of the linear support element 502 is also configured to match the width of the horizontal portion of the T-Bar such that when it is mounted on said T-Bar there is minimal overlap of the linear support element. The width chosen is typically 1.5", 15/16" or 9/16" wide which matches the typical widths of a main beam or cross tee T-bar. The linear support element 502 can further be configured to attach to a suspension cable 120 which in turn would be attached to the structural ceiling. In this manner the linear support element is configured to be part of the structural design of the ceiling grid assembly and could be configured to support other T-Bars as well as ceiling panels. A further embodiment may obliquely angle the edgelit optical element 508 by moving the positioning of the LED light sources away from the center and towards the edge of the ceiling panel support features 524. Furthermore, if the ceiling panel support features are extended then the degree of tilt and amount of the oblique angle can be further increased.

Figure 5B:
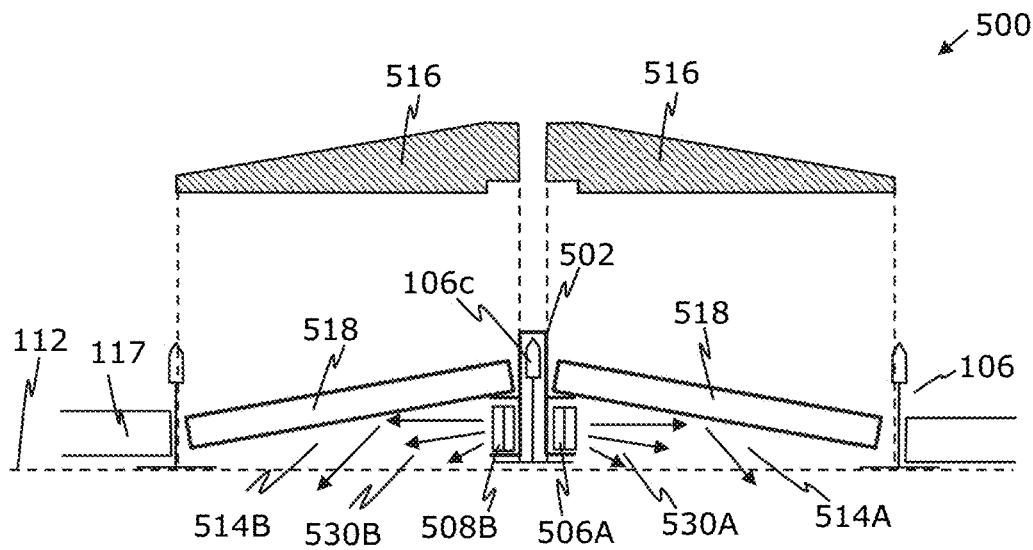
FIGS. 5B-5C are cross section views of ceiling grid assembly comprising the linear lighting module embodiment of FIG. 5A.
Figure 5C:
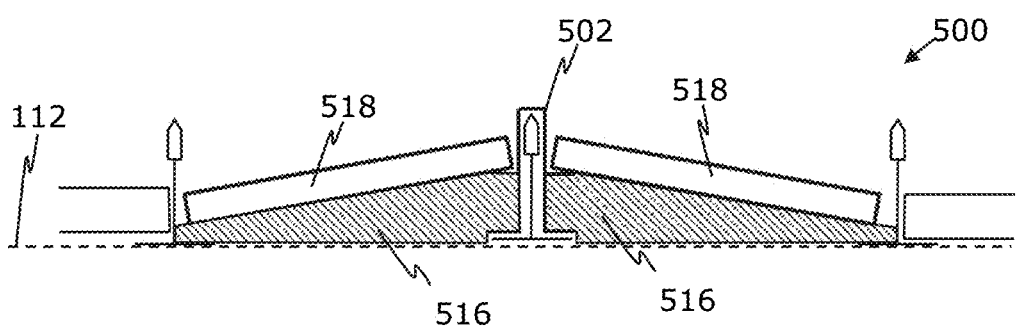

FIGS. 5B-5C are cross section views illustrating ceiling grid lighting assembly embodiment 500 wherein two ceiling panels 518 are supported by the same linear support element 502 on either side of the vertical portion of a T-Bar. Furthermore, the two ceiling panels 518 are inclined with respect to the ceiling grid plane 112. In this case the ceiling grid assembly 500 also spans two ceiling grid T-Bar cells through the use of a linear support element 502 which straddles a central T-Bar 106c. The linear support element 502 positions PCBs 506A and 506B (with light sources) and optical elements 508A and 508B on opposing sides of the central T-Bar 106c such that they produce optical element light distributions 530A and 530B that emit into respective optical cavity portions 514A and 514B and reflect off the ceiling panels 504 but in opposite outward directions. As illustrated, a portion of the light from the light source illuminates the underside of the assembly ceiling panel 518 and a portion is directed below the ceiling grid plane 112 into the room below. FIG. 5B shows two covering elements 516 positioned removed and above the ceiling grid lighting assembly 500 while FIG. 5C shows the covering element 516 in assembled position. The ceiling grid lighting assembly embodiment D can be used as a useful alternative to a typical 2×4 troffer style fixture. The tilted ceiling panels 504 provide a low glare and diffuse illuminated surface when viewed from the room below and the covering elements 516 positioned at each of the linear support element provide further reflected light.

Figure 5D:
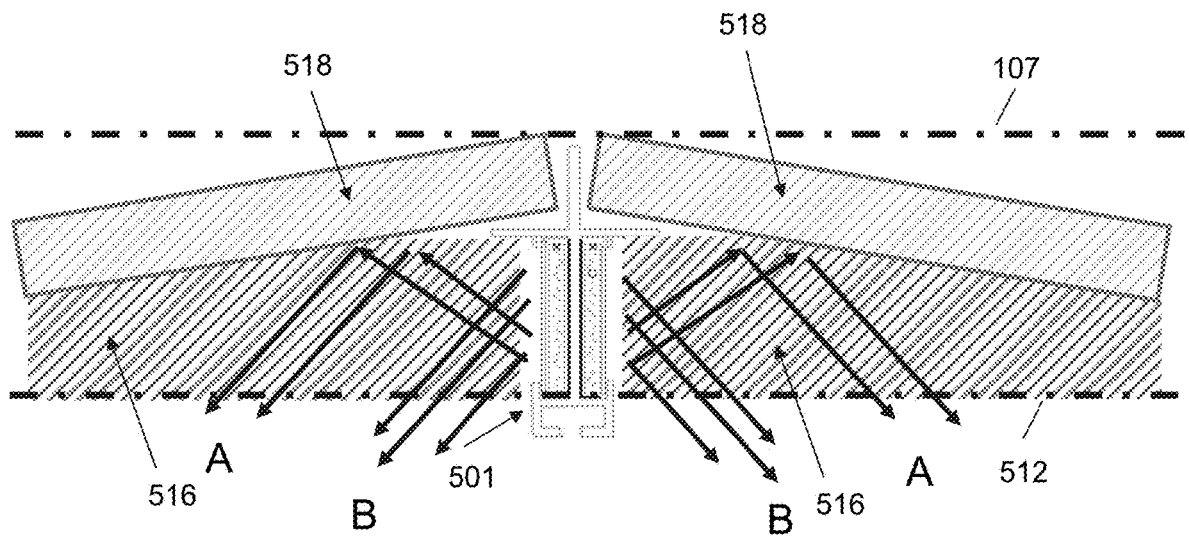
FIG. 5D is an isometric view of a linear lighting module embodiment with 9/16" slot style T-bar feature and further configured to be mounted to a T-Bar on its ends and to not require elongate mounting.
Figure 5D:
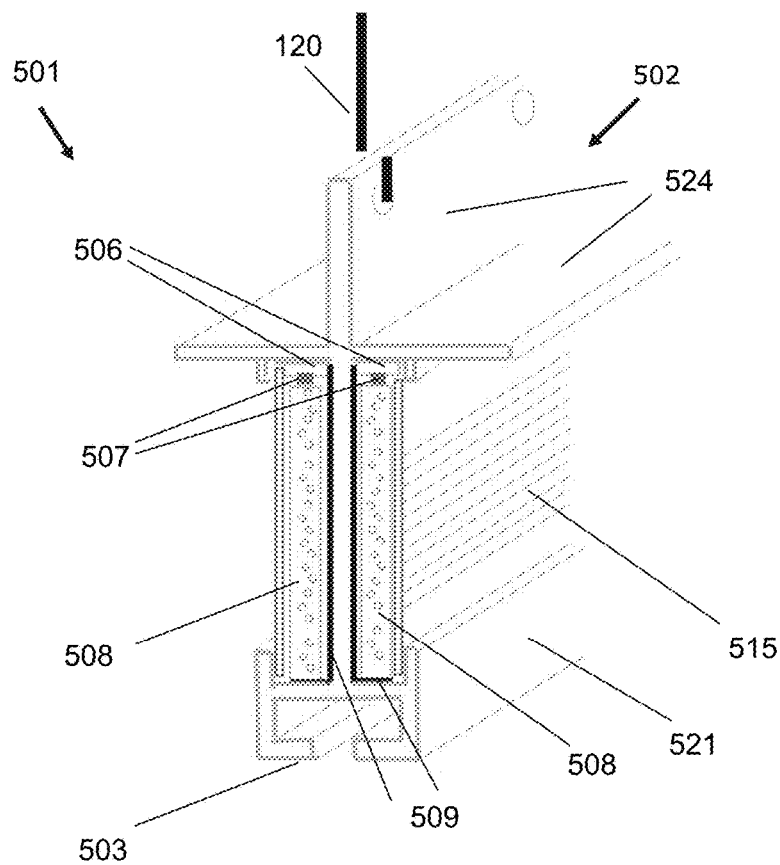

FIG. 5D is an isometric view of a linear lighting module embodiment with 9/16" slot style T-bar feature and further configured to support an edge of two ceiling panels on either side at an elevation relative to the ceiling grid plane. In this embodiment it is configured so as to be positioned in the ceiling grid between two T-bars and aligned perpendicularly to a mounting T-bar at either of its longitudinal ends and supported from its longitudinal ends either by resting on the mounting T-bar or by a supporting end plate. In this configuration the linear support element is not mounted on a T-bar along its longitudinal length but rather is perpendicular to the mounting T-bar and can functionally replace a T-bar when used in a ceiling grid assembly. The module also provides light that that is both directed onto the two covering element end plates 516 which form part of two optical cavities 514 on either side as well as directly into the room below. The light in each optical cavity is further reflected from the underside of the supported and elevated ceiling panel 518 and also projected directly down into the room below in a controlled distribution. It is also possible to use a "double edge lit" configuration in cases where it is desirable to electrically control the degree of uplight and downlight independently. In this configuration the uplight component A and the downlight component B in each optical cavity can be controlled independently therein providing 4 distinctly different channels of lighting which can be adjusted using standard electrical controls, such as switches and dimmers, by the occupant or user of the room below.

A further embodiment of FIG. 5D may obliquely angle the edgelit optical element 508 by moving the positioning of the LED light sources away from the center and towards the edge of the ceiling panel support features 524. Furthermore, if the ceiling panel support features are extended then the degree of tilt and amount of the oblique angle can be further increased.

Figure 5E:
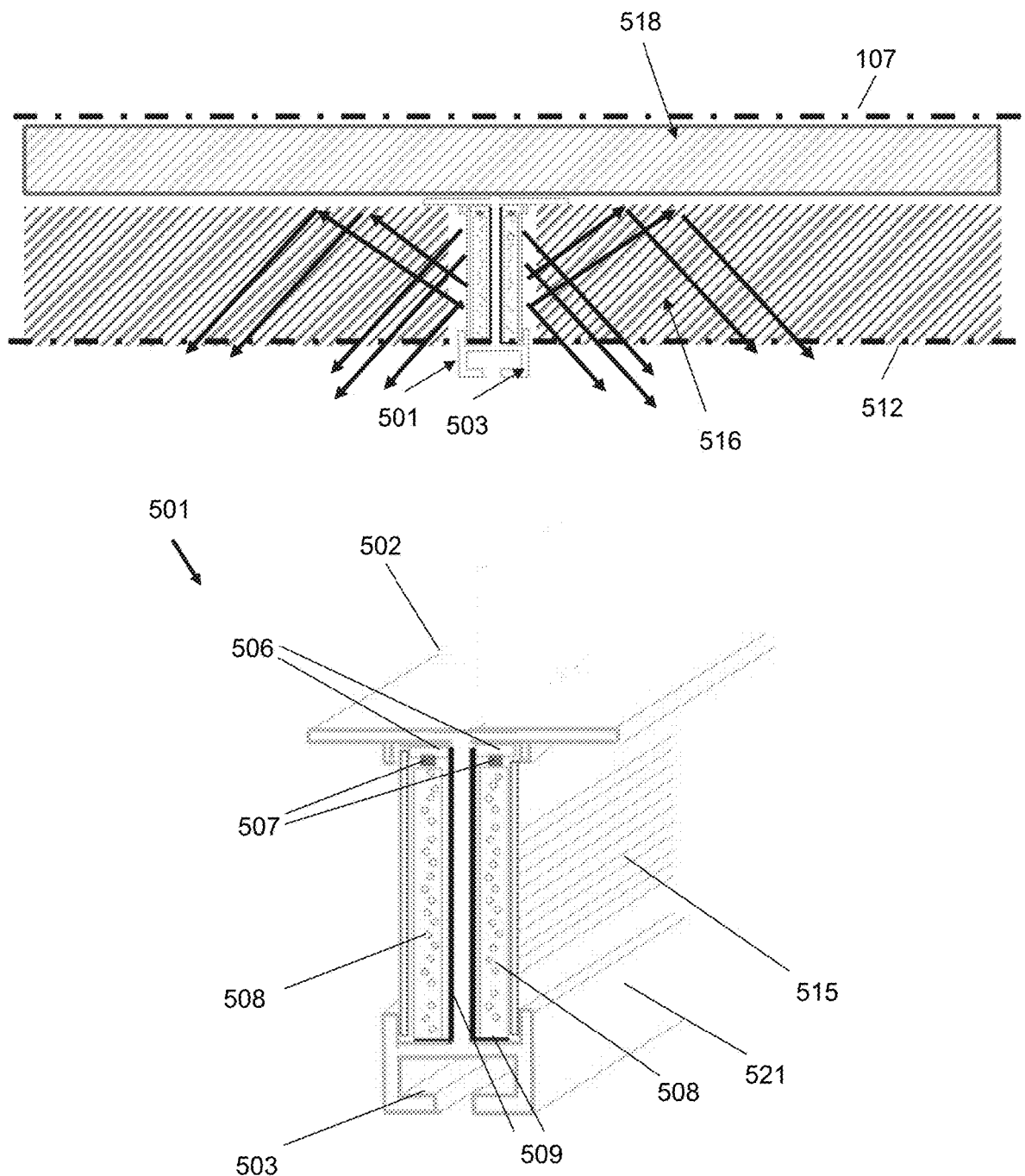
FIG. 5E is an isometric view of a linear lighting module embodiment similar to FIG. 5D with an upper vertical alignment portion removed.

FIG. 5E is an isometric view of a linear lighting module embodiment similar to FIG. 5D with an upper vertical alignment portion removed. Removal of the vertical alignment portion of the linear support element 502 enables a ceiling panel to be positioned and supported horizontally directly on top of the linear lighting module such that the same ceiling panel is part of each of the optical cavities on either side of the linear support element. In this embodiment it is configured so as to be positioned in the ceiling grid between two T-bars and aligned perpendicularly to a mounting T-bar at either of its longitudinal ends and supported from its longitudinal ends either by resting on the mounting T-bar or by a supporting end plate. In this configuration the linear support element is not mounted on a T-bar along its longitudinal length but rather is perpendicular to the mounting T-bar and can functionally replace a T-bar when used in a ceiling grid assembly.

Figure 5F:
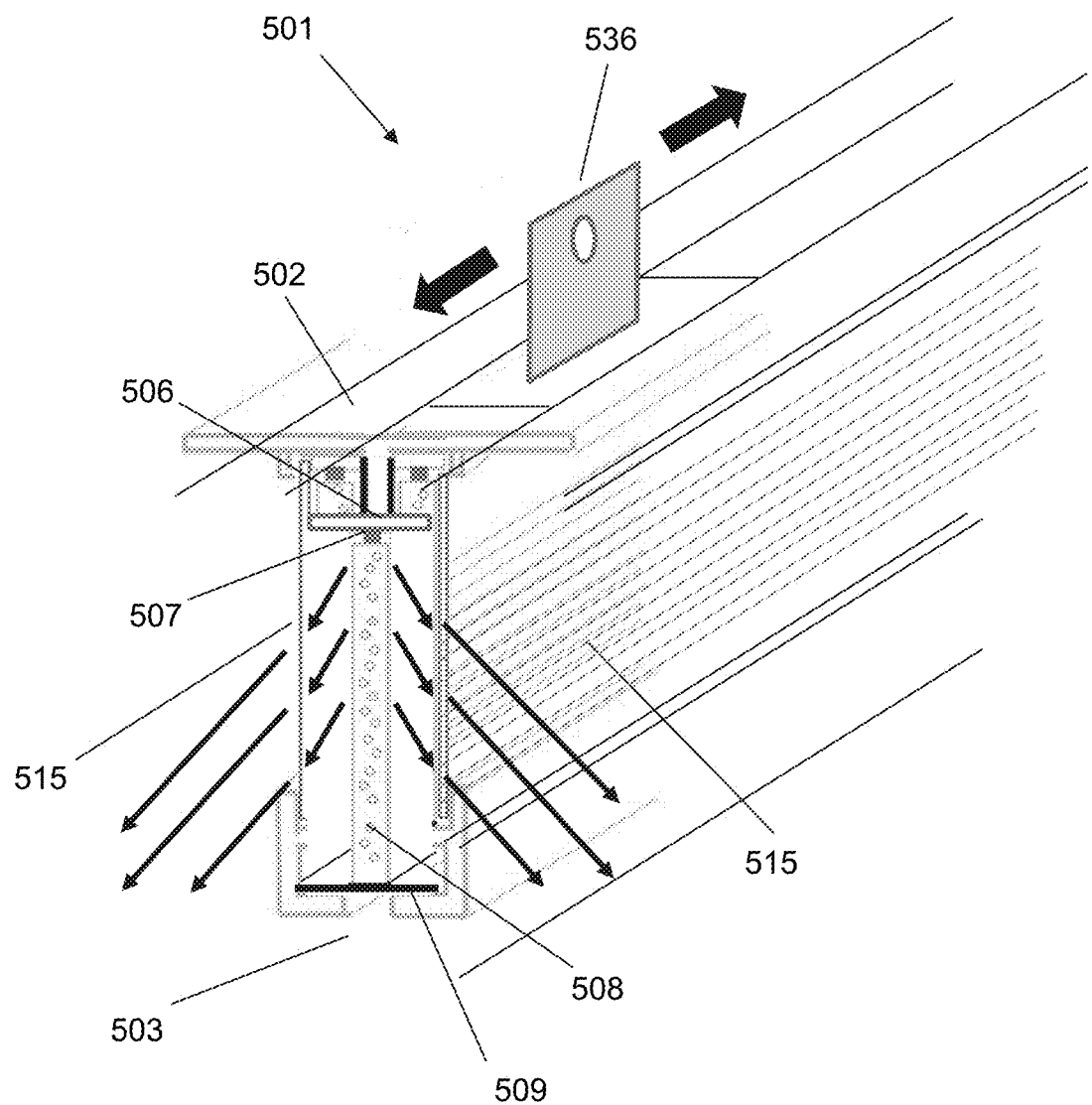
FIG. 5F is an isometric view of a linear lighting module embodiment with a single vertically aligned edgelit optical element and a removable vertical alignment adapter.

FIG. 5F is an isometric view of a linear lighting module embodiment with a single vertically aligned edgelit optical element 508 which radiates light from the LED light source 507 on either side. The light from the edgelit optical element is further controlled by outer lens 515 which are supported on either side in vertical alignment. The edgelit optical element may be configured to have differing outputs on either of its side and the outer lenses may be configured to have identical or different optical properties. In such a manner it is possible to alter the lighting distributions on either side by changing the properties of the optical element and outer lens. It is also possible to configure the lighting module in a "double edge lit" configuration and further control the lighting distributions using electrical signals. The embodiment also comprises a removable vertical alignment tab 536 to optionally restrict the lateral movement of ceiling panels across the top of the module. The removable tab 536 enables the linear light module to be used in either of the two ceiling grid assembly configurations shown in FIG. 5E and FIG. 5F.

Figure 5G:
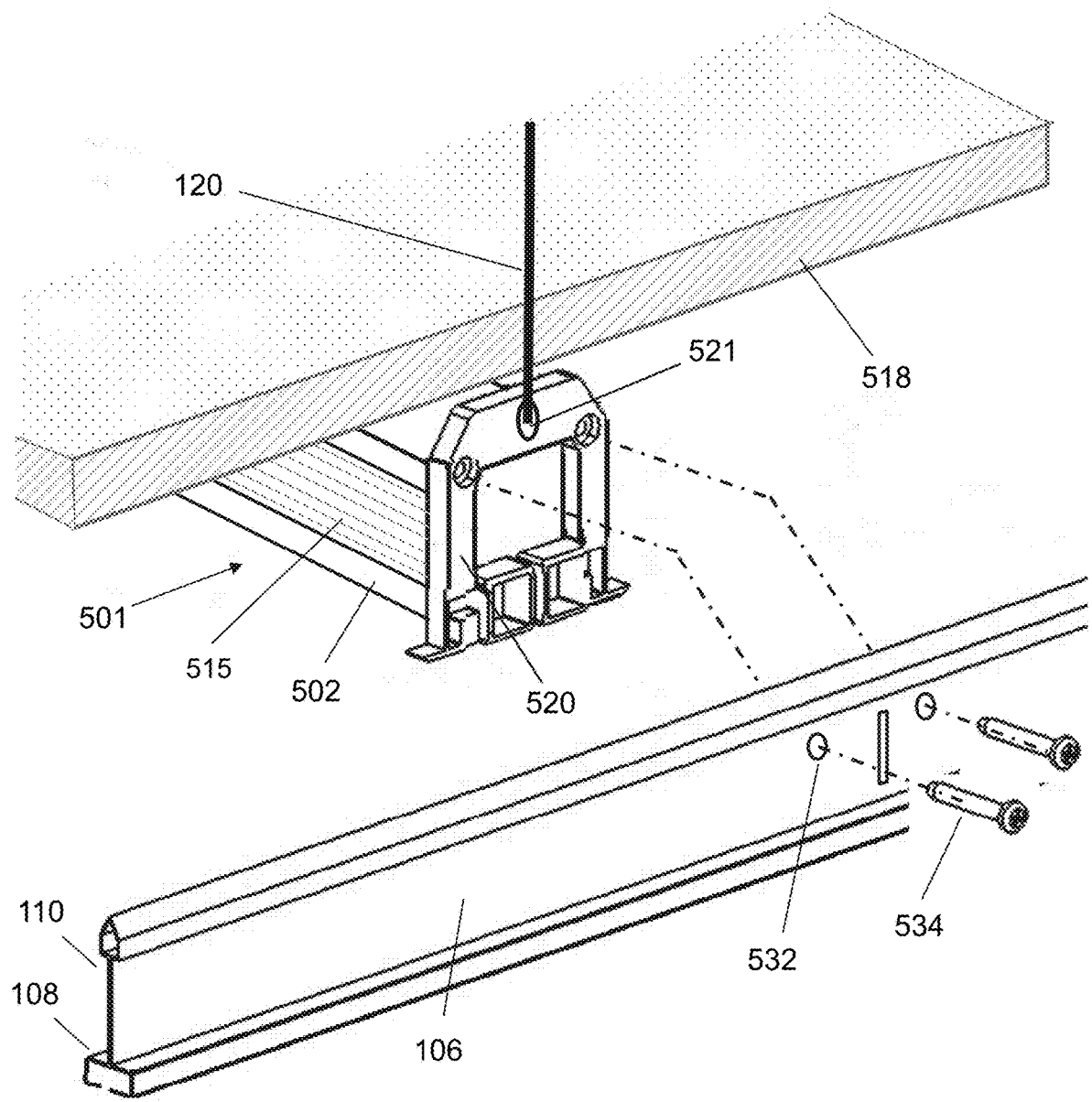
FIG. 5G is a isometric view of a linear lighting module with an end plate configured for mounting to a perpendicular T-bar.

FIG. 5G is an isometric view of a linear lighting module 501 with an end plate 520 attached to the longitudinal end of a linear support element 502 and configured for mounting to a perpendicular T-bar vertical portion 110. The embodiment 501 is also configured so as to be positioned in the ceiling grid between two T-bars and aligned perpendicularly to a mounting T-bar at either of its longitudinal ends and supported from its longitudinal ends either by resting on the mounting T-bar or by a supporting end plate. In this configuration the linear support element 502 is not mounted on a T-bar 106 along its longitudinal length but rather is perpendicular to the mounting T-bar and can functionally replace a T-bar when used in a ceiling grid assembly. The end plate 520 can be configured to rest upon the T-bar horizontal portion 108 and/or be affixed with fasteners 534 through holes 532 in the T-bar vertical portion 110. Additional support to the linear lighting module is provided by attachment of a suspension wire 120 through a hole 521 in the end plate 520. An assembly ceiling panel 518 rests upon the linear lighting module to function as a top face of an optical cavity above the ceiling grid plane. A vertically mounted optical element 515 is positioned to project light into the optical cavity.

Figure 6A:
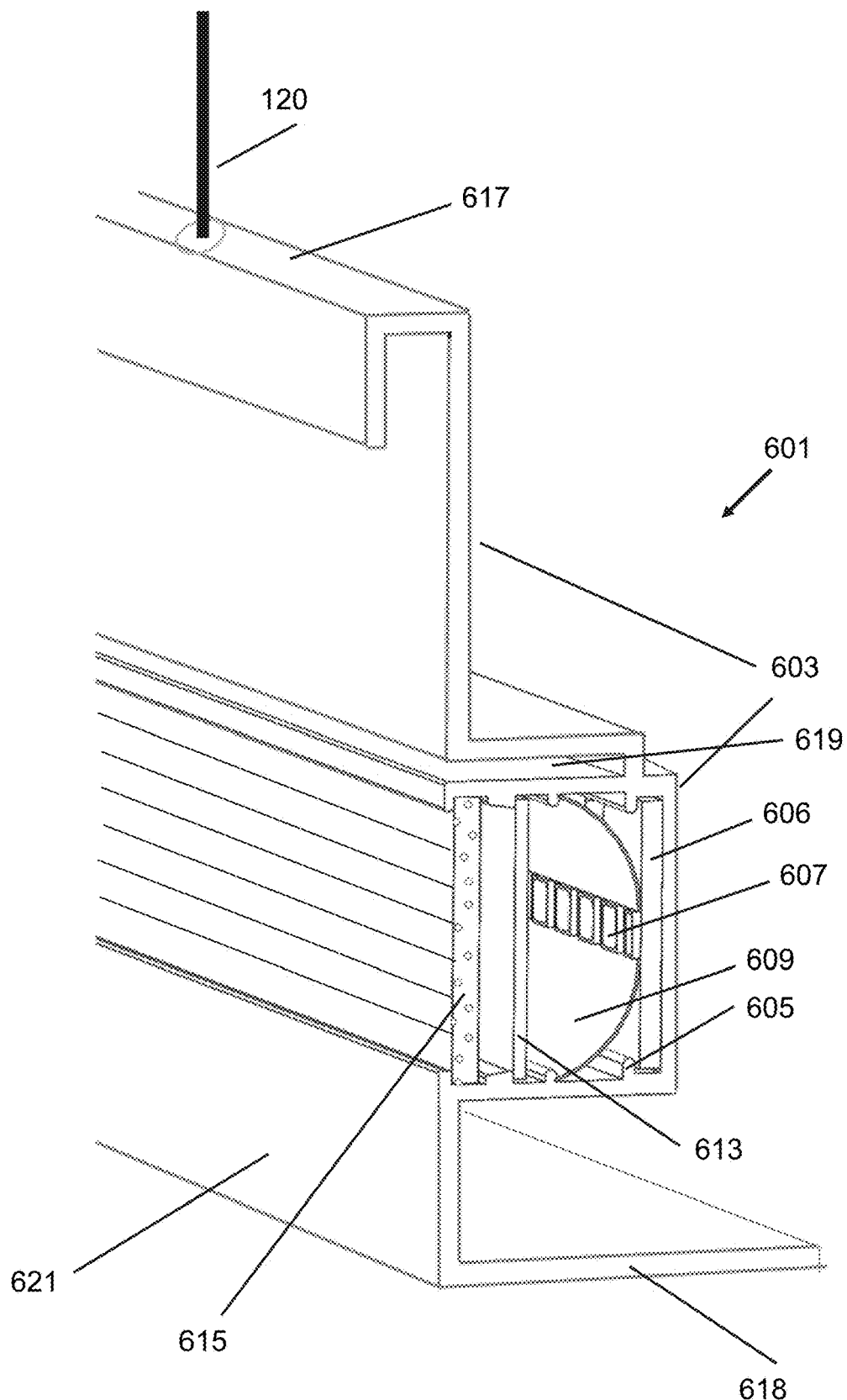
FIG. 6A is an isometric view of a linear lighting module embodiment with a backlit optical element and further configured to mount onto a T-bar and support the edge of a ceiling panel below the ceiling grid plane.

FIG. 6A details an embodiment direct lit linear lighting module 601 configured for use in ceiling grid assemblies. The lighting module is further configured for a uniform appearance and beam control and comprises linear support element 602 configured to support and align LED light sources 607 are mounted on a printed circuit Board 606 which is fitted into the elongate housing 603A with the aid of internal support features such as positioning tabs 605 which create slots within which to position and retain the LED board. Other components supported and retained in position by the linear support element 602 include a reflector 611, a first lens 613 is designed to help smooth out the pixellation of the LED light source, and a second output lens 615 which comprises light scattering particles dispersed in the volume of its bulk material and light redirecting surface structures. The purpose of the output lens 615 is to further control the angularity and spread of the lighting distributions from the linear lighting module. In this embodiment, positioning tabs support and retain all components in positions of optical alignment with the LED Light sources to provide optimal configuration for light distribution and appearance uniformity. The reflector 609 functions to efficiently direct light out of the housing. The first lens 613 and second lens 615 can each be configured to contain bulk and/or surface features to provide one or more functions of diffusing, collimating, or redirecting light. Fresnel lenses are particularly useful in collimating and/or tilting beam patterns.

Other embodiments may have more or fewer lenses (including no lenses) though which light is transmitted. In applications where a support element is mounted under the ceiling plane and projects onto a surrounding ceiling panel a light distribution commonly known as "wall grazing" or "wall washing" can be re-purposed with the ceiling instead of a wall as the illumination target area. This is represented by the ceiling grazing light distribution polar plot 630 wherein the darker lobe on the polar plot is representative of the axis aligned with the cross-sectional plane and the lighter shading is representative of an axis aligned longitudinally with linear support element.

Figure 6B:
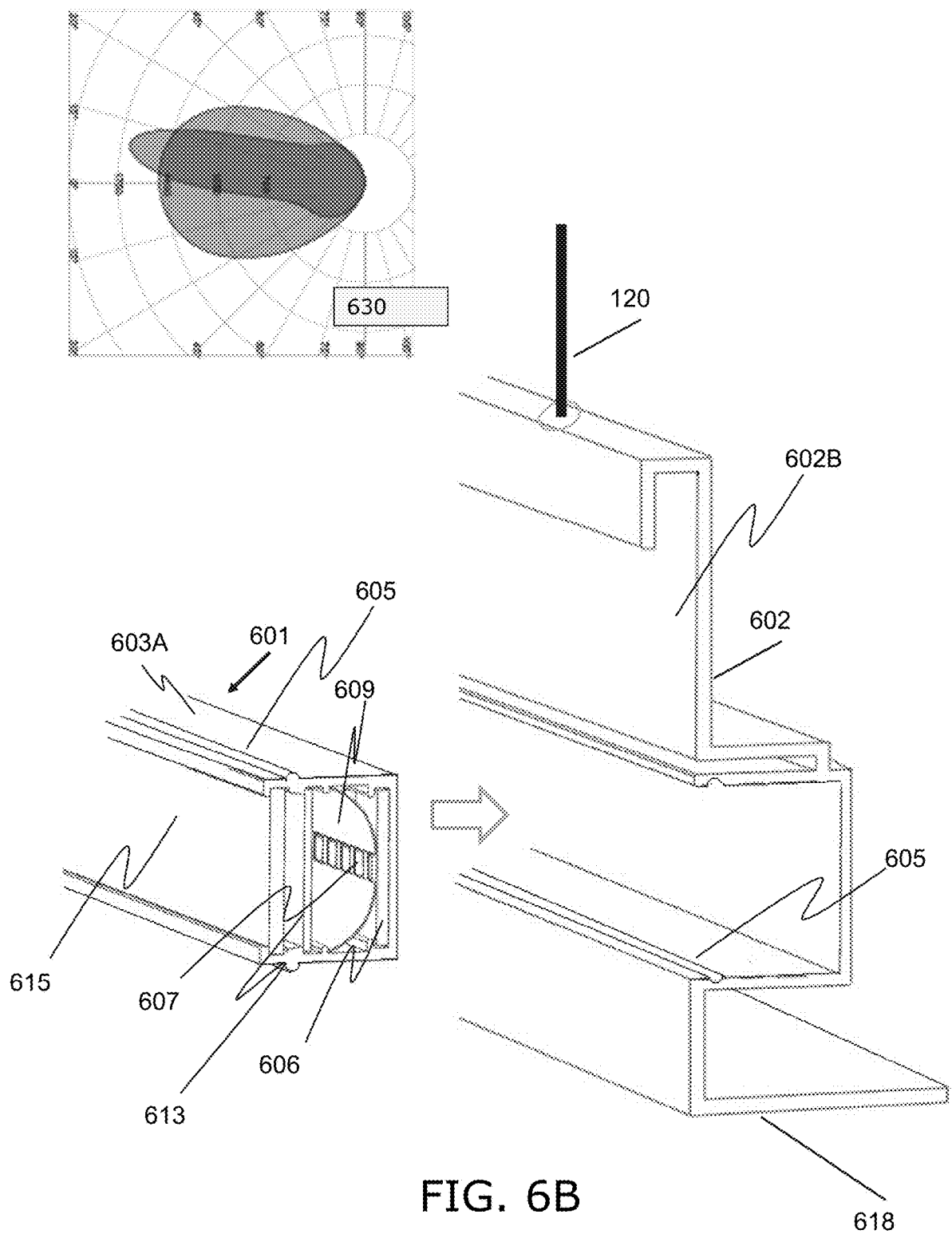
FIG. 6B is a cross section view of a linear lighting module embodiment similar to FIG. 6A but with a removable light source assembly cartridge.

The embodiment in FIG. 6B further illustrates how the linear lighting module 601 and linear support element 602 can be housed in two separate elongate housings. In this embodiment the linear lighting module is contained in elongate housing 602A and supported inside a second elongate housing 602B which is effectively the linear support element 602. In this embodiment the second elongate housing is used to retain the removable linear lighting module and connect or fix it to a T-Bar element. In this embodiment the linear support element 602 contains internal features 605 which can be used to help retain the linear lighting module 602A once it is in place.

Figure 6C:
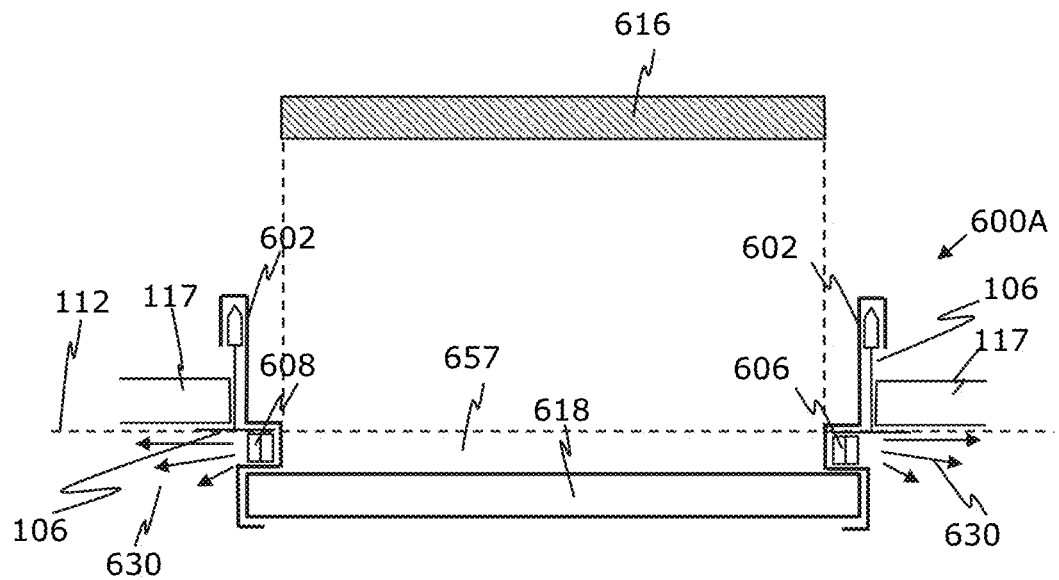
FIGS. 6C-6D are cross section views illustrating ceiling grid assembly embodiment with ceiling panel supported horizontally at an elevation below the ceiling grid plane.
Figure 6D:
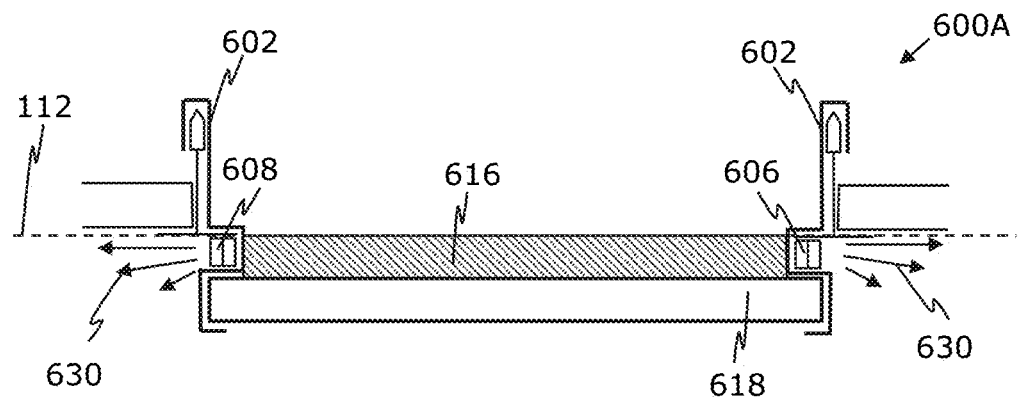

FIGS. 6C-6D views illustrating variations of ceiling grid lighting assembly embodiment 600A within a suspended ceiling grid system wherein the ceiling panel 618 is supported along its edges at a height that is below the ceiling grid plane 112. In embodiment 600A there is no central optical cavity. LED light source 607 mounted on a printed circuit board 606, and optical element 608 are positioned on the exterior side of a non-optical ceiling cavity 657 formed by positioning of the assembly ceiling panel 618 below the ceiling grid plane and below the optical elements 608. The assembly ceiling panel 618, covering element or end plates 616, and linear support elements 602 are enclosing faces of the non-optical ceiling cavity 657. The optical elements 608 project the optical element light distribution away from the non-optical ceiling cavity 657 and partially onto the surrounding ceiling panels 117. Depending on specific configuration, other portions of the optical element light distribution are projected directly downward into the room space below and/or reflected off of the linear support element 602 or T-Bar bottom surfaces.

Figure 6E:
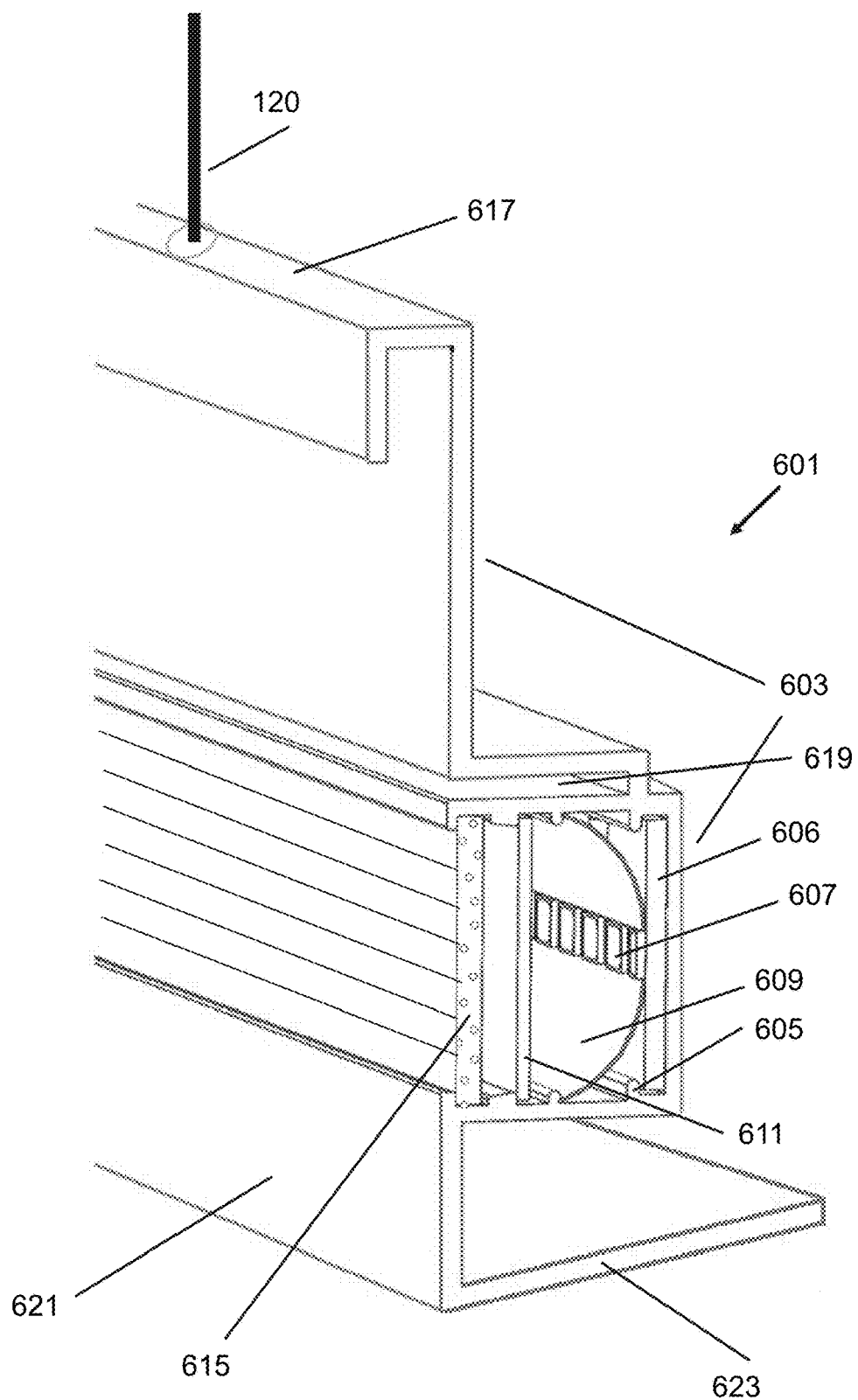
FIG. 6E is a cross section view of a linear lighting module with a backlit optical element and an angled exterior support feature to support the edge of a ceiling panel at a tilted or oblique angle to the ceiling grid plane.

FIG. 6E is a perspective cross-section view of an embodiment of linear lighting module 601 comprising linear support element 602 with an integrated light source. The linear support element 602 has an elongate body mounting portion 617 for mounting over the vertical portion of a T-Bar, a positioning slot 619 for mounting onto a horizontal portion of a T-Bar, and an angled support portion 623 for supporting an assembly ceiling panel 614 at an inclined angle. The elongate housing serves as both a structural member and also has positioning tabs for mounting optical components within the linear support element. These include a LED light source 607, a printed circuit board 606, a reflector 609, a first lens 611, and a second lens 615 with both linear microstructured features on its outer face and internal bulk diffusion properties which serves to further control the light distributions. The elongate housing also has an outer wall 621 which be configured to serve as a reflective surface or as a decorative surface. In this embodiment the lower panel support tab 618 is angled so as to support the ceiling panel at an angle that is tilted up from its edge and relative to the ceiling plane.

Figure 6F:
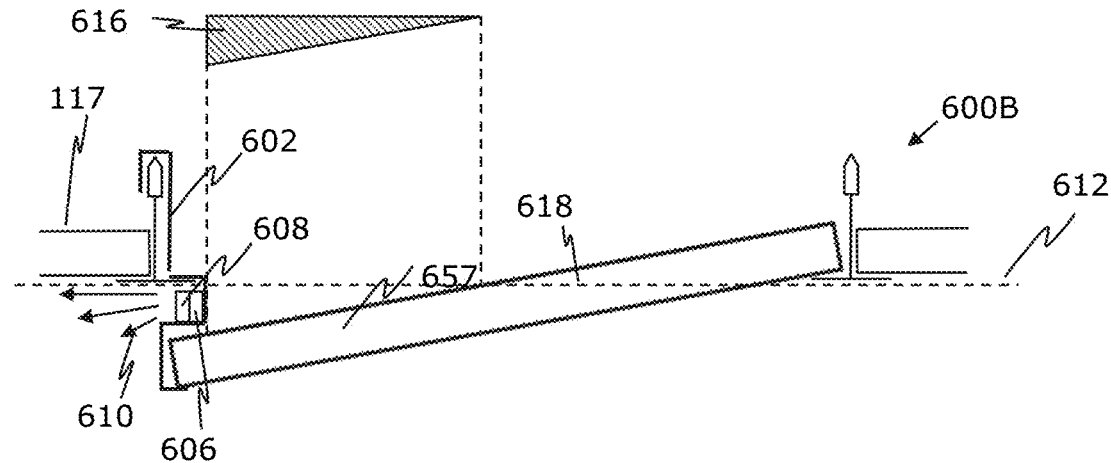
FIGS. 6F-6G are cross section views illustrating a ceiling grid assembly with angled or tilted ceiling panels.
Figure 6G:
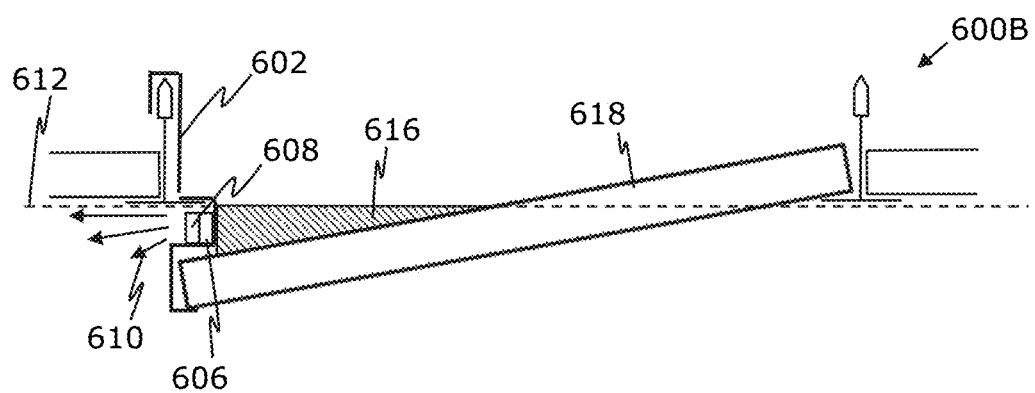

FIGS. 6F-6G are cross-section views of ceiling grid lighting assembly 600B with and without covering element or end plate 616 positioned in place as a side wall enclosure of the non-optical cavity 657. The assembly ceiling panel 618 is positioned at an inclined angle and with one edge at a lower elevation with respect to the ceiling grid plane 112 by the use of the linear support element 602. Without the covering element or end plate it would be possible to see behind the ceiling panel 618 and into the plenum space. Correspondingly, the covering element or end plate 616 has a wedge shape in order to order to cover the triangular/wedge shape opening created by the tilted and partially lowered assembly ceiling panel 618. Optionally, the tilted angle is typically in a range of 10° to 30° with respect to the ceiling grid plane 612. In this embodiment LED light source 607 mounted on a printed circuit board 606 and optical element 608 are configured to project a portion of the optical element light distribution 630 away from the central non-optical cavity and partially onto a surrounding ceiling panel 617. Depending on specific configuration, other portions of the optical element light distribution are projected directly downward into the room space below and/or reflected off of the linear support element 602 or T-Bar bottom surfaces.

Figure 7A:
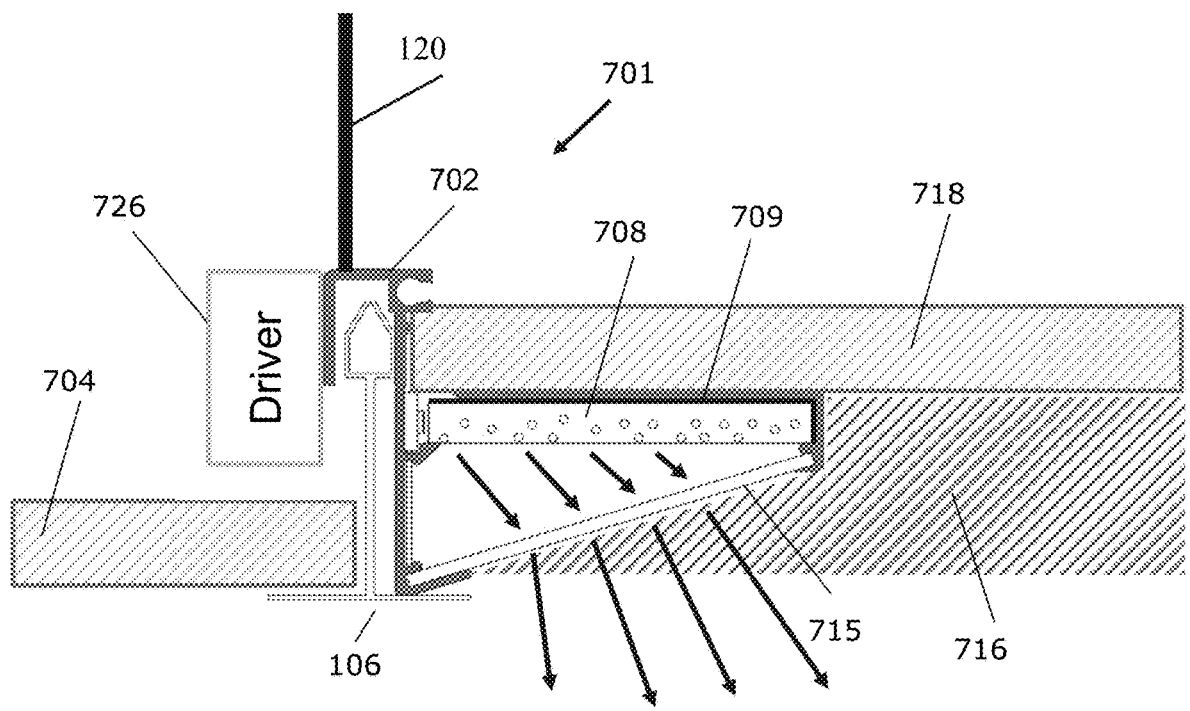
FIGS. 7A-7B are cross-section views of linear lighting module embodiment incorporating a horizontally supported edgelit optical element and an angled output face further configured to support a ceiling panel above the general ceiling grid plane.

FIG. 7A provides specific details of an embodiment linear lighting module 701 and its integral linear support element 702. A PCB 706 (with light source) inputs light into the edge of a horizontally supported low clarity edge-lit diffuser 708 and light is subsequently propagated through an outer lens 715 which contains high clarity volumetric scattering and light redirecting features and is positioned at an inclined angle with respect to the ceiling grid plane 112 and the edge lit diffuser 708 which are approximately parallel to each other. The outer lens changes the angular orientation and spread of the light from the edgelit diffuser. In the embodiment the angle is shifted more towards the vertical. Equally the outer lens could shift the light more towards the horizontal. In this manner the degree of angular tilt and spread of the light can be optimized. This is very important for wall washing and cove type applications. The edge-lit diffuser of FIG. 7A is a rectangular shape but an alternate embodiment is a wedge shape. A reflector 709 is positioned behind the edgelit diffuser to help improve efficiency and uniformity of the light output. Additionally, a portion of the reflector further wraps around a corner of the edge-lit diffuser to provide a reflective surface on the edge-lit diffuser face that opposes the input face. In this embodiment an LED driver 726 is further supported by the linear support element on the opposing side of the T-bar. The linear support element is further attached the structural ceiling by a suspension cable 120.

Figure 7B:
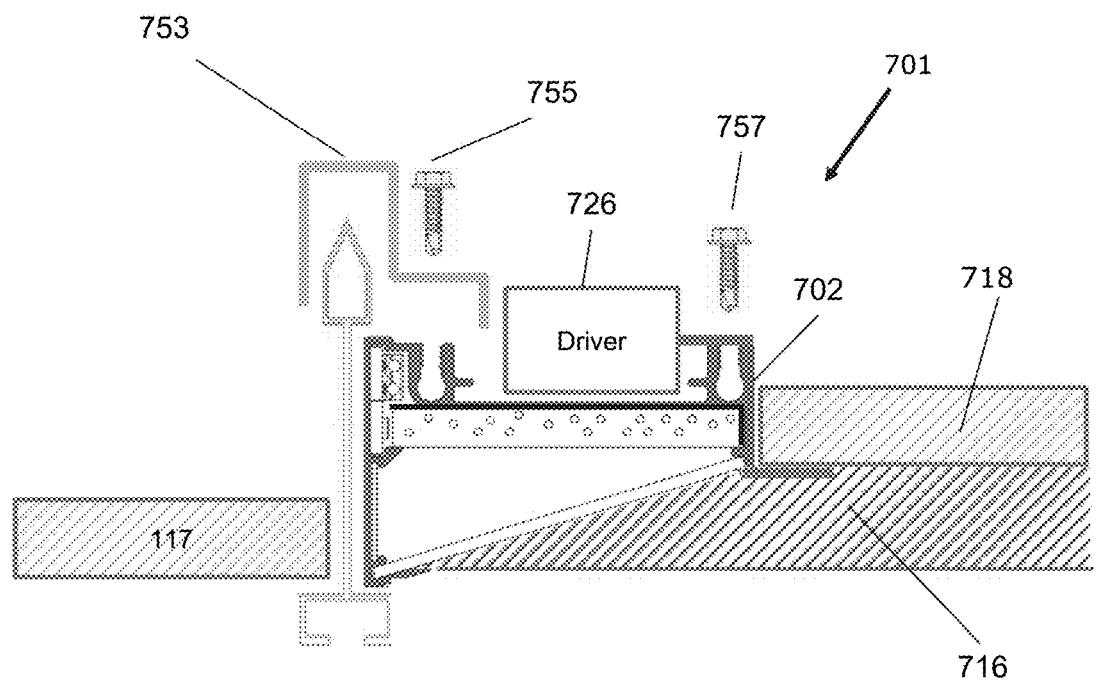

FIG. 7B is a cross-section view of an alternate configuration of the linear lighting module embodiment 701 incorporating a horizontally support feature on the edge of the linear support element 702 that supports the edge of a ceiling panel 704 in an adjacent position and equivalent horizontal plane to the edgelit optical element 702. The linear lighting module 701 is further configured to be securely attached to a T-Bar via a bracket 753 which is attached using one or more mounting screws 755 to the back of the linear support element 702. The linear support element further supports a driver 726 which is also secured using one or more mounting screws 757.

Figure 7C:
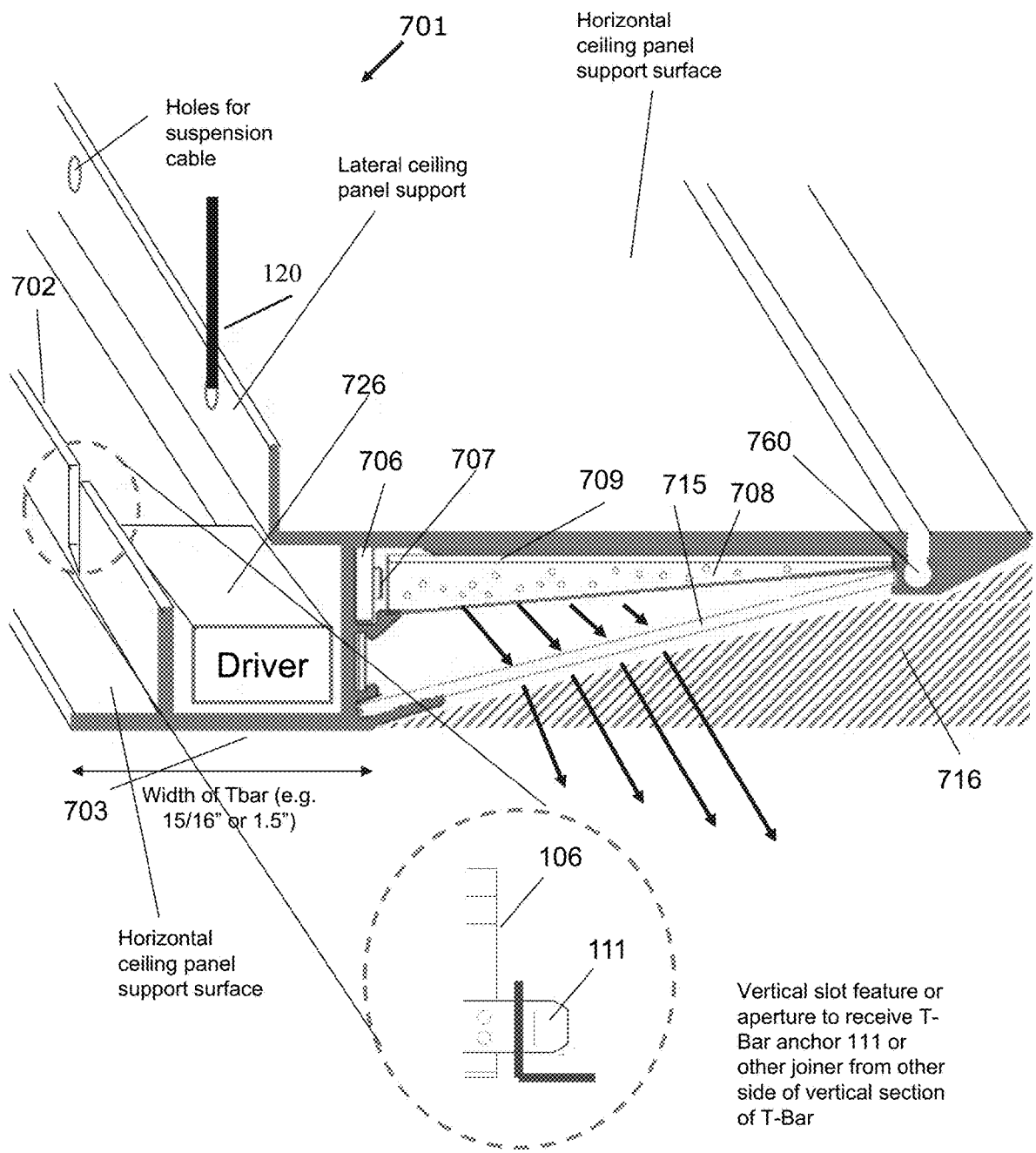
FIG. 7C is a cross section view of a linear lighting module embodiment with a wedge shaped edgelit optical element and angled output face further configured with an elongated T-bar mounting section with slot features.

FIG. 7C is a cross section view of a linear lighting module embodiment 701 with a wedge shaped edgelit optical element 708 and obliquely angled outer lens 715 acting as the output face of the linear lighting module. The linear support element 702 of the module is further configured with an external support feature 703 configured to match the 15/16" or 1.5" width of a flat style T-bar and is utilized as an elongated T-bar mounting section with slot features. The slot features is configured to enable the anchor 111 of a T-bar 106 to be connected and located in an attached position. The embodiment 701 is also configured so as to be positioned in the ceiling grid between two T-bars and aligned perpendicularly to a mounting T-bar at either of its longitudinal ends and supported from its longitudinal ends either by resting on the mounting T-bar or by a supporting end plate. In this configuration the linear support element 702 is not mounted on a T-bar along its longitudinal length but rather is perpendicular to the mounting T-bar and can functionally replace a T-bar when used in a ceiling grid assembly.

Figure 7D:
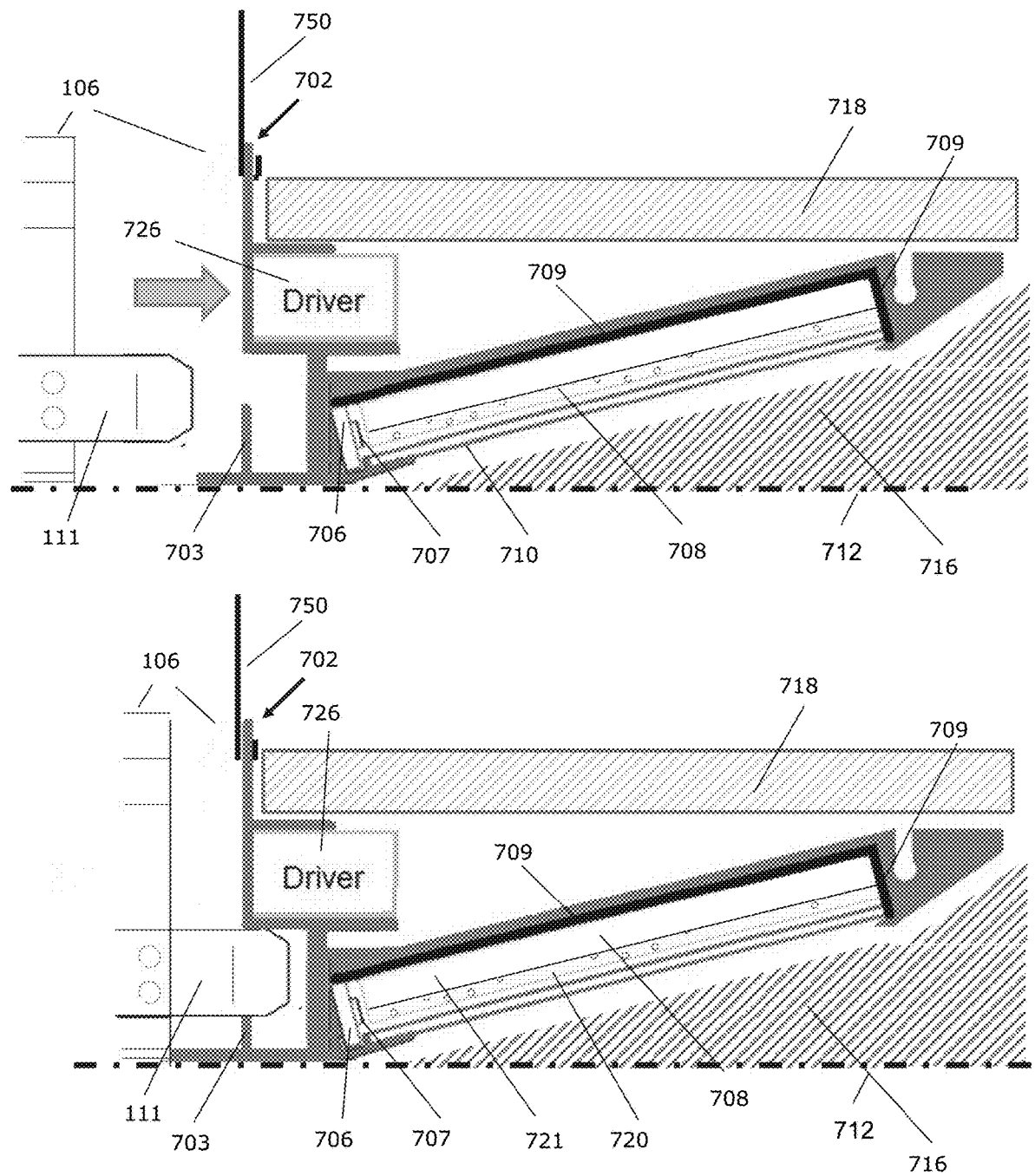
FIG. 7D is a cross section view of a linear lighting module embodiment with angled edgelit optical element and angled output face and further configured to house and support an integral LED driver.

FIG. 7D illustrates details of variations in embodiment linear support element wherein light from a horizontally mounted edgelit low clarity diffuser 708 propagates through a second lens 715 and into the optical cavity 714. In FIG. 7D the edgelit diffuser 708 is positioned below the assembly ceiling panel 718.

Figure 7E:
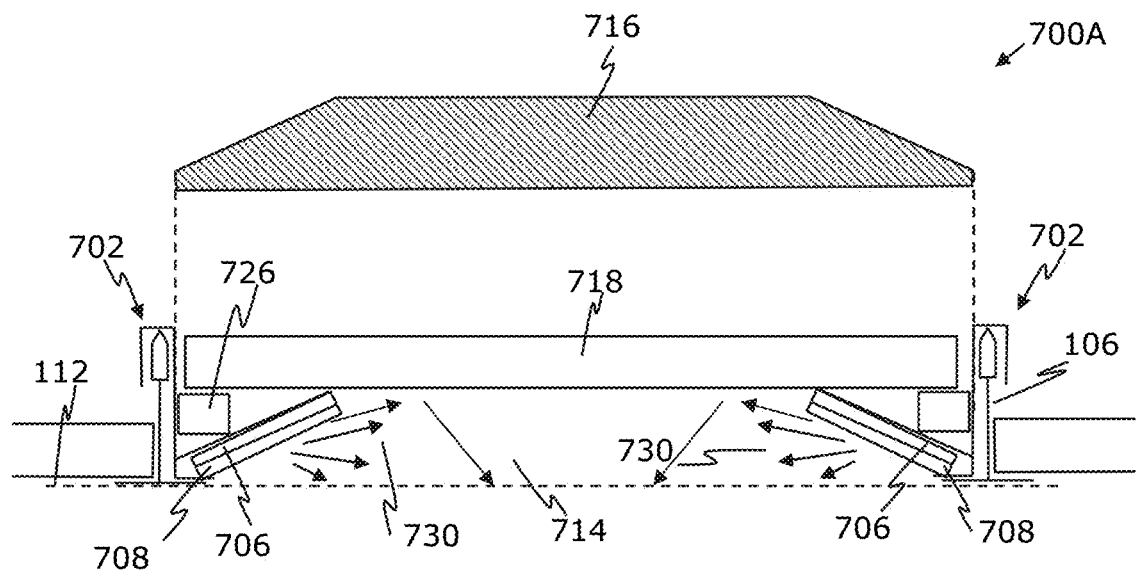
FIGS. 7E-7F are views illustrating variations of ceiling grid assembly embodiment comprising two linear lighting module embodiments with angled output face.
Figure 7F:
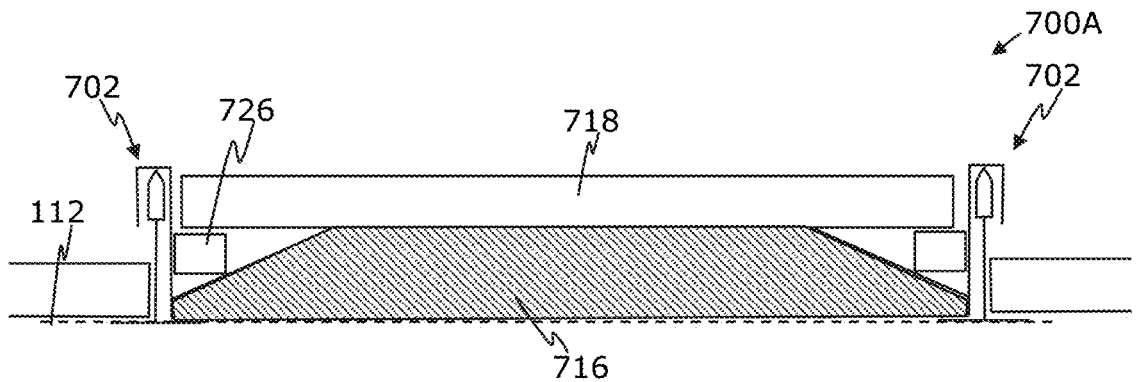

FIGS. 7E-7F are cross section views illustrating variations of ceiling grid lighting assembly embodiment 700 within a suspended ceiling grid system with and without covering element or end plate 716 in assembled position to provide an enclosing face of the optical cavity 714. In embodiment 700, the assembly ceiling panel 718 is supported horizontally above the elongate body of the linear support element. Furthermore, a PCB 706 (with light source) and optical element 708 are oriented at an angle with respect to the ceiling grid plane 112. The inclined orientation tilts the optical element light distribution 730 and also provides a different aesthetic appearance. As illustrated, a portion of the light from the light source illuminates the underside of the assembly ceiling panel 718 and a portion is directed below the ceiling grid plane 112 into the room below. Some of the optical element light distribution 730 is circulated within the central optical cavity 714, for example, reflecting off of the assembly ceiling panel 718 and/or the covering element or end plate 716. Another portion of the optical element light distribution is projected directly from the optical assembly 701. A driver 726 is positioned and obscured from view by the linear support element 702 as well as the light source and optical element.

Figure 7G:
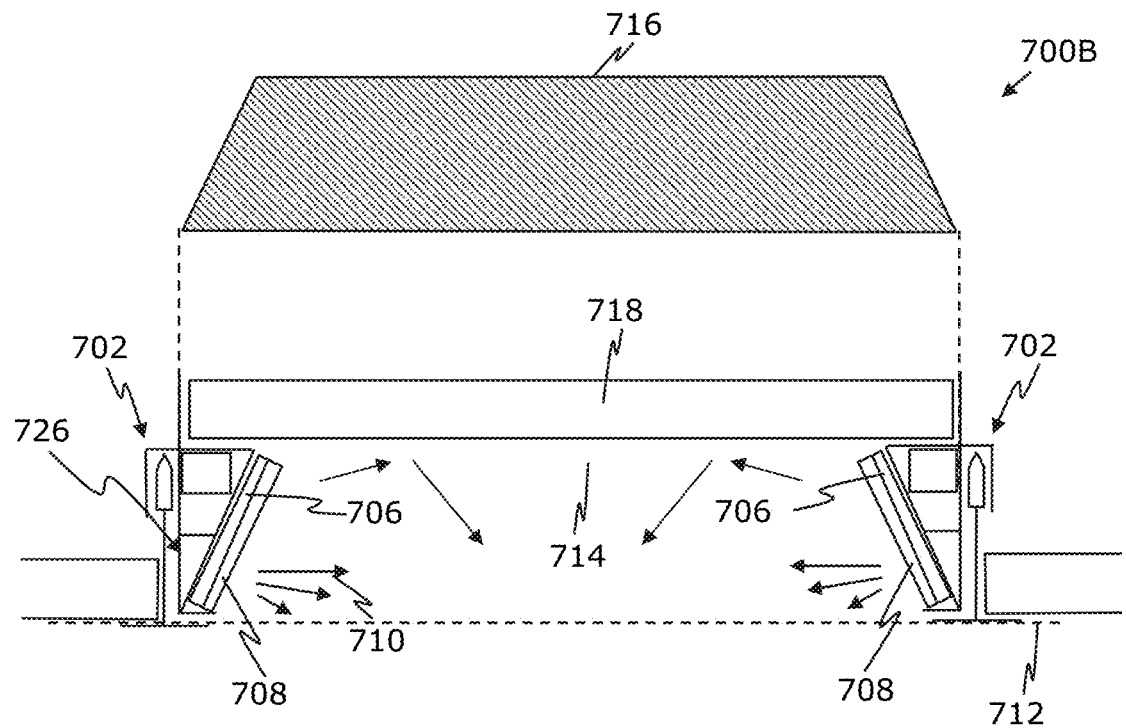
FIGS. 7G-7H are views illustrating variations of ceiling grid assembly embodiment comprising two linear lighting module embodiments with angled output face.
Figure 7H:
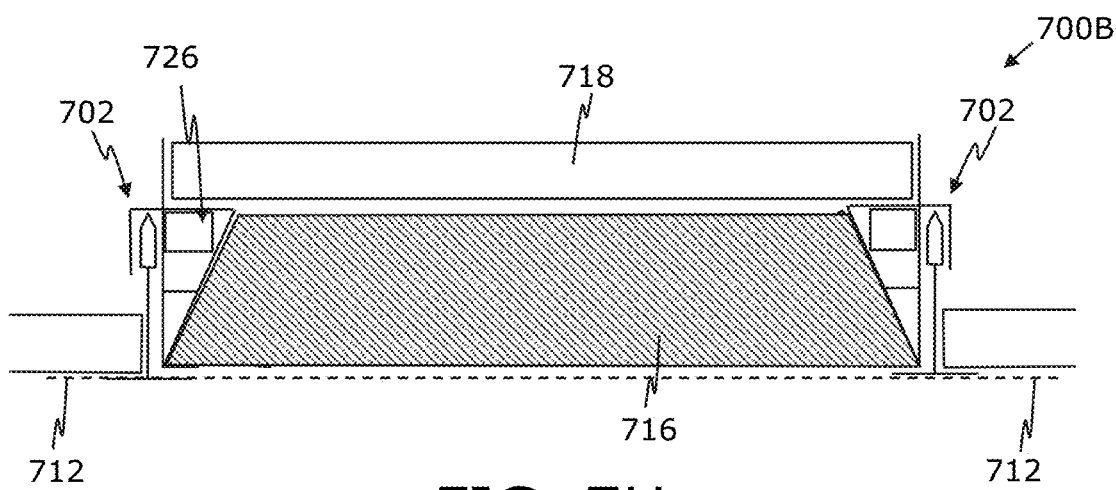

FIGS. 7G-7H are views illustrating variations of ceiling grid lighting assembly embodiment type 700A within a suspended ceiling grid system which contains linear support element 702 supports the ceiling panel horizontally 716 at an elevated height relative to the ceiling grid plane 712 and is further comprising an optical element 808 which is angled or tilted with respect to the ceiling grid plane 712. FIG. 7G and FIG. 7H are cross section views with and without the covering element or end plate 716 in assembled position to enclose the central optical cavity 714. As illustrated, a portion of the light from the light source illuminates the underside of the assembly ceiling panel 718 and a portion is directed below the ceiling grid plane 112 into the room below. FIG. 7G and FIG. 7H are cross section views of ceiling grid lighting assembly embodiment 700B with and without the covering element or end plate 716 in assembled position to enclose the central optical cavity 714.

Figure 7I:
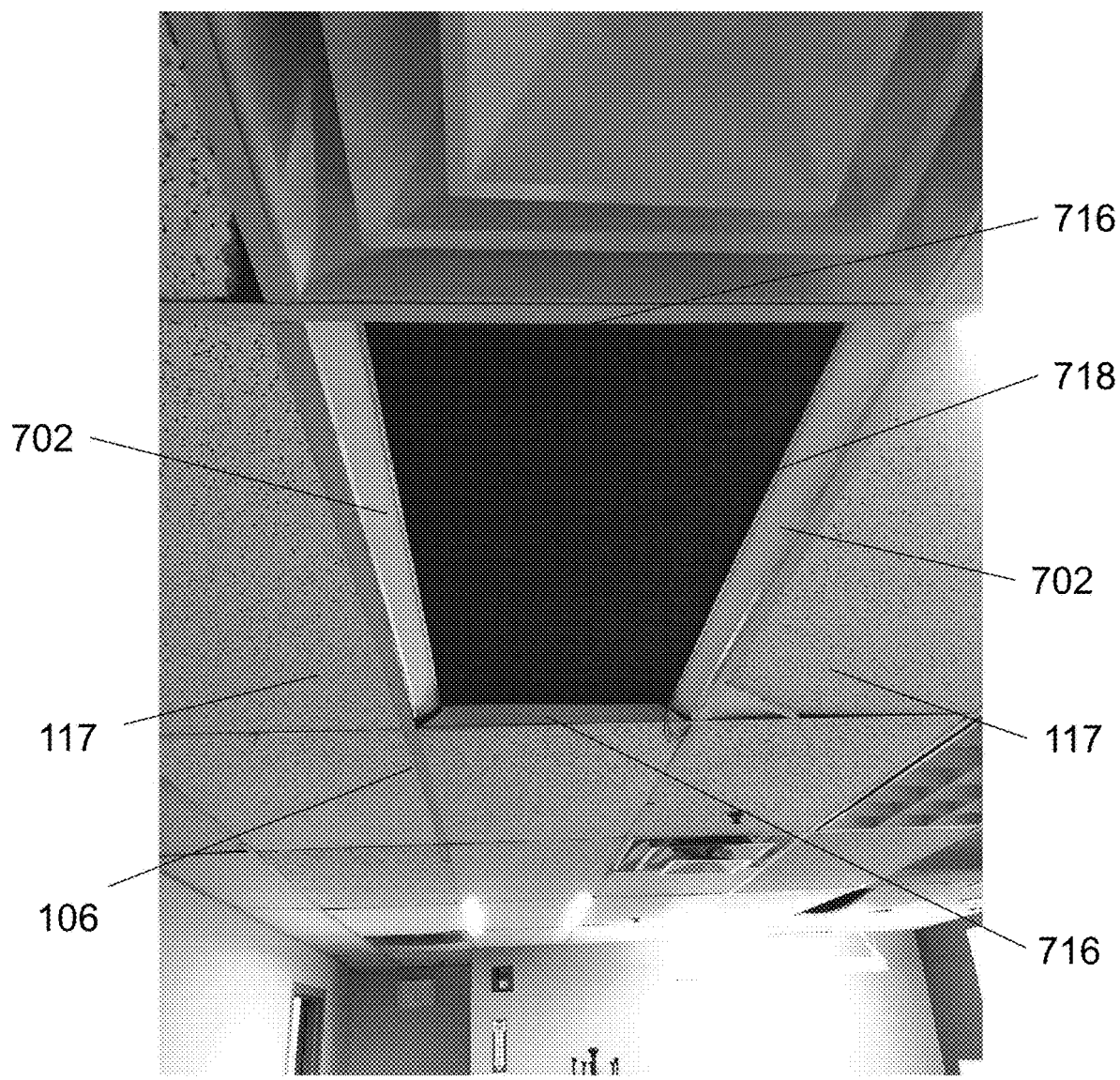
FIG. 7I is isometric diagram illustrating a ceiling grid assembly comprising two linear lighting modules, two covering elements and a centrally positioned acoustic ceiling panel.
Figure 8A:
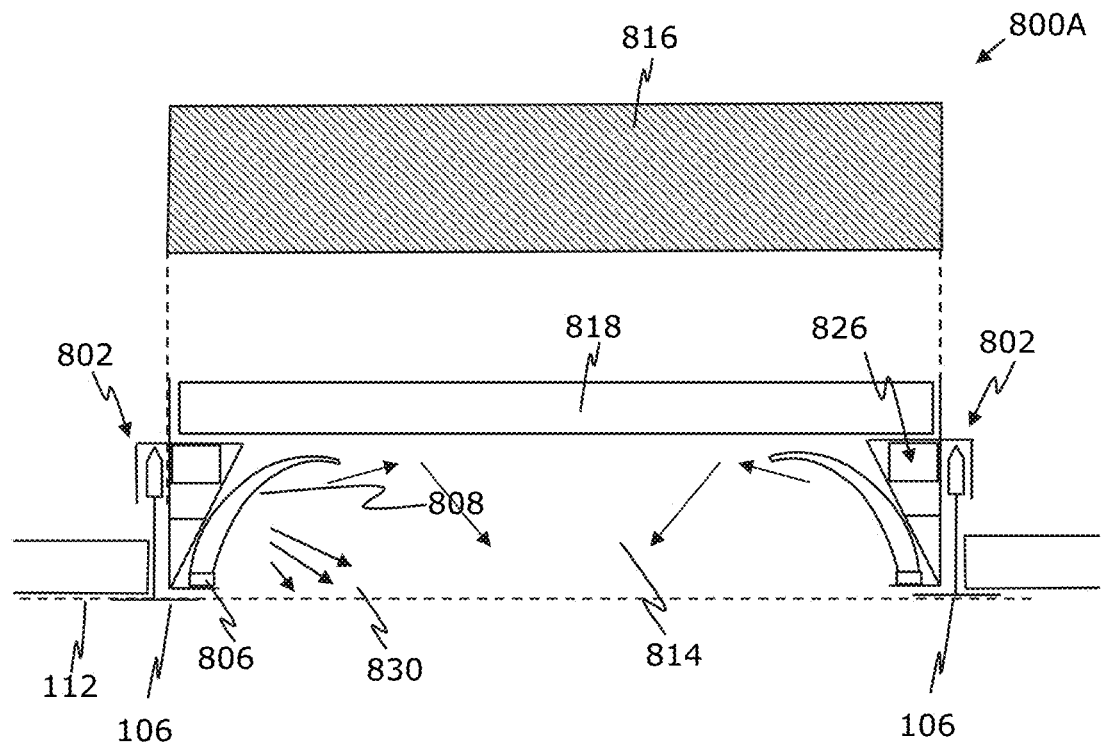
FIGS. 8A-8B are cross section views illustrating variations of ceiling grid assembly embodiment comprising two linear lighting modules further comprising an arcuate shaped output face.
Figure 8B:
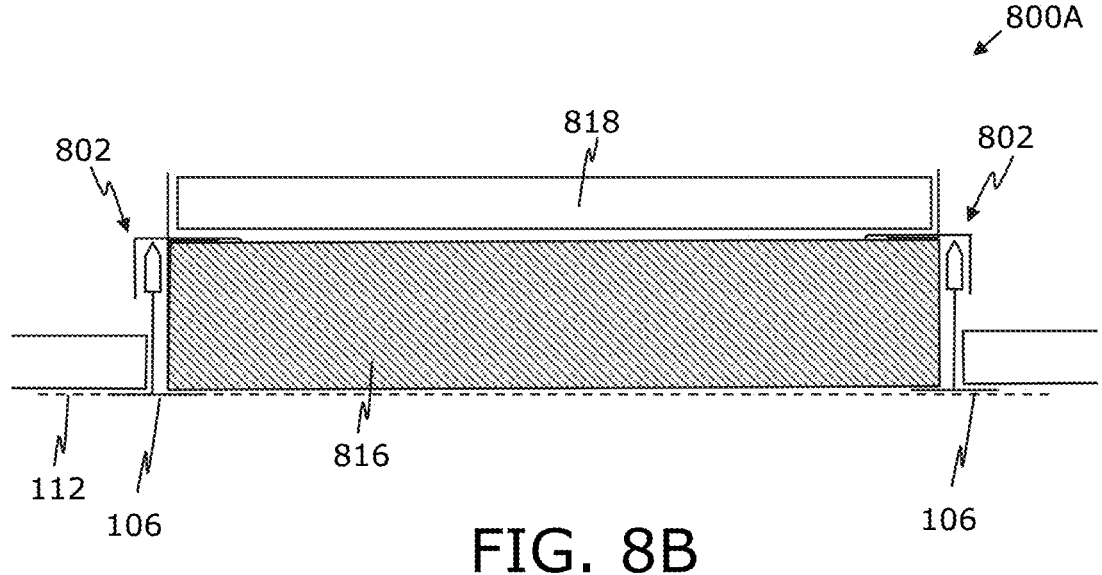

FIG. 7I shows a below ceiling grid perspective view of the embodiment 700 when applied to a 2 ft×4 ft ceiling grid cell. In the embodiment the assembly ceiling panel is comprised of colored acoustic felt FIG. 8A-8B are cross-section views of ceiling grid lighting assembly embodiment 800A with and without covering element or end plate 816 in assembled position to provide an enclosing face of the optical cavity 814 that is additionally bounded by the assembly ceiling panel 818 that is supported by the linear support element 802 at a height above the height of the T-Bar 106. As illustrated, a portion of the light from the light source illuminates the underside of the assembly ceiling panel 818 and a portion is directed below the ceiling grid plane 112 into the room below. The edgelit optical element of FIG. 8A is an extruded arcuate shaped edgelit light guide 808 that is positioned proximate to the PCB 806 with light source). The light guide is essentially a curved wedge shape version of light guides used in other embodiments. This optical element can also be configured to provide light distribution control, brightness uniformity, and aesthetic interest benefits and typically has a reflector positioned proximate to its internal face and a secondary optical element can also be used such as a diffuser or light shaping lens to help further improved uniformity of light and its distribution.

Figure 8C:
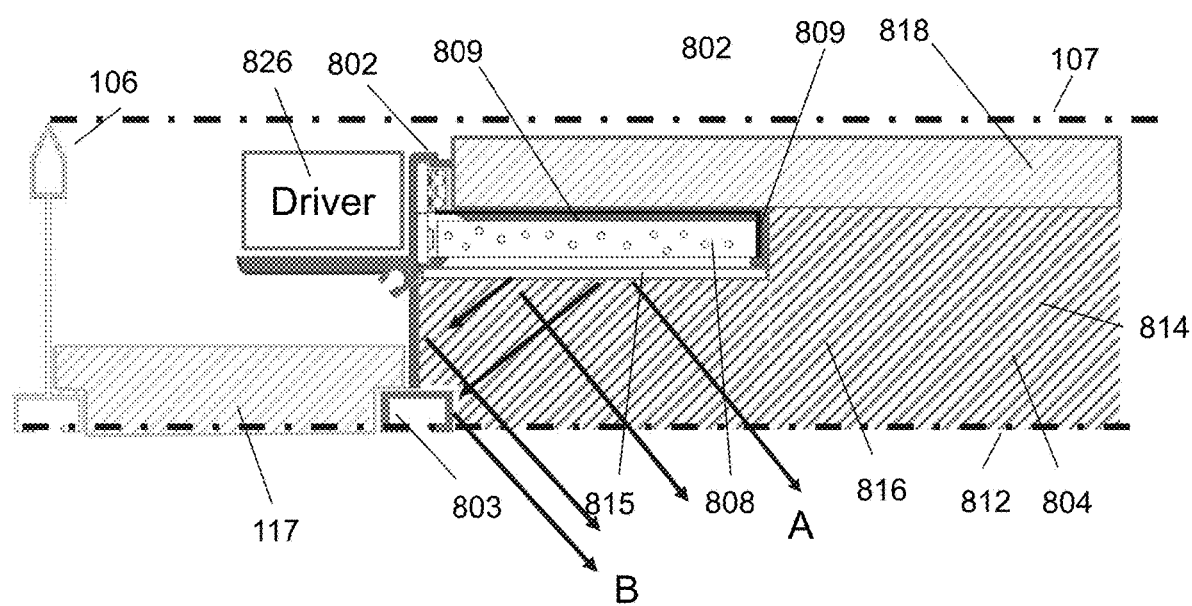
FIG. 8C is a cross section view of a linear lighting module with a horizontally supported edgelit optical element and a horizontally supported output face wherein a ceiling panel is supported horizontally and above both.

FIG. 8C is a cross section view of a linear lighting module with a 9/16" slot style T-bar feature 803. The linear support element 802 supports an LED board in a vertical position and is horizontally supported edgelit optical element 808 and a horizontally supported output face 815 wherein a ceiling panel 818 is supported above the ceiling grid plane and horizontally and above both. The embodiment is also configured so as to be positioned in the ceiling grid between two T-bars and aligned perpendicularly to a mounting T-bar at either of its longitudinal ends and supported from its longitudinal ends either by resting on the mounting T-bar or by a supporting end plate. In this configuration the linear support element 802 is not mounted on a T-bar along its longitudinal length but rather is perpendicular to the mounting T-bar and can functionally replace a T-bar when used in a ceiling grid assembly. In this embodiment the sides of the linear support element become an important internal surface of the optical cavity 814 and is connected to the covering element or end plate 816 as illustrated by optical ray B. Light is reflected back by the reflector 809 on the opposing face of the edgelit optical element and is reflected from the side of the linear support element 802. Other embodiments may configure this reflective surface with features or surface finishes to further customize the appearance and function of the reflective surface.

Figure 8D:
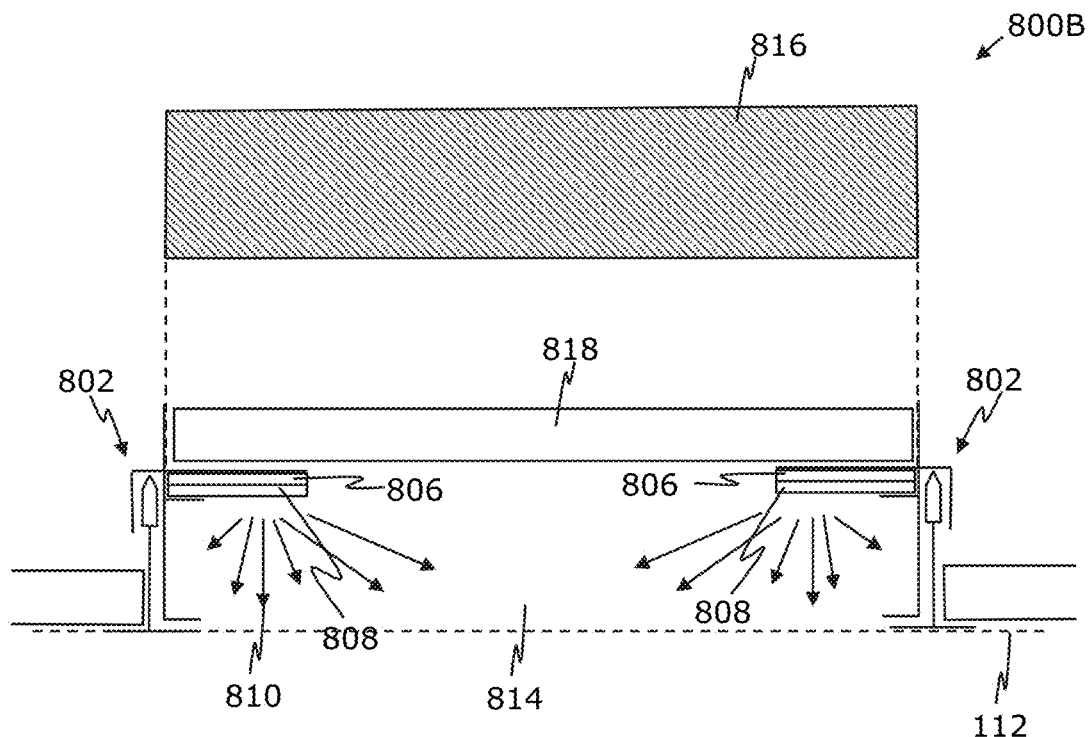
FIGS. 8D-8E are views illustrating variations of ceiling grid assembly embodiment comprising two linear lighting modules with elevated horizontal output faces, with and without covering elements positioned at each elongate end of the linear lighting modules.
Figure 8E:
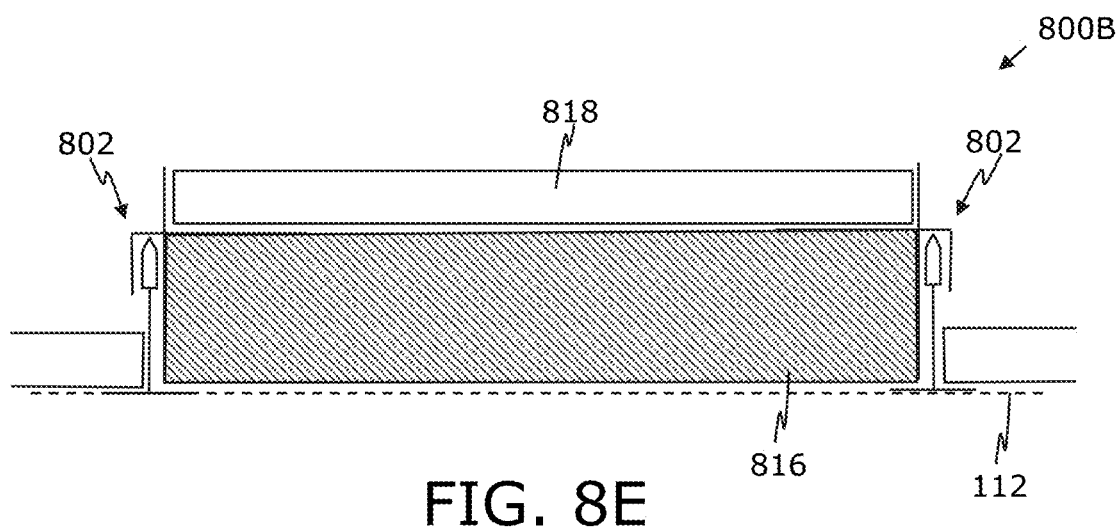

FIGS. 8D-8E are views illustrating variations of ceiling grid assembly embodiment comprising two linear lighting modules, each mounted longitudinally on T-bars, with elevated horizontal output faces, with and without covering elements positioned at each elongate end of the linear lighting modules. The two lighting modules are arranged on either side of a ceiling panel 818 which is supported horizontally at an elevated height relative to the ceiling grid plane.

Figure 9A:
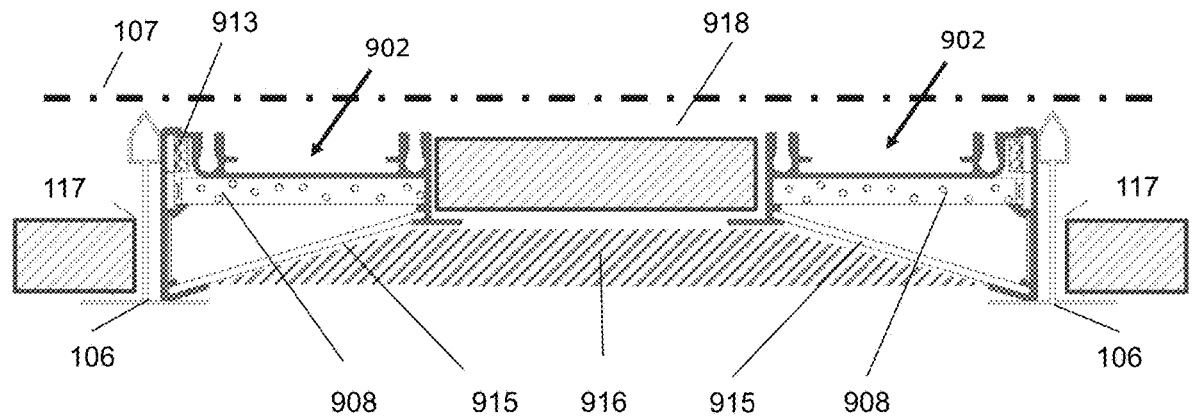
FIG. 9A is a cross section view of a linear lighting module with horizontal edgelit optical element and angled output face configured to support ceiling panel in an adjacent manner.
Figure 9B:
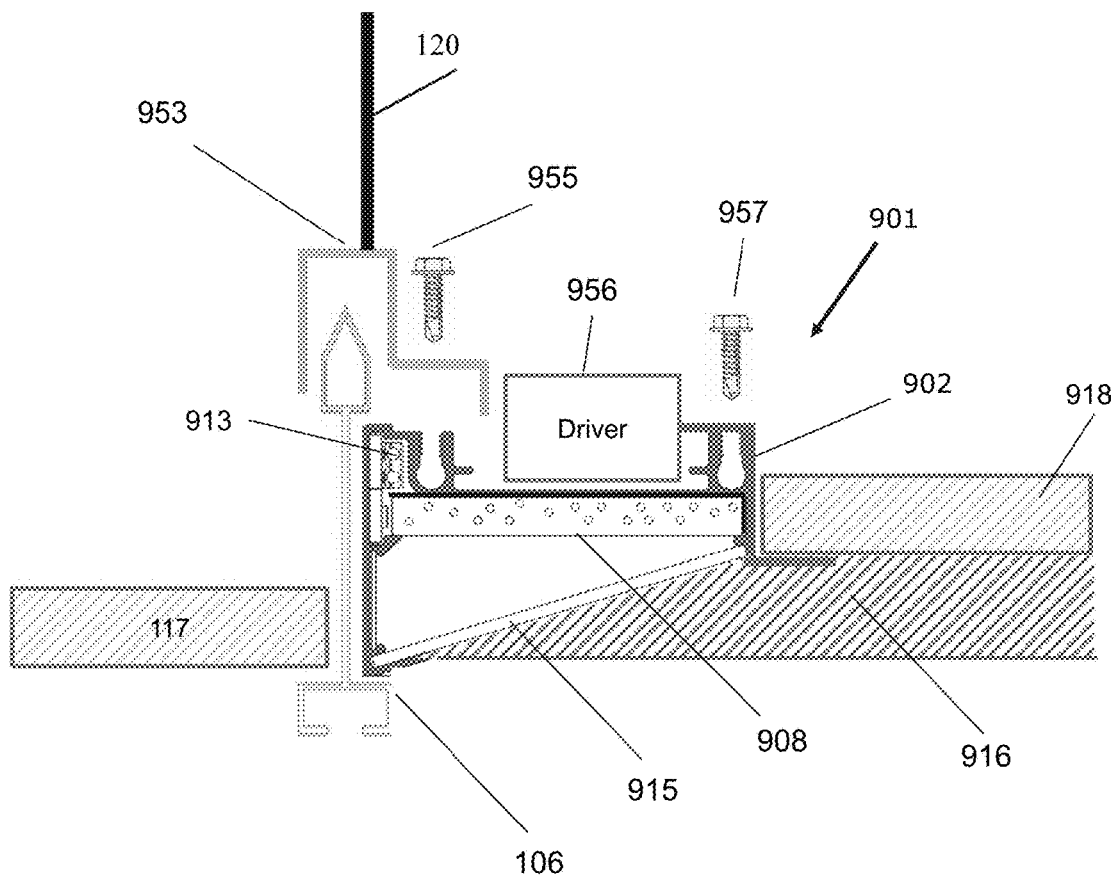
FIG. 9B is a cross section view of the linear lighting module of FIG. 9A with a removable mounting bracket and suspension cable for attachment to the structural ceiling.

FIG. 9A illustrates detail of embodiment linear lighting module 901 comprising support element 902 configured to mount onto a T-Bar wherein the light source comprises an LED board with linear array of LEDs and the optical element 908 is an edgelit diffuser mounted in a horizontal position. Furthermore, a second lens acting as the output surface of the module 915, is positioned at an inclined angle in order to adjust the light distribution output and/or increase brightness uniformity. FIG. 9B also illustrates an embodiment configured to mount on a T-Bar with the covering element or end plate 916 and linear support element 902C further comprising a mounting bracket 953 which is fastened in position with screws 955 to mount onto the T-Bar 106. Furthermore, the driver 926 can also be mounted to the linear support element by a bracket and screw 957.

FIG. 9B also illustrates an embodiment configured to mount on a T-Bar with the covering element or end plate 916 that also forms a internal side of the optical cavity. The linear support element 902 is further comprising external features to accommodate and fix a mounting bracket 953 which is fastened in position with screws 955 to mount onto the T-Bar 106. Furthermore, the driver 926 can also be mounted to the linear support element by a bracket and screw 957.

Figure 9C:
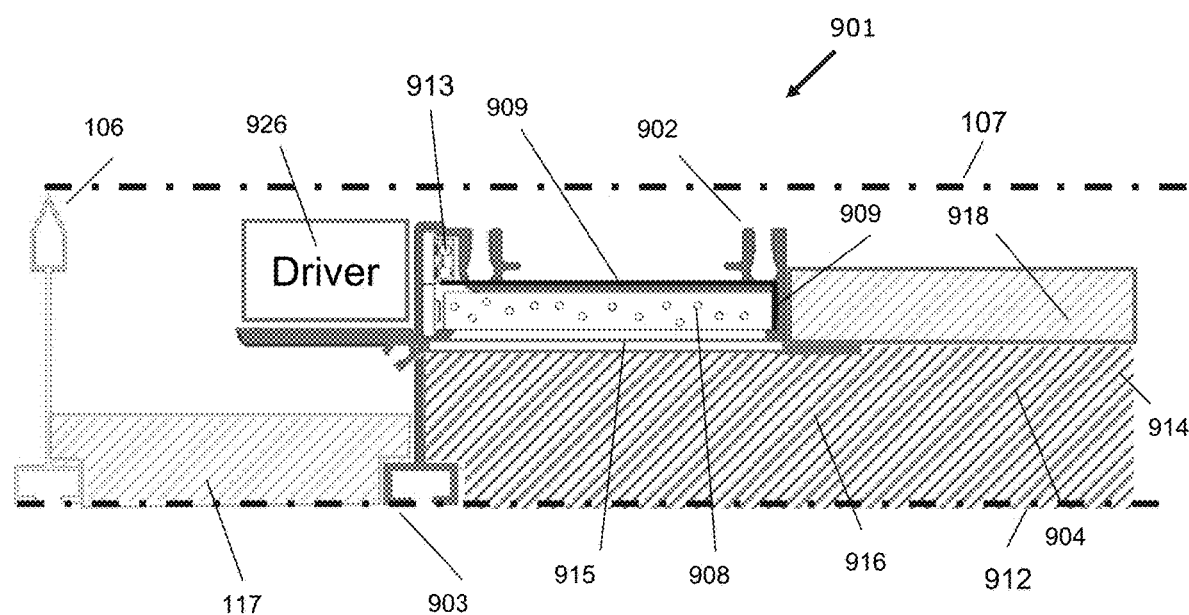
FIG. 9C is a cross section view of a linear lighting module with horizontal edgelit optical element and horizontal output face further comprising a 9/16" slot style T-bar feature and integrated LED driver support section.

FIG. 9C illustrates detail of embodiment linear lighting module 901 comprising support element 902 configured to mount onto a T-Bar wherein the optical assembly comprises an LED board with linear array of LEDs and the optical element 908 is an edgelit diffuser mounted in a horizontal position. Furthermore, a second lens acting as the output surface of the module 915, is positioned at an inclined angle in order to adjust the light distribution output and/or increase brightness uniformity. The T-bar support feature 903 is configured to appear and function as a horizontal portion of a 9/16" slot style T-Bar. The embodiment is also configured so as to be positioned in the ceiling grid spanning across a T-bar cell between two T-bars and aligned perpendicularly to a mounting T-bar at either of its longitudinal ends and supported from its longitudinal ends either by resting on the mounting T-bar or by a supporting end plate. In this configuration the linear support element 902 is not mounted on a T-bar along its longitudinal length but rather is perpendicular to the mounting T-bar and can functionally replace a T-bar when used in a ceiling grid assembly. In this embodiment the sides of the linear support elements are supported at each end by a covering element end plate 916 which in turn becomes an important internal surface of the optical cavity 914. Light is reflected back by the reflector 909 on the opposing face of the edgelit optical element and is reflected from the side of the linear support element 902. Other embodiments may configure this reflective surface with features or surface finishes to further customize the appearance and function of the reflective surface.

Figure 9D:
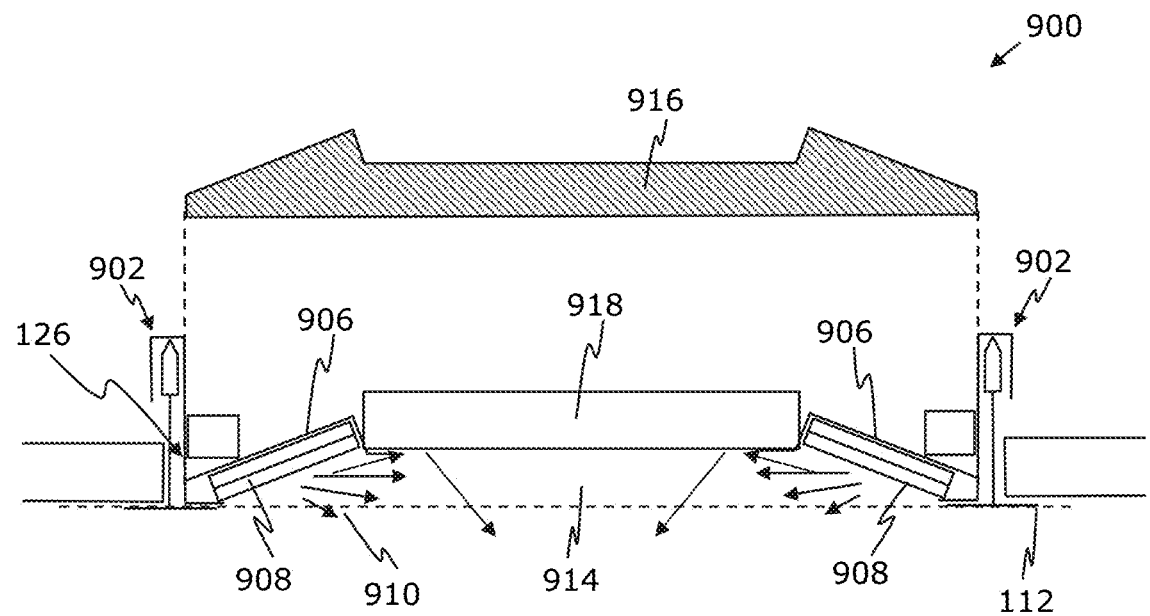
FIGS. 9D-9E are views illustrating variations of ceiling grid assembly embodiment comprising linear lighting modules with angled output faces and configured to support a reduced size ceiling panel at an elevated height.
Figure 9E:
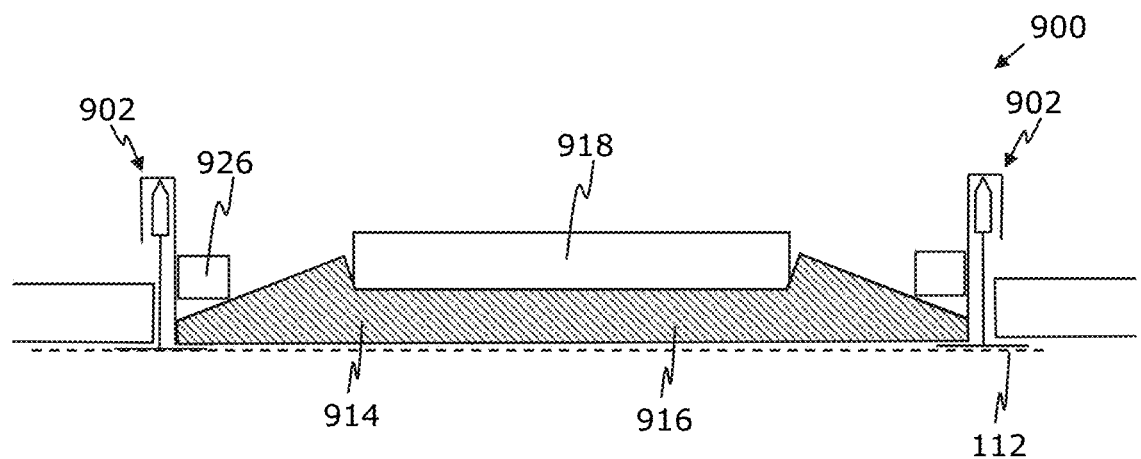

FIGS. 9D-9E are views illustrating variations of ceiling grid lighting assembly embodiment type 900 within a suspended ceiling grid system wherein an assembly ceiling panel 918 is smaller in width than the T-Bar grid spacing and supported by two opposing linear support elements 902 which each also hold in inclined position PCB 906 (with light source) and optical element 908. As illustrated, a portion of the light from the light source illuminates the underside of the assembly ceiling panel 918 and a portion is directed below the ceiling grid plane 112 into the room below. FIG. 9D and FIG. 9E show respectively views with and without the covering element or end plate 916 in assembled position as an enclosing face of the central optical cavity 914.

Figure 10:
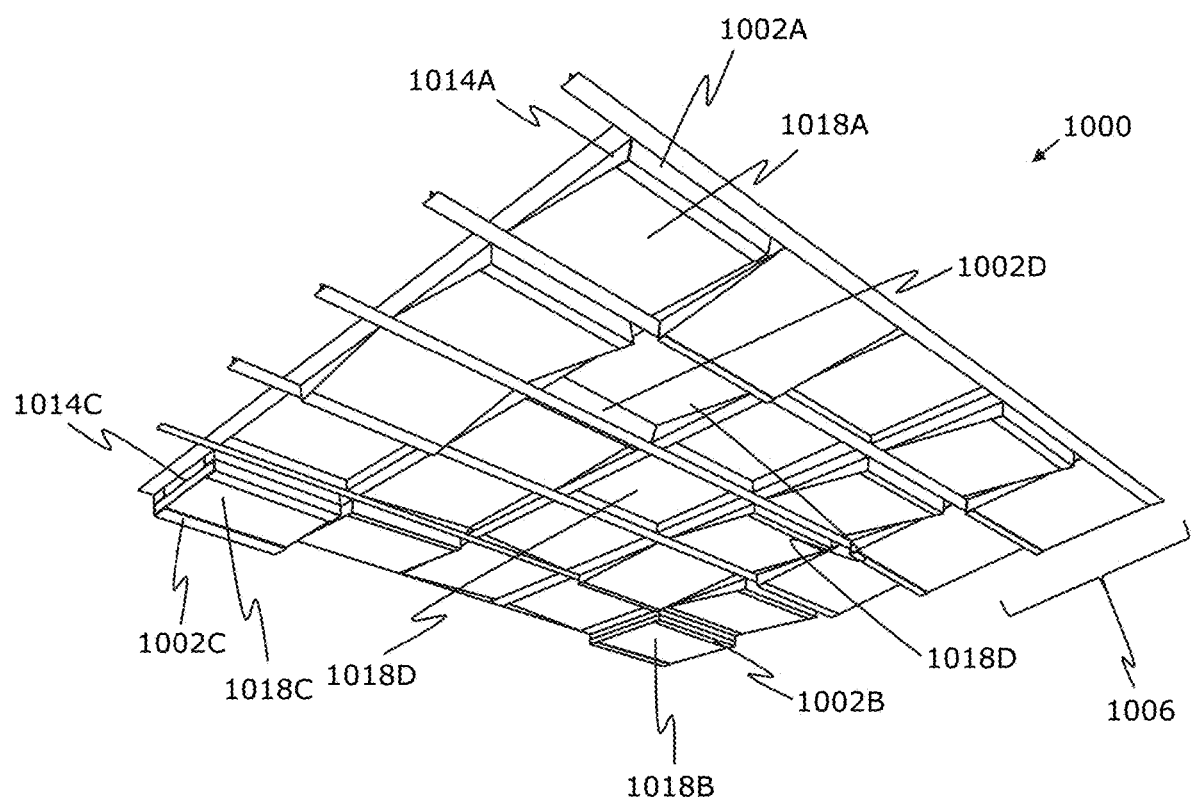
FIG. 10 is an illustration of a perspective below ceiling view of an exemplary ceiling grid system with multiple embodiments of ceiling grid lighting arrays.

FIG. 10 is an illustration of a ceiling grid system 1000, utilizing several examples of ceiling grid lighting assembly embodiments in accordance with the present disclosure. As shown, the ceiling grid system 1000 comprises at least one ceiling panel 1018A-D supported by at least one linear support elements 1002A-D As shown, the at least one ceiling panel 1018A-D are supported in a tilted (or higher or lower) manner relative to a ceiling grid plane 1006 of the ceiling grid system 1000. Such supporting of the at least one ceiling panel 1018A-D by the at least one linear support elements 1002A-D provides a three-dimensional appearance to the ceiling grid system 1000. The ceiling system 1000 also depicts covering elements, such as covering element or end plates 1014A-B1.

Figure 11A:
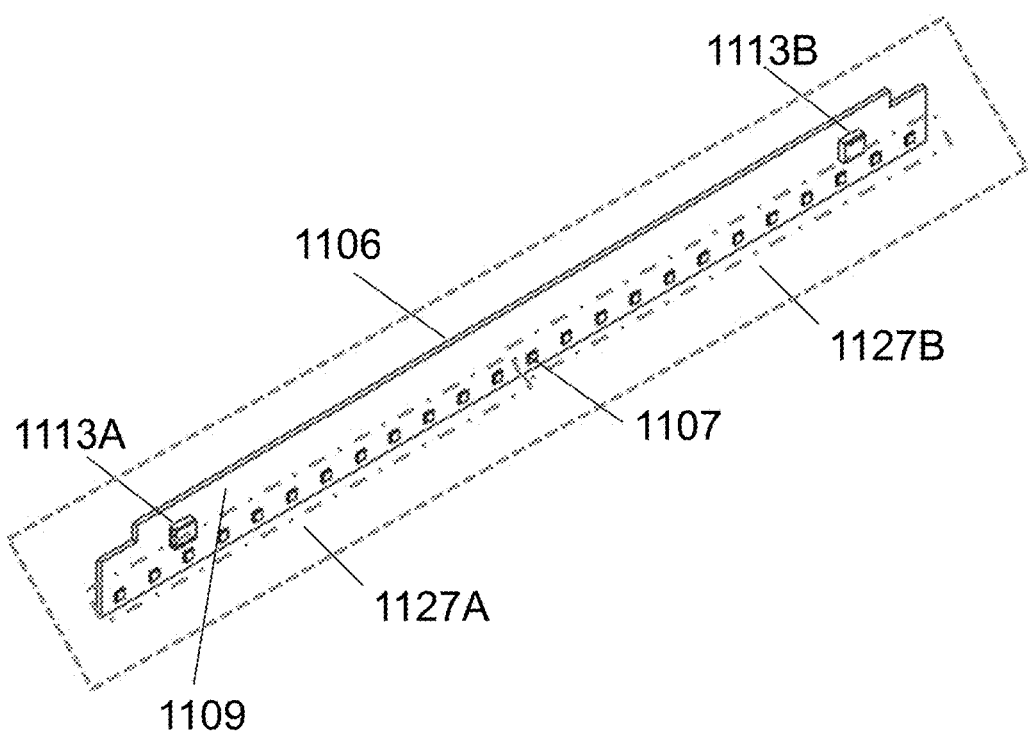
FIG. 11A and FIG. 11B are embodiment LED light sources.
Figure 11B:
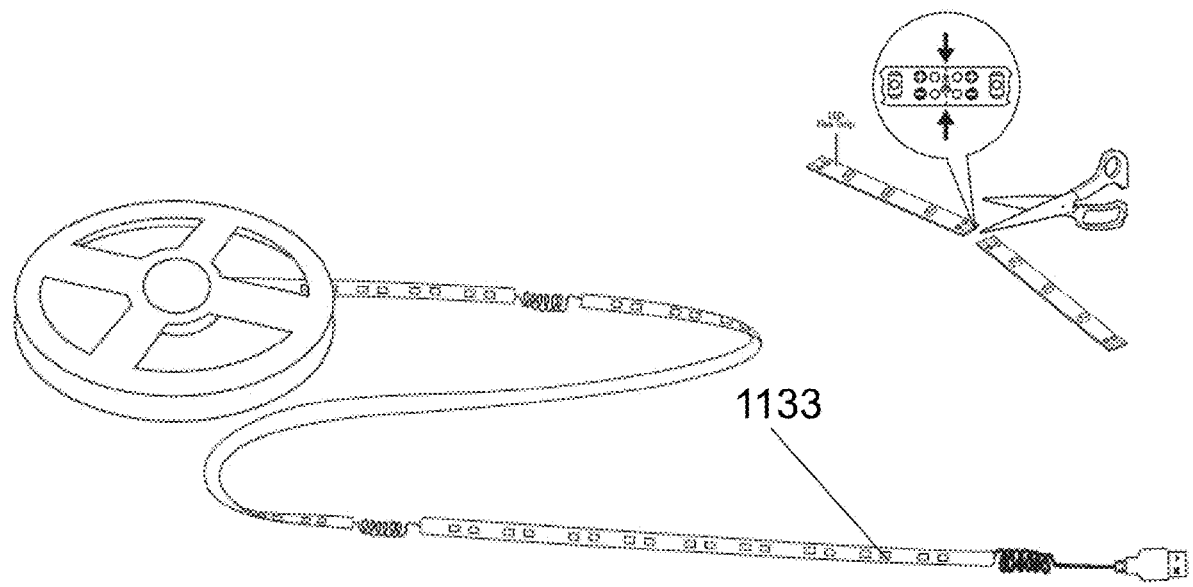

FIG. 11A and FIG. 11B are embodiment configurable linear LED boards; FIG. 11A showing an embodiment with rigid linear printed circuit board (PCB) 1108 with packaged LED light sources 1107 mounted on the PCB and connected via its electrical circuit with power coupled to the PCB via electrical connectors 1113A and 1113B. The configurable linear LED light source 1133 of FIG. 11A shows a version with two individual electrical channels 1127A and 1127B each one having a separate electrical connector 1113A and 1113B which allow the string of 12 LEDs connected in series 1109 in each electrical channel to be electrically addressed and controlled. In the embodiment shown the LEDs 1107 are arranged into two parallel connected circuits of 12 LEDs in series. The forward voltage is approximately 33 V although this is typically modified to match the requirements of the driver or controller being used. The rigid LED board 1106 can also be cut to length at increments between each electrical channel. FIG. 11B illustrates a flexible strip which can be cut to length off of a reel. As shown in FIG. 11B, configurable linear LED light sources 1133 can also be manufactured on a flexible circuit material and supplied in a "tape-like" format on a reel with multiple segments corresponding to a maximum required length and then cut to length as needed for various versions of linear support elements.

Figure 11C:
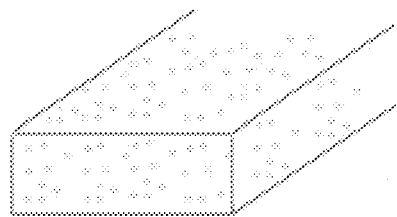
FIG. 11C isometric illustrations of various embodiments of edgelit optical elements used in ceiling grid lighting assemblies.
Figure 11C:
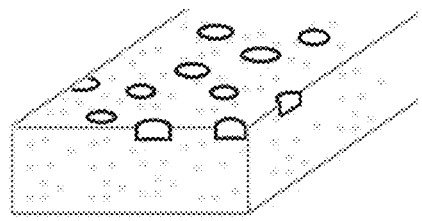
Figure 11C:
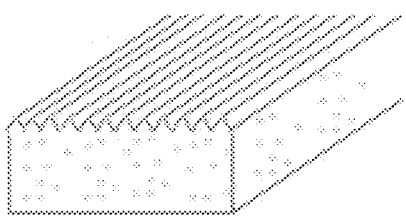
Figure 11C:
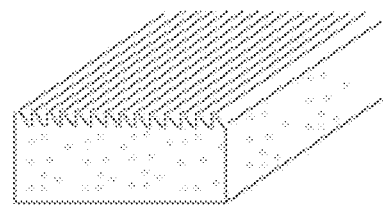
Figure 11C:
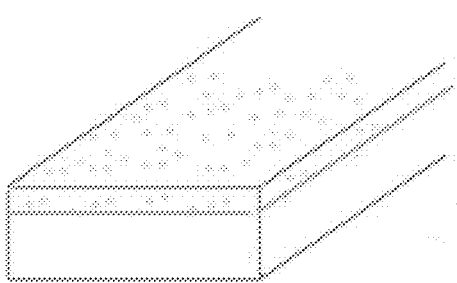
Figure 11C:
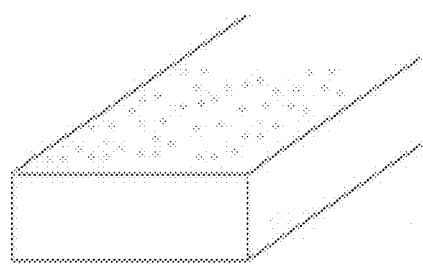
Figure 11C:
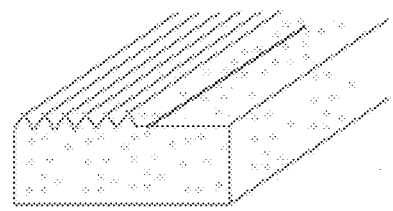

FIG. 11C isometric illustrations of various embodiments of edgelit optical elements used in ceiling grid lighting assemblies illustrating key elements. Important to various embodiments are dimensions of width and height. Volumetric light diffusion is produced by dispersed regions within the light guide having refractive index different than the bulk matrix material. Concentration of diffusing blend is an important variable in effecting light scattering properties that influence angular light distribution and uniformity of beam pattern. Embodiments described include in the light guide formulation a specific commercially available diffusion resin, Plexiglas® Diffuse V045 blended into clear PMMA resin at the indicated weight percent within a range from zero to 20%. Alternative means in creating dispersed regions of differing refractive index from the light guide matrix material include dosing microbeads into the light guide resin formulation as well as forming second phase regions in situ during by fluid phase mixing of immiscible blends of polymers. In addition to refractive index, the quantity per volume, size, and shape of dispersed regions effect light scattering properties. In the case of immiscible blends formed by fluid phase mixing, the shape of second phase regions may be other that spherical, for example oblate paraboloid, thereby generating non-symmetric light scattering. Processes for fabricating light guides include extrusion and injection molding. Surface features and their pattern of arrangement on a face of the light guide are of importance in converting internal reflection within the light guide to output from the module at desired angular light distribution.

FIG. 11D is table containing optical properties of various embodiments of edgelit optical elements. Ceiling grid lighting assemblies were configured using both high clarity light guides and low clarity edgelit diffusers. Although there is a certain degree of interchangeability associated with each configuration of edgelit optical element there are also several distinctions that affect the choice. Most noticeable are a) efficiency, b) quality of light, and c) control of lighting distributions. When high clarity light guides are used in linear lighting modules configured for narrow width (less than 6") edgelit optical elements the efficiency is generally lower than for the same module when using edgelit low clarity diffusers. This is because the volumetric scattering of the diffuser generally tends to result in a performance more like a high efficiency diffusion lens than a light guide. Total internal reflection (TIR) is not the dominant mechanism and light is therefore not trapped in the bulk material of the optical element. Quality of light is also improved with edgelit diffusers; there is less headlamping or hotspotting because light in the optical element is mixed much closer to the input face where the LED light sources are situated. Color uniformity is also improved by the volumetric scattering. There is also more control of the angles and spread of lighting distributions with edgelit diffusers. Because TIR is not the dominant mechanism within the optical element it is possible to configure the edgelit diffuser for optimized lighting distributions without concern for the TIR effect. Most notably the concentration and distribution of the volumetric scattering can be adjusted without concern for TIR implications. Additionally, surface features can be added to one or more surfaces of the edgelit diffuser to further refract and otherwise redirect any transmitted light. In the embodiments detailed herein the terms "light guide" and "high clarity light guide" are also interchangeable. The table in FIG. 11D details that light guides are typically measured as having a clarity of almost 100 whereas the edgelit diffuser embodiments provided all are measured with clarity of less than 25. Conversely; light guides typically have very low haze whereas the edgelit diffuser embodiments were all measured with haze greater than 80%. Light guides also tend to have high gloss surfaces to help with TIR whereas the surfaces of the edgelit diffusers were all measured to have much lower gloss levels. It is also noted that an "edgelit diffuser" may also be called "light guide" and vice versa. In such cases the optical properties should be used to bring clarity to the characterization. It is also possible that an optical element may have properties similar to both light guides and edgelit diffusers, for example the optical element might be high clarity and low haze but have a low gloss matte surface. Alternatively the optical element might be low clarity and high haze with a high gloss surface.

Figure 11E:
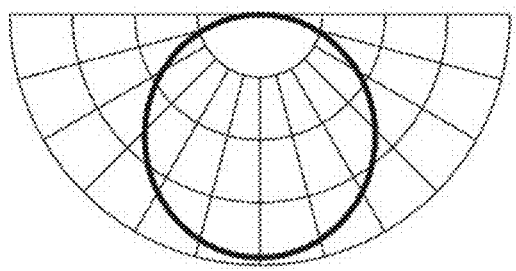
FIG. 11E represents in polar plot form a sampling of light distribution types achievable with variously configured ceiling grid assembly embodiments.
Figure 11E:
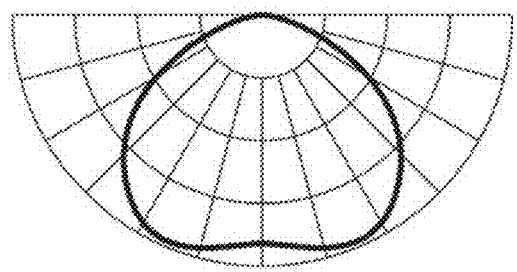
Figure 11E:
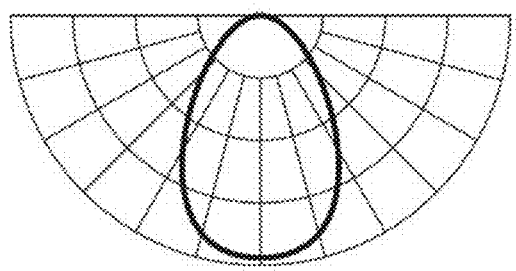
Figure 11E:
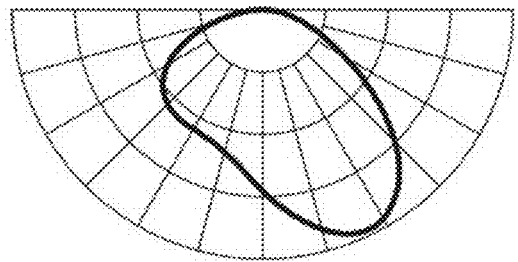
Figure 11E:
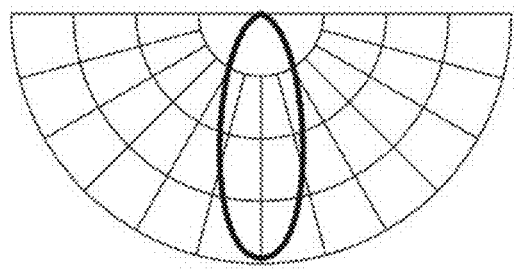
Figure 11E:
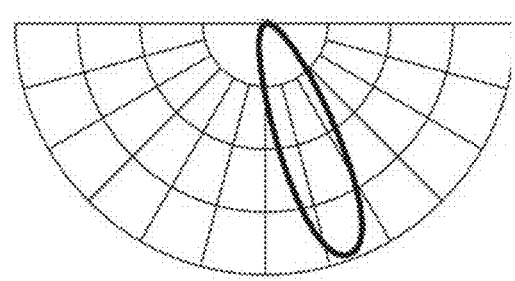

FIG. 11E illustrates a typical range of lighting distributions that can be achieved by configuring the linear lighting module. Several non-lambertian, anisotropic lighting distributions are provided based upon various direct lit and edgelit optical elements and a secondary outer lens with varying degrees of volumetric light scattering and surface microstructures such as prisms, microlens and sawtooth lenticular features. Lighting distributions are possible that are anisotropic or non-lambertian and lighting distributions can also be tilted or asymmetric which is particularly important for wall washing, task lighting or cove lighting. In general, overall light distribution of a ceiling grid lighting assembly correlates with the light distribution of individual light sources, optical elements, and ceiling panels within the ceiling grid lighting assembly and particular components and their arrangement can be selected to create specific desired light distributions. Additional lighting distributions can also be achieved by changing the configuration of the edgelit optical element, e.g. light guide or edgelit diffuser. For instance; increasing the amount of light scattering will result in a broadening of the lighting distribution. Changing the shape of the edgelit optical element, such as replacing a planar shape cross section with a wedge shape, will impact the angularity of the lighting distribution.

Figure 12A:
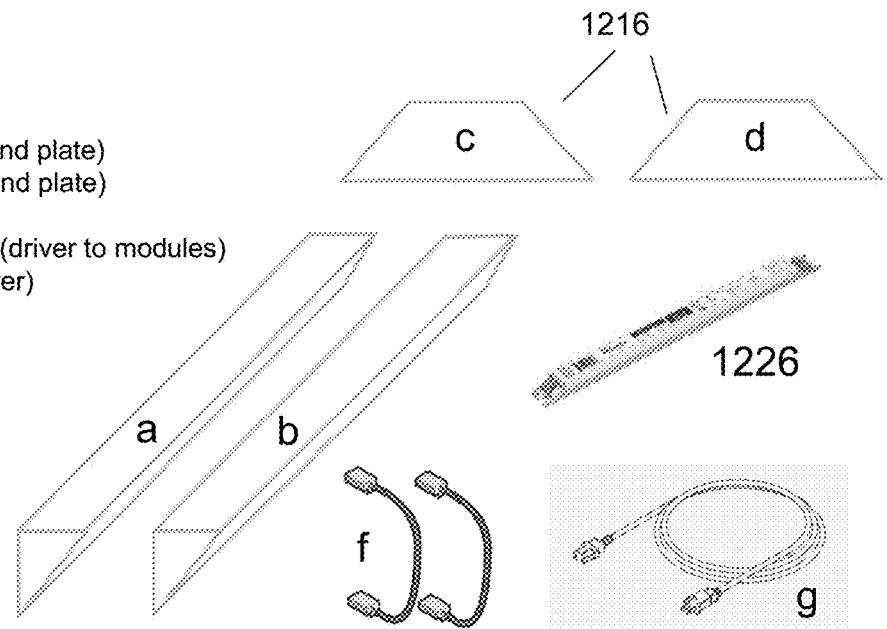
FIG. 12A is an illustration of individual components for use in configuring and installing embodiment ceiling grid lighting assemblies in combination with an existing ceiling grid system.

FIG. 12A is an illustration of individual components for use in configuring and installing embodiment modular ceiling grid lighting assemblies in combination with a ceiling grid system. A benefit of the ceiling grid lighting assembly as detailed in the embodiments is that it can be shipped as a kit of parts and "flat packed" which can significantly save on volume and weight. This in turn can reduce carbon footprint. The parts can also be designed to easily connect together at the job site prior to install. Linear support elements can be preassembled with integrated light sources prior to shipment, and other components including the covering element or end plates 1216 can be selected for retrofit into an existing ceiling grid system or for concurrent assembly into a new installation.

Figure 12B:
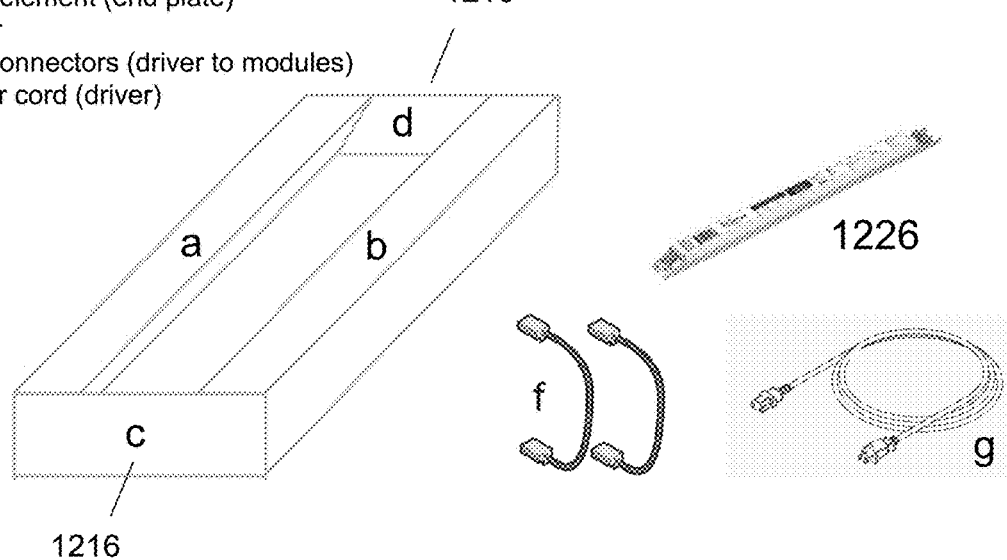
FIG. 12B is and illustration of partially pre-assembled components for use in configuring and installing embodiment ceiling grid lighting assemblies in combination with an existing ceiling grid system.

FIG. 12B is and illustration of partially pre-assembled components for use in configuring and installing embodiment ceiling grid lighting assemblies in combination with an existing ceiling grid system or in the case of a new installation, suspended ceiling grid components. In this illustration the ceiling grid lighting assembly can be shipped as a partial assembly of the linear support element (a & b) and covering elements (c & d) 1216 securely connected to each other assembled. The remaining driver 1226, wire connectors and power cord are packed and shipped individually.

Embodiment lighting modules and lighting assemblies provide advantages in configuring lighting fixtures within ceiling grid arrangements to meet seismic design considerations; for example as defined by the International Building Code Seismic Design Categories D, E & F. In particular embodiments of modular ceiling grid lighting assemblies may be configured for advantage in seismic design compliance by reducing light fixture weight, providing alternative grid attachment, and allowing improved plenum accessibility thereby specifically 1) providing means of positive attachment to the ceiling grid, 2) eliminating the need for supplemental hanging wire since an integrated linear support element could replace a cross runner and support at least 101 bs, 3) allowing for easier, quicker and cheaper slack wire attachment for lighter weight categories, 4) avoiding the need of "approved hangers" for fixtures weighing over 561 bs, and 5) providing a safe and flexible electrical "conduit" system within the overall ceiling grid assembly.

Embodiments of the present disclosure provide a lighting module for use within a ceiling grid system. In another aspect, the present disclosure also provides a ceiling grid system comprising T-Bar cells defined by the vertical and horizontal portions of the T-Bars. The ceiling grid system comprises at least one linear lighting module, wherein the ceiling grid system may be formed by supporting a plurality of ceiling panels thereon the at least one linear lighting module. Such supporting of the plurality of ceiling panels on the at least one linear lighting module enables convenient installation and replacement of the ceiling grid system, such as, by arranging the at least one linear lighting module on the T-Bars or in place of a T-Bar and arranging the plurality of ceiling panels on the at least one linear lighting module. Furthermore, when one or more of the at least one supporting element are determined to have a defect therein, the defective linear lighting module can be easily replaced without having to replace an entirety of the ceiling grid system. Furthermore, the at least one linear lighting module may be easily fabricated in a cost-effective manner to have different properties (such as, orientations of linear and/or ceiling panel supporting portions) relative to each other, thereby, enabling to provide different appearances and easy customizability to the ceiling grid system. The linear lighting modules can be used to support the plurality of ceiling panels, as well as other components, such as utility components including electrically and/or electronically operated devices such as sensors, at least one optical element such as light guides and so forth. Such utility components and the at least one optical element can be used to provide additional functionality to the ceiling grid system (such as, using a plurality of sensors, smoke detectors and so forth for increasing a safety in an enclosure wherein the ceiling grid system is installed), and/or for improving an aesthetic appearance associated with the ceiling grid system (such as, by using at least one light source, multichromatic light sources and so forth), respectively. Furthermore, the ceiling grid system includes the at least one lighting module mounted on T-Bars to support the plurality of ceiling panels. Such lighting modules can be mounted on existing T-Bars associated with conventional ceiling grid systems, thereby, enabling easy, time-efficient, and cost-efficient replacement of a conventional ceiling grid system with a ceiling grid system of the present disclosure. For example, when the conventional ceiling grid system comprises troffer fixtures therein, the at least one lighting module can be installed on the conventional ceiling grid system, such as in a 2×4, 2×2 or 1×4 configuration. For example, two lighting modules with an integrated light source can be installed on either side of the troffer fixture and two lighting modules can be installed on either end of the troffer fixture, with a ceiling panel arranged on one or more of the at least one lighting module. Alternatively, a covering element or end plate can be arranged on the at least one lighting module instead of the at least one ceiling panel without limiting the scope of the disclosure. Beneficially, the present disclosure provides a ceiling grid system to improvise maintenance of the appearance of ceiling panels. Specifically, the at least one lighting module is mounted on the T-Bars of the ceiling grid arrangements to support the plurality of ceiling panels at different orientations such as in a plane parallel, above, below, and at a tilted angle to the horizontal portions of the T-Bars defining the ceiling grid plane. Additionally, the plurality of ceiling panels are arranged at different orientations to provide a three-dimensional appearance to the ceiling grid system. It will be appreciated that such a ceiling grid system having the three-dimensional appearance corresponds to an appealing appearance thereof. Furthermore, orientations of the at least one lighting module and/or ceiling panel can be easily changed, thereby, enabling convenient customization of the ceiling grid system.

In the aforementioned embodiments the linear support element may or may not comprise the mounting portion that is mounted over the vertical portion 108 of the T-Bars 106 in operation. Optionally, the mounting portion is detachably mounted on the given T-Bar by accommodating a thickness of the flat vertical portion 108 of the T-Bars 106 between a recess or cavity (such as the central optical cavity 122) having an elongate U-shaped structure. In an example, the mounting portion may be coupled using a coupling means such as screws, nuts, bolts, adhesives, rivets, tie-wraps, and the like. In another example, the mounting portion may be coupled using a sliding mechanism such as a slider, a roller, and the like. In such an example, the mounting portion may slide over the flat vertical portion 108 of the T-Bars 106 and provide an ease of detaching thereof. Additionally, the mounting portion includes a thickness, a length, and a height (less than the vertical portion 108 of the T-Bars 106. Optionally, the material for manufacturing the mounting portion may include metals, metal alloys, hardened polyvinyl materials, plastics materials, glass-filled plastics materials, ceramic materials, and the like. Furthermore, optionally, the mounting portion includes a plurality of flat supporting portions. The term "flat supporting portion" as used herein relates to solid structures molded to form the mounting portion of the linear support element. Furthermore, the mounting portion of the linear support element is integral and molded in a substantially U-shaped structure. It will be appreciated that the term "substantially U-shaped structure" herein relates to a shape resembling an alphabetical letter "U" and a structure having a vertical left elongate member, a vertical right elongate member, and a curved member (or alternatively, a horizontal member) adjoining as integral to the lower end of the vertical left elongate member and the vertical right elongate member. In an example, each of the flat mounting portions are mutually separate and may be coupled to the curved member by coupling means or arrangements, such as welding, adhesives, fasteners, and the like.

The present disclosure provides an energy efficient and energy saving lighting assembly configured for enabling a reduced greenhouse gas emission from the lighting assembly by reducing the average energy consumption with respect to conventional lighting assemblies and reducing usage and implementation during times of minimal or no usage. Consequently, the ceiling grid lighting assembly can be remotely dimmable via a communication link (for example via the daisy-chain connection or via wireless control, or both) or can be controlled locally (for example by the lighting assembly having a motion sensor integrated therewith, a low-resolution charged-coupled device (CCD) camera or a photocell coupled to an image processing integrated circuit (IC) implemented as a microcontroller, a field-programmable gate array (FPGA) for motion detection, alternatively an ultrasonic motion detector).

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

We claim:

1. A lighting module configured for use in a suspended ceiling grid assembly comprising;
   a) an optical assembly comprising;
      i) an edgelit optical element;
      ii) a printed circuit board upon which is mounted at least one LED light source;
   b) a reflector or an internal reflective surface positioned proximate to a non-input face of the edgelit optical element;
   c) a linear support element comprising an elongate body in the form of a 3-dimensional shape of a cross-sectional profile area with internal and external support features extended linearly into a 3rd axis wherein the internal support features retain and maintain alignment of the component parts of the optical assembly and wherein the external support features are configured to facilitate one or more functions of;
      i) mounting to a T-Bar within a suspended ceiling grid;
      ii) supporting an optical assembly or components thereof;
      iii) supporting at least one edge of at least one ceiling panel;
   wherein the lighting module is configured to support the edge of a ceiling panel at a height above or below the ceiling grid plane of the suspended ceiling grid arrangement with the panel further being in a parallel or inclined orientation with respect to the ceiling grid plane and;
   wherein the internal support features of the linear support element are configured to allow optical components of the optical assembly to be slid along the $3^{rd}$ axis into position of retainment and alignment.

2. The lighting module of claim 1 wherein the external support features are configured to support more than one ceiling panel.

3. The lighting module of claim 1, wherein one or both the ends of the linear support element connect in parallel to a T-Bar.

4. The lighting module of claim 1, wherein one or both the ends of the linear support element connect perpendicularly to a T-Bar.

5. The lighting module of claim 1, wherein the linear support element is configured to span a cavity above the ceiling grid plane of a suspended ceiling grid and connect between two T-Bars proximate to the ends of the linear support element.

6. The lighting module of claim 1, wherein the linear support element comprises external support features configured with a structure of the horizontal portion of the T-Bars in the ceiling grid system.

7. The lighting module of claim 6, wherein at least one of the external support features of the at least one linear profile support element that support the edge of a ceiling panel are configured with the structure of the horizontal portion of a 9/16" slot style T-Bar.

8. The lighting module of claim 6, configured to replace a T-Bar in the ceiling grid system and support at least one ceiling panel.

9. The lighting module of claim 1, wherein the lighting module is configured to span and connect opposing sides of a ceiling grid T-Bar cell.

10. The lighting module of claim 1, wherein the lighting module is configured to span and connect adjacent sides of a suspended ceiling grid T-Bar cell.

11. The lighting module of claim 10, wherein an attachment point is located within the at least one linear profile support element.

12. The lighting module of claim 1 wherein the optical element is supported, by the linear profile support element, at an angle parallel or perpendicular or oblique to a suspended ceiling arrangement ceiling grid plane.

13. The lighting module of claim 1 further comprising an outer lens positioned either parallel or obliquely with respect to an output face of the edgelit optical element wherein the outer lens redirects light from the optical element.

14. The lighting module of claim 1, wherein the edgelit optical element has a cross sectional profile that is one or more of the group consisting of rectangular, triangular, arcuate.

15. The lighting module of claim 1 wherein the edgelit optical element is configured to install in a vertical position relative to a ceiling grid plane of a suspended ceiling grid arrangement.

16. The lighting module of claim 1 wherein the edgelit optical element is configured to install at an oblique angle relative to a ceiling grid plane of a suspended ceiling grid arrangement.

17. The lighting module of claim 1 wherein the edgelit optical element is a low clarity edge-lit diffuser or high clarity light guide.

18. The lighting module of claim 1 wherein the optical element is a low clarity diffuser characterized by an optical clarity less than 25% and comprising light scattering particles.

19. The lighting module of claim 1 wherein the edgelit optical element comprises one input face and at least one LED light source is proximate to the one input face.

20. The lighting module of claim 1 wherein the edgelit optical element comprises two input faces and wherein two printed circuit boards with at least one LED light source are each proximate to one of the two input faces.

21. The lighting module of claim 20 wherein electrical power can be applied to each printed circuit board independently.

22. The lighting module of claim 1 configured to project a portion of the light from the lighting module upon a ceiling panel within a reflective cavity of the suspended ceiling grid assembly.

23. The lighting module of claim 1 positioned below the ceiling grid plane of the suspended ceiling grid and configured to project a portion of the light emitted from the lighting module upward onto a ceiling panel of the suspended ceiling grid assembly.

24. The lighting module of claim 1, wherein the light distribution emitted from the lighting module is non-lambertian and has a light distribution shape that is from the following: batwing, asymmetric, double asymmetric, narrow or medium.

25. The lighting module of claim 1, wherein the optical assembly is housed in a module or cartridge configured such that it is removable from the linear support element.

26. The lighting module of claim 1, wherein the height of the elongate body of the linear profile support element is less than the height of a T-bar within a suspended ceiling grid arrangement the lighting module is configured to be installed within.

27. The lighting module of claim 1, further comprising at least one clip, bracket, or latch attached to the elongate body of the linear support element to enable the lighting module to be connected to a T-Bar.

28. The lighting module of claim 1 wherein a supported ceiling panel is one of a standard ceiling panel, an acoustic ceiling panel, a decorative tile, a planar reflective panel or a non-planar reflective panel.

29. The lighting module of claim 1, further comprising a utility component, supported by the at least one linear profile support element, selected from a group consisting of a driver or controller, an alarm, a sensor, a ventilation fan, a heater, a humidifier, an electronic controller, a battery, a wireless communication module.

30. The lighting module of claim 1 further comprising an end plate or covering element positioned to enclose a longitudinal end of the elongate body of the linear support element.

31. The lighting module of claim 30 wherein the end plate or covering element is mechanically fastened to the longitudinal end of the elongate body of the linear support element.

32. The lighting module of claim 30 wherein the end plate or covering element further connects and encloses the longitudinal end of an additional linear support element.

33. The lighting module of claim 30, wherein the linear support element or end plate further comprises an attachment point for suspension from a structural ceiling.

34. The lighting module of claim 1 wherein an included reflector is part of the optical assembly.

35. The lighting module of claim 1 wherein an included reflective surface is a surface of the linear support element.

* * * * *